US012657200B2

(12) United States Patent
Pu et al.

(10) Patent No.: US 12,657,200 B2
(45) Date of Patent: Jun. 16, 2026

(54) CONTINUOUS LEARNING FOR MULTI-AGENT SYSTEM

(71) Applicant: Microsoft Technology Licensing, LLC, Redmond, WA (US)

(72) Inventors: Wen Pu, Palo Alto, CA (US); Shen Shen, San Jose, CA (US); Jaimin Shah, Sunnyvale, CA (US); Andrew B. Fang, San Ramon, CA (US); Xiaoyang Gu, Los Altos, CA (US); Thomas P. Rosenkranz, San Francisco, CA (US); Jiali Huang, Bothell, WA (US); Mathuri Vasudev, Fremont, CA (US); Xie Lu, Sunnyvale, CA (US); Jonathan Pohl, Concord, MA (US); Andrew W. Chimka, San Francisco, CA (US); Chenhui Zhai, Santa Clara, CA (US); Aditya Pruthi, Brooklyn, NY (US); Adriana Meza, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/043,339

(22) Filed: Jan. 31, 2025

(65) Prior Publication Data

US 2026/0111431 A1 Apr. 23, 2026

Related U.S. Application Data

(60) Provisional application No. 63/709,937, filed on Oct. 21, 2024.

(51) Int. Cl.
| | | |
|---|---|---|
| *G06F 16/00* | (2019.01) | |
| *G06F 16/248* | (2019.01) | |
| *G06F 16/28* | (2019.01) | |

(52) U.S. Cl.
CPC .......... *G06F 16/248* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2024/0086648 A1* | 3/2024 | Han | G06F 3/0482 |
| 2024/0281446 A1* | 8/2024 | Bathwal | G06F 16/345 |

(Continued)

OTHER PUBLICATIONS

Fang, et al., "A Multi-Agent Conversational Recommender System", arXiv:2402.01135v1, Feb. 2, 2024, 10 pages.

(Continued)

*Primary Examiner* — Anhtai V Tran
(74) *Attorney, Agent, or Firm* — Nicholson De Vos Webster & Elliott LLP

(57) ABSTRACT

In an example, a method is performed by sending query input and a first instruction to a generative machine learning model (GMLM). The first instruction is to cause the GMLM to generate and output a query input summary. The query input summary and a second instruction are sent to the GMLM. The second instruction is to cause the GMLM to provide query results using multiple different queries and the query input summary. The query results and a third instruction are to cause the GMLM to summarize a comparison of a query result with the query input summary. A query result evaluation summary is generated and output by the GMLM. A signal is received from a position within a presentation of the query result evaluation summary. The first instruction is updated to include the signal in the query input summary.

20 Claims, 26 Drawing Sheets

(56) References Cited

U.S. PATENT DOCUMENTS

2025/0110979 A1*  4/2025  Saligrama Shreeram  ...................
                                              G06F 16/3344
2025/0225428 A1*  7/2025  Meltsner  ................ G06N 20/00
2025/0252121 A1*  8/2025  Sulser  ................. G06F 16/3329

OTHER PUBLICATIONS

International Search Report and Written Opinion received for PCT Application No. PCT/US2025/038995, mailed on Nov. 5, 2025, 17 pages.
Kavas, et al., "Using Large Language Models and Recruiter Expertise for Optimized Multilingual Job Offer—Applicant CV Matching", Proceedings of the Thirty Third International Joint Conference on Artificial Intelligence, 2024, pp. 8696-8699.

* cited by examiner

Figure 3:
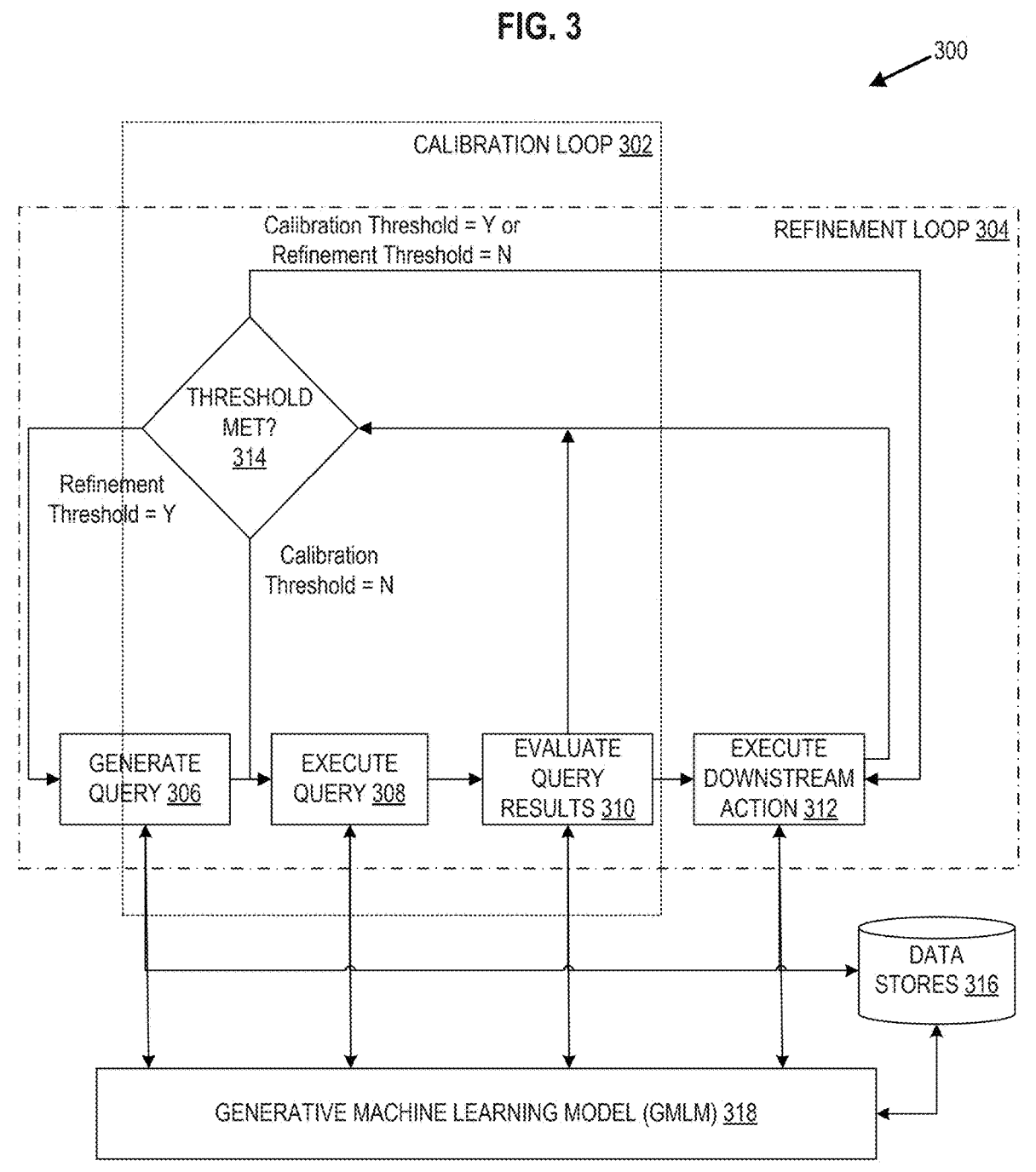

CALIBRATION LOOP 302

REFINEMENT LOOP 304

Calibration Threshold = Y or
Refinement Threshold = N

THRESHOLD
MET?
314

Refinement
Threshold = Y

Calibration
Threshold = N

GENERATE
QUERY 306

EXECUTE
QUERY 308

EVALUATE
QUERY
RESULTS 310

EXECUTE
DOWNSTREAM
ACTION 312

DATA
STORES 316

GENERATIVE MACHINE LEARNING MODEL (GMLM) 318

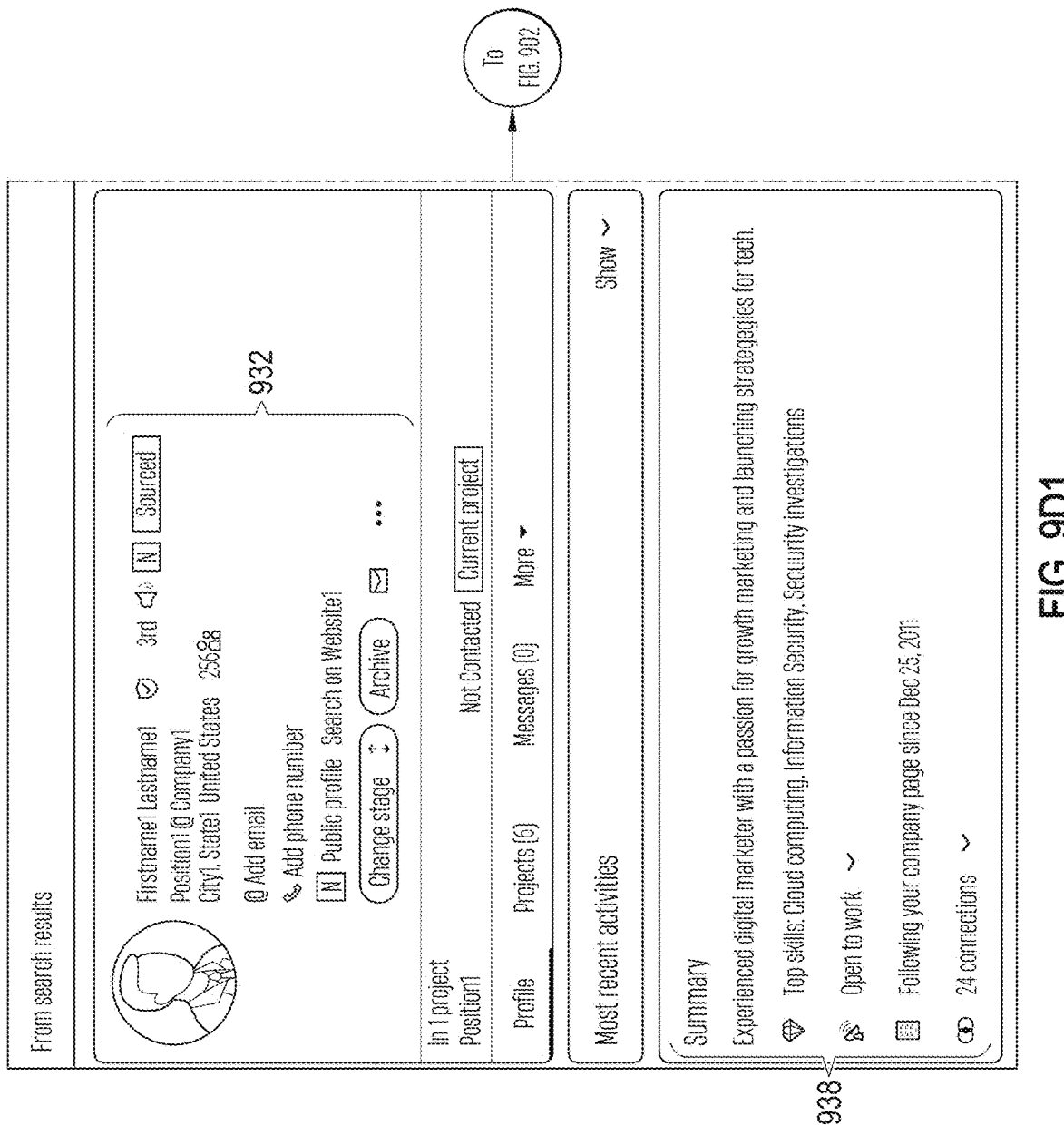
FIG. 9D1

930
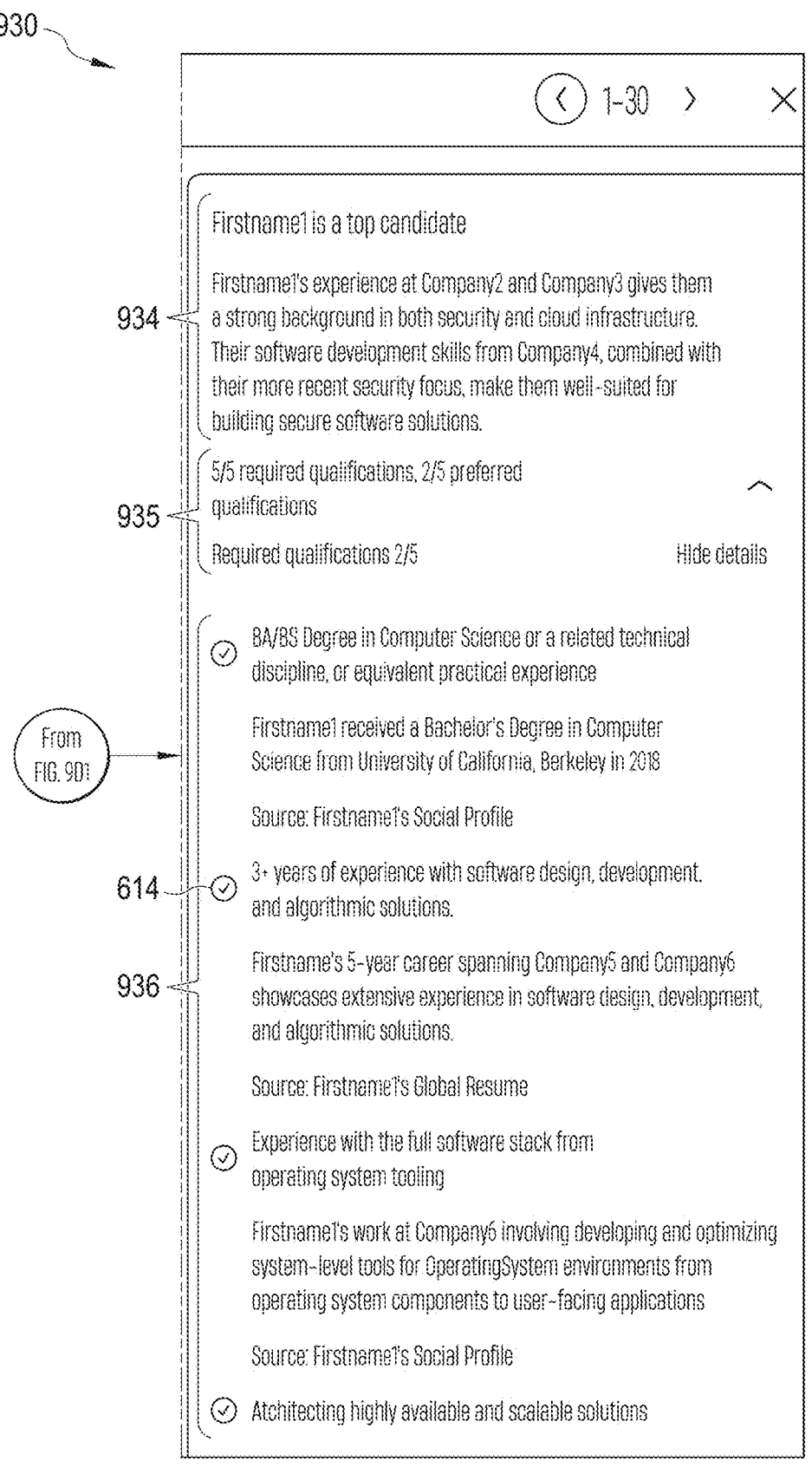
FIG. 9D2

950

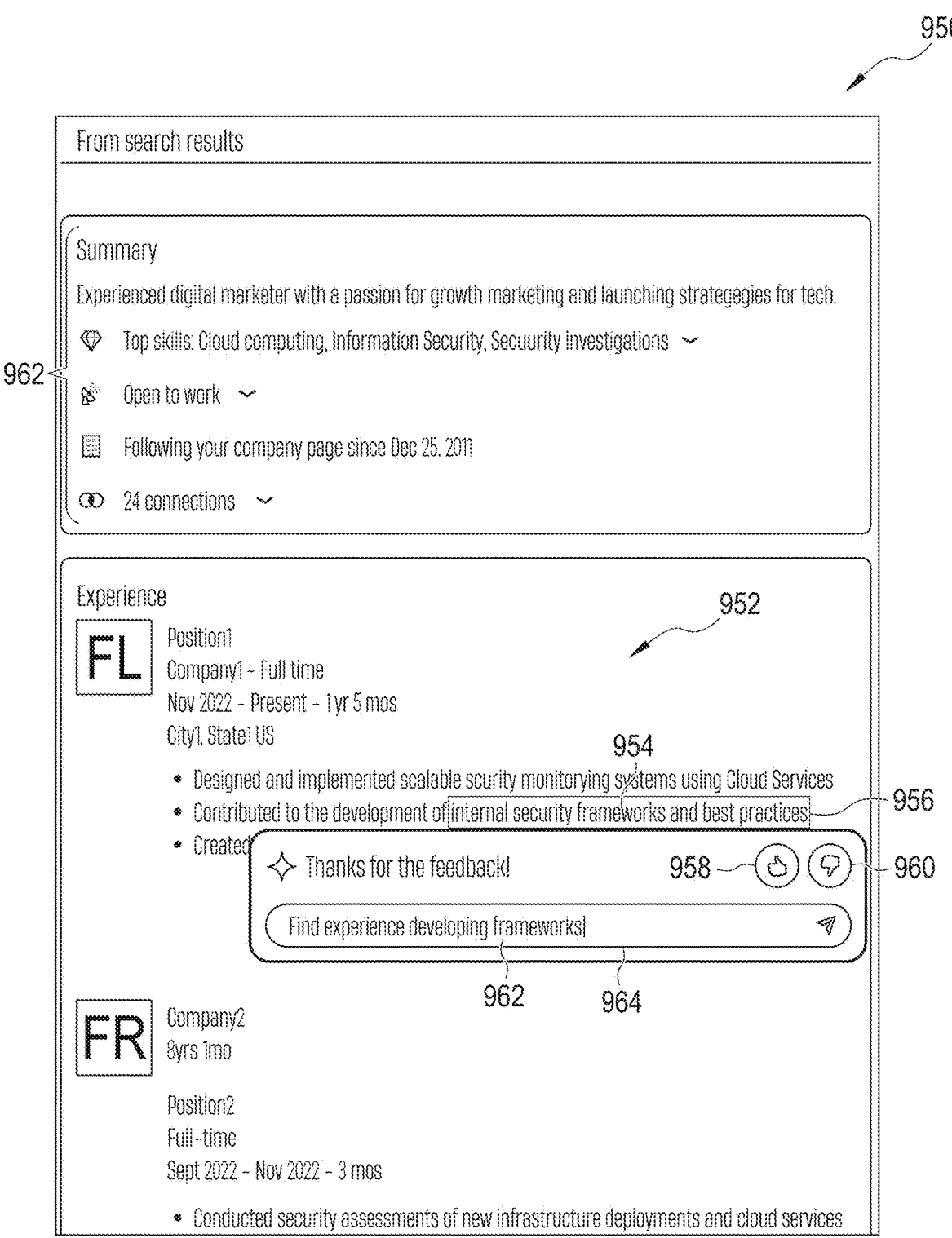

From search results

Summary

Experienced digital marketer with a passion for growth marketing and launching strategegies for tech.

◈ Top skills: Cloud computing, Information Security, Secuurity investigations ⌄

962

🖉 Open to work ⌄

▦ Following your company page since Dec 25, 2011

◉ 24 connections ⌄

Experience

952

FL | Position1
Company1 – Full time
Nov 2022 – Present – 1 yr 5 mos
City1, State1 US

954

• Designed and implemented scalable scurity monitorying systems using Cloud Services
• Contributed to the development of internal security frameworks and best practices

956

• Created

◇ Thanks for the feedback!        958        👍  👎        960

Find experience developing frameworks|        ➤

962        964

FR | Company2
8yrs 1mo

Position2
Full-time
Sept 2022 – Nov 2022 – 3 mos

• Conducted security assessments of new infrastructure deployments and cloud services

Figure 10:
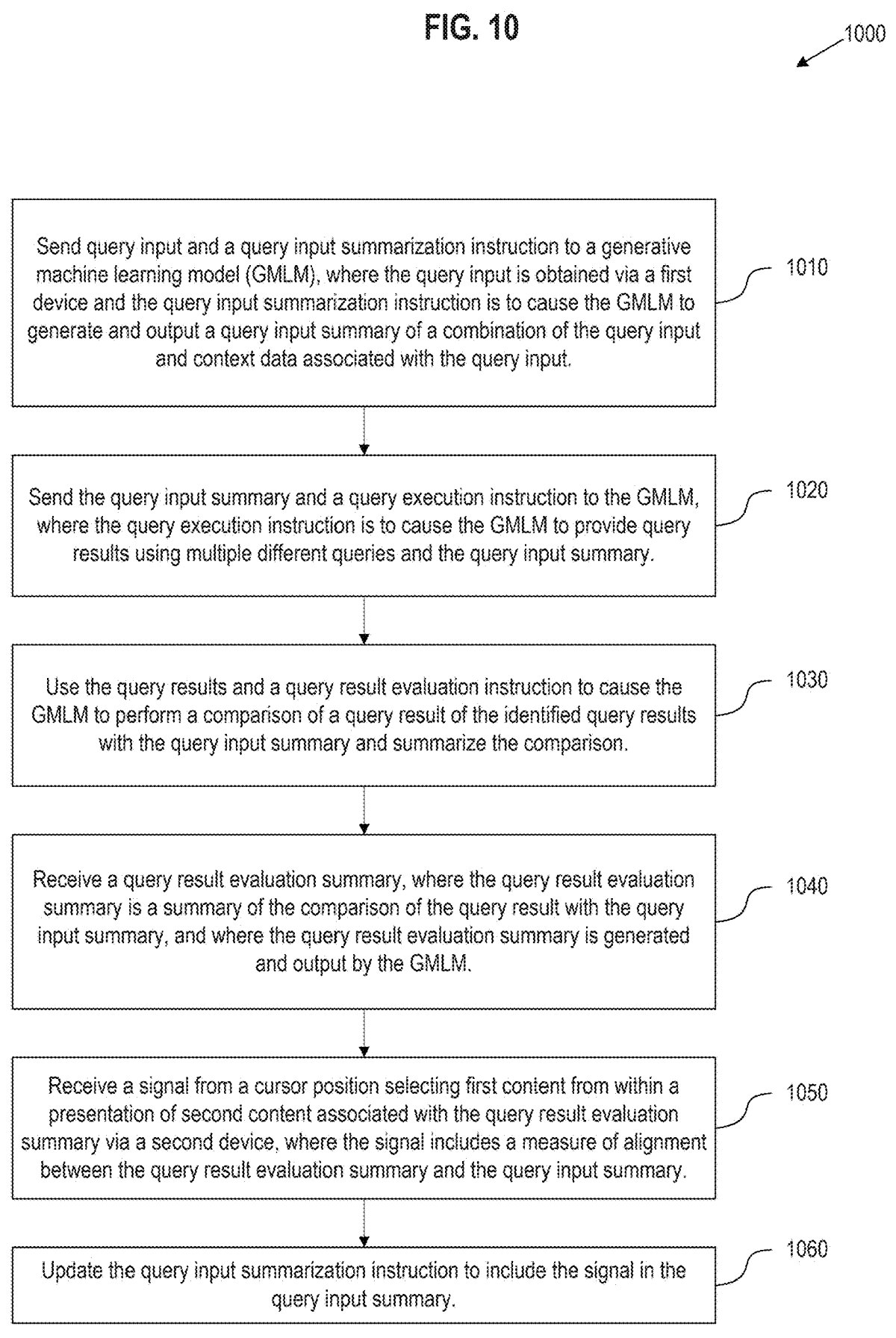

Send query input and a query input summarization instruction to a generative machine learning model (GMLM), where the query input is obtained via a first device and the query input summarization instruction is to cause the GMLM to generate and output a query input summary of a combination of the query input and context data associated with the query input.                                        1010

Send the query input summary and a query execution instruction to the GMLM, where the query execution instruction is to cause the GMLM to provide query results using multiple different queries and the query input summary.                                        1020

Use the query results and a query result evaluation instruction to cause the GMLM to perform a comparison of a query result of the identified query results with the query input summary and summarize the comparison.                                        1030

Receive a query result evaluation summary, where the query result evaluation summary is a summary of the comparison of the query result with the query input summary, and where the query result evaluation summary is generated and output by the GMLM.                                        1040

Receive a signal from a cursor position selecting first content from within a presentation of second content associated with the query result evaluation summary via a second device, where the signal includes a measure of alignment between the query result evaluation summary and the query input summary.                                        1050

Update the query input summarization instruction to include the signal in the query input summary.                                        1060

FIG. 11

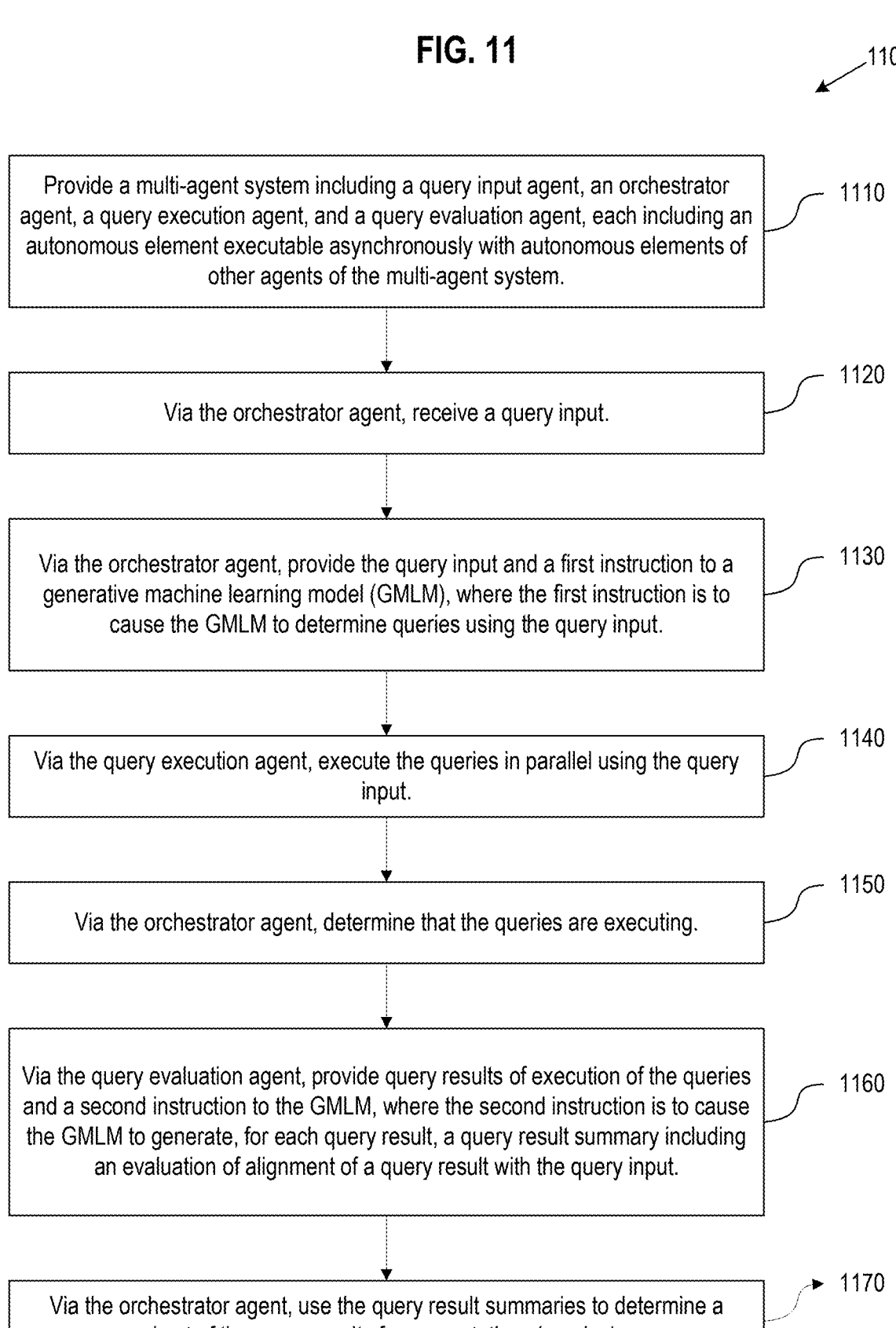

1100

Provide a multi-agent system including a query input agent, an orchestrator agent, a query execution agent, and a query evaluation agent, each including an autonomous element executable asynchronously with autonomous elements of other agents of the multi-agent system.          1110

Via the orchestrator agent, receive a query input.          1120

Via the orchestrator agent, provide the query input and a first instruction to a generative machine learning model (GMLM), where the first instruction is to cause the GMLM to determine queries using the query input.          1130

Via the query execution agent, execute the queries in parallel using the query input.          1140

Via the orchestrator agent, determine that the queries are executing.          1150

Via the query evaluation agent, provide query results of execution of the queries and a second instruction to the GMLM, where the second instruction is to cause the GMLM to generate, for each query result, a query result summary including an evaluation of alignment of a query result with the query input.          1160

Via the orchestrator agent, use the query result summaries to determine a subset of the query results for presentation via a device.          1170

1200

1300

Input Feature Set X ——— 1314

MACHINE LEARNING MODEL
1315

Modeling Function
1316

Feature Coefficients
1317

Model Hyperparameters
1318

——— 1319

P(Y| X)

Where Y is an output (e.g., a label or score)
and P(Y|X) indicates a likelihood of an output Y
given an input X

*To Data Storage or Requesting Process,
System, Device, Framework, or Service*

1320

Input Feature Set X —— 1322

MACHINE LEARNING MODEL
1324

Modeling Function
1325

Feature Coefficients
1326

Model Hyperparameters
1327

P(X, Y) —— 1328

Where Y is an output and P(X,Y) indicates a
likelihood of cooccurrence of an input X and an
output Y

*To Data Storage or Requesting Process,
System, Device, Framework, or Service*

1340

TRANSFORMER MODEL
1342

Encoder
1344

Embedded
Subsequences
1350

Decoder
1354

Multi-head
Attention
1345

Add & Norm
1346

Encoder
Output
Representation
1352

Feed Forward
1347

Add & Norm
1348

Masked
Multi-head
Attention
1355

Add & Norm
1356

Multi-head
Attention
1357

Add & Norm
1358

Feed Forward
1359

Add & Norm
1360

Output
Probabilities
1362

Model Output 1364

*To Data Storage or Requesting Process,*
*System, Device, Framework, or Service*

CONTINUOUS LEARNING FOR MULTI-AGENT SYSTEM

CROSS-REFERENCE TO RELATED APPLICATION

This application claims the benefit of and priority to U.S. Provisional Patent Application No. 63/709,937, filed Oct. 21, 2024, which is incorporate herein by this reference in its entirety.

TECHNICAL FIELD

Technical fields to which this disclosure relates include agent systems. Other technical fields to which this disclosure relates include the use of large language models for search applications.

COPYRIGHT NOTICE

BACKGROUND

Automated agents include hardware and/or software components that are capable of performing user-level tasks and actions without or with minimal direct human interaction. Agents differ from daemons and other computer programs that run as background processes in the level of complexity of the tasks they execute and the degree to which the agents are capable of interacting with human users.

A device or system may include one or more autonomous and/or semi-autonomous agents. For example, a vehicle may include an autonomous agent that controls the vehicle in response to sensor signals, without asking a human operator whether to, e.g., step on the brake or turn the steering wheel. A semi-autonomous agent of the vehicle may automatically load a map with a navigation plan to get the human driver home to a known destination but then wait for the human driver to confirm the plan and start the vehicle before autonomously driving down the road.

BRIEF DESCRIPTION OF THE DRAWINGS

The disclosure will be understood more fully from the detailed description given below and from the accompanying drawings of various examples of the disclosure. The drawings are for explanation and understanding only and should not be taken to limit the disclosure to the specific examples shown.

FIG. 3 is a component-based flow diagram of an example method for query execution in accordance with some examples of the present disclosure.

FIG. 9A, FIG. 9B, FIG. 9C, FIG. 9D1, FIG. 9D2, FIG. 9E, FIG. 9F, FIG. 9G, and FIG. 9H are screen captures of example user interface displays in accordance with some examples of the present disclosure.

FIG. 10 is a flow diagram of an example method for query learning in accordance with some examples of the present disclosure.

FIG. 11 is a flow diagram of an example method for query execution and evaluation in accordance with some examples of the present disclosure.

DETAILED DESCRIPTION

Figure 1:
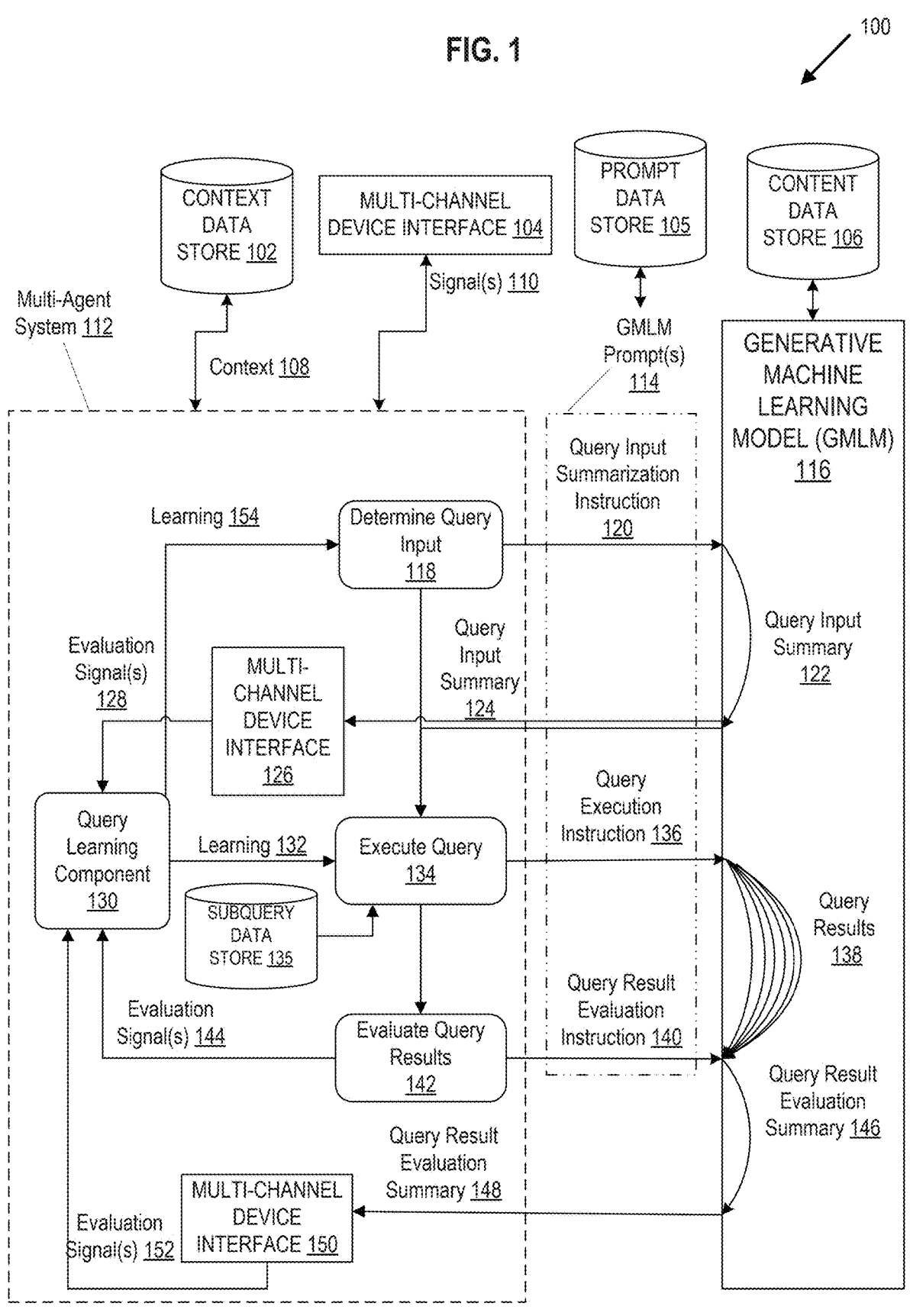
FIG. 1 is a component-based flow diagram of an example method for query execution using a multi-agent system in accordance with some examples of the present disclosure.

Generative machine learning models (GMLMs), such as large language models (LLMs), have demonstrated the ability to automate relatively simple tasks using a conversational question and answer format. However, using GMLMs to build more complex systems that are capable of performing multiple different tasks is technically challenging. This is because the output of the GMLMs is unpredictable, particularly if a task is ambiguous or not well-defined to the GMLM. If unpredictable GMLM output is used to perform a subsequent operation, the output of the subsequent operation is likely to be unpredictable as well. Thus, the risk of unpredictable output is a deterrent to the widespread use of GMLMs as a foundation for more complex applications.

A search engine is a software program that retrieves information from one or more electronic data sources. Commonly, a user provides search terms through a user interface. The user then inputs a signal that triggers the search engine to execute a search. In response to the signal, the search engine formulates a query based on the search terms, executes the query to retrieve information corresponding to the search terms, and provides the retrieved information to the user interface.

Search-based applications (also referred to as search applications) are capable of providing additional functionality supported by a search engine. Examples of search applications include but are not limited to recommendation systems, job application systems, hiring platforms for recruiters, e-commerce systems, learning and education systems, and content distribution systems such as news, entertainment, and networking platforms.

Attempts to leverage GMLMs for search applications have been made. These attempts have relied on synchronous communications between the search application and the GMLM. These approaches have proven sub-optimal because evaluation of the output produced by the GMLM is deferred to the end of a long processing pipeline and the evaluation is heavily dependent upon user responses to the presentation of search results. These other approaches are only capable of executing one query at a time, and query refinement does not occur until after the search results have been presented to the user.

These other systems are unable to expedite the user's review of the search results because of the synchronous architecture, which only executes one search at a time. Thus, with these other approaches, the risk increases that useful search results will be missed or not presented to the user at all. The user may spend a great deal of time reviewing a sub-optimal result set before realizing that it contains few, if any, useful results.

In addition, these other systems do not provide any assistance to the user to refine their query to improve the result set. Instead, these other systems rely on the user to manually revise their query. This lack of assistance with query refinement increases the number of search iterations undertaken by the user with potentially no improvement of the result set. The heavy burdens placed on the user by these other systems for results evaluation and query refinement provide a poor user experience that is often tiring and overwhelming, leading to disengagement as the user is unable to use the system effectively to obtain the information they need.

Additionally, these prior approaches tend to be inefficient with the consumption of computer resources such as network bandwidth and processing capacity because an excessive number of iterations of query refinement requires many additional communications with the GMLM.

Various examples described herein seek to mitigate these and/or other technical challenges. Examples provide a multi-agent system wherein different agents of the multi-agent system execute different search-related tasks asynchronously in response to a same source query (that is, in response to a single source query available to all the agents). In some examples, the multi-agent system includes a query execution agent and a query evaluation agent.

The query execution agent is capable of efficiently producing a result set that is likely to have a sufficient number of useful results that will be evaluated favorably because it executes multiple different subqueries, where each of the subqueries is a variation of a source query. In some examples, different subqueries of the source query have different query terms weighted differently. The query execution agent executes these multiple different subqueries in parallel, in an autonomous fashion, to produce corresponding result subsets. The query execution agent produces a first result set that is a combination of all of the result subsets, so that the first result set includes all of the results generated by the parallel execution of all of the different subqueries of the source query.

The first result set is passed to the query evaluation agent. The query evaluation agent is capable of evaluating each of the results in the first result set against the source query and generating explanations of its evaluation in an autonomous fashion. The output of the query evaluation agent includes clear and transparent verbal and/or graphical explanations for the inclusion or exclusion of results in the first result set.

These explanations are aimed at ensuring transparency and consistency of the GMLM output.

The use of a multi-agent system that includes separate agents to perform the query execution and query evaluation functions facilitates the generation of explanations of the inclusion or exclusion of search results in result sets. This is because the query evaluation agent is capable of evaluating individual results across all of the result subsets created by the parallel execution of the different subqueries by the query execution agent. In some examples, an orchestrator agent monitors and controls the parallel executions of the multiple different subqueries and does not provide any result subsets to the query evaluation agent until the executions of all of the multiple different subqueries have completed, to ensure that useful results are not inadvertently excluded.

The first result set is filtered using the output of the query evaluation agent to produce a second result set capable of being presented to a user. The filtering aims to increase the likelihood that the second result set presented to the user will contain useful results. The second result set is presented to the user along with the corresponding per-result explanations generated by the query evaluation agent.

In some examples, the multi-agent system includes an automatic learning process that updates the source query and/or subqueries in an autonomous or semi-autonomous manner, rather than relying on the user to determine by themselves what refinements are needed to make the query more effective. Through the learning process, subsequent versions of the source query and/or subqueries are generated and evaluated. The learning process is iterative so that the operations of the multi-agent system are controlled through the learning.

In some examples, the learning process includes observing signals such as user input selections of search results or scrolling through result sets, using the signals to determine learning, and using the learning to create new versions of the source query and/or subqueries. In some examples, the learning is determined by applying a linear regression-based process to the signals to classify the signals as positive or negative, such that the learning for a given signal or combination of signals is represented by its corresponding classification. The learning is used to create subsequent versions of the source query, e.g., to add or remove terms from the source query and/or to increase or decrease weight values assigned to different terms of the source query. Also or alternatively, the learning is used to create subsequent versions of one or more of the subqueries of the source query, e.g., to add or remove terms from one or more subqueries and/or to increase or decrease weight values assigned to one or more of the subqueries.

In some examples, the multi-agent system includes one or more other agents in addition to the query execution agent and query evaluation agent. Some examples include the orchestrator agent. The orchestrator agent controls communications with the other agents and coordinates communications with the user's device. Some examples of the other agents include a query input agent. The query input agent obtains query input and uses the query input to formulate a source query, where the source query becomes the input for the generation of the multiple different query versions executed in parallel by the query execution agent.

Some examples include an action agent. The action agent executes one or more downstream actions using one or more of the results in the second result set presented to the user. In some examples, the action agent generates follow-up questions related to a particular result in the second result set, such as screening questions to be asked of a job candidate during an interview. In some examples, the action agent generates a draft of a communication, such as an email message. In some examples, the action agent adds one or more of the results in the second result set to a data store for subsequent processing.

Various examples of the described techniques aim to improve upon the other approaches mentioned above by improving the control over the GMLM output, distributing the query processing among multiple agents, providing for execution of multiple queries in parallel, leveraging a GMLM to perform query result evaluations in batches to optimize efficiency and reduce latency, using an orchestrator agent to improve the control of the agents performing search-related tasks, reducing the burden of input on the user by using a GMLM to summarize query input and query results, reducing the number of query refinement iterations using a continuous learning process, reducing the consumption of computer resources by distributing work across multiple agents, enabling GMLM-generated explanations of query results, and/or enabling continuous query learning. In some examples, the GMLM-based explanations of query results produced by the query evaluation agent are also or alternatively used for auditing purposes, such as to ensure compliance with applicable performance criteria related to artificial intelligence-based systems, such as risk and quality management, data governance, transparency, accuracy, robustness, technical compliance, record-keeping, and/or usage control.

Agent refers to a semi-autonomous or autonomous software system that is able to consume information and/or signals from its environment, execute logic, reasoning, and learning processes, and perform actions to achieve a specific goal or set of goals with minimal human guidance or intervention. In some examples, agents have multiple levels of autonomy. Some agents have the capacity to perform tasks requiring complex understanding, reasoning, learning, and adaptability. Some agents are capable of processing and interpreting natural language and/or multimodal digital content, determining relevant context, formulating plans, and learning from interactions or data inputs. Some agents dynamically adapt their processing capabilities in response to changing environments, inputs, or goals. Some agents are capable of interacting with human users and other systems, including other agents or groups of agents. Unlike simpler automated systems, agents are data-driven and are capable of utilizing machine learning and/or deep learning techniques to improve their performance over time, making them suitable for a wide range of search applications.

The disclosure will be understood more fully from the detailed description given below, which references the accompanying drawings. The detailed description of the drawings is for explanation and understanding, and should not be taken to limit the disclosure to the specific examples described. In some examples, components with the same name but different reference numbers in different figures have the same or similar functionality such that a description of one of those components with respect to one figure is applicable to other components with the same name in other drawings. Also, in the drawings and the following description, components shown and described in connection with some examples are capable of being used with or incorporated into other examples. In some examples, a component illustrated in a certain drawing is not limited to use in connection with the example to which the drawing pertains, but is usable with or incorporated into other examples, including examples shown in other drawings.

FIG. 1 is a component-based flow diagram of an example method for query execution using a multi-agent system in accordance with some examples of the present disclosure.

The method 100 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 100 is performed by the computing system components shown in FIG. 1. In other examples, portions of the method are performed by the computing system components shown in FIG. 2, FIG. 3, FIG. 4, FIG. 5, FIG. 6, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In FIG. 1, the method 100 is represented by arrows connecting components of a computing system. The computing system includes a context data store 102, a multi-channel device interface 104, a prompt data store 105, a content data store 106, a multi-agent system 112, a generative machine learning model (GMLM) 116, a multi-channel device interface 126, and a multi-channel device interface 150.

The context data store 102 stores context data. In some examples, context data includes data that is accessible using an entity identifier as a key or search term. Examples of entity identifiers include user identifiers, device identifiers, session identifiers, account identifiers, and other types of identifiers used to uniquely identify entities. In some examples, entity refers to users, other types of entities, such as companies, organizations, institutions, associations, cohorts, or groups of entities, and/or to technological entities such as devices, networks, systems, components, processes, models, or agents. Any aspects of any examples that are described as applicable to users are applicable to other types of entities in other examples.

The context data is obtained from one or more entity profiles, interaction logs, metadata, digital content items, such as social media posts, job applications, resumes; or databases that store information about an entity and/or the entity's use of the computing system. In some examples, context data includes one or more signals from an environment (e.g., sensor signals), network (e.g., communications from servers or devices, asynchronous communications from agents, etc.), or device, such as signals logged during the same login session and/or previous login sessions (e.g., clicks, taps, views, scrolls, historical job application activity, search history, etc.). In some examples, context data includes digital content created, shared, or reacted-to by a user associated with the entity identifier, such as articles, posts, videos, images, graphics, comments, and reactions (e.g., likes, etc.). The context data is capable of including other types of data and is not limited to these examples.

The multi-channel device interface 104 is a device interface, e.g., a programmable interface that enables a user to connect to and communicate with the multi-agent system 112 via multiple different communication channels. Examples of communication channels include specific-purpose web portals, such as application web pages, and general purpose messaging interfaces, such as email, chatbots, and various different types of asynchronous messaging applications. To enable communication with the multi-agent system 112 via a general purpose interface, some examples of the multi-agent device interface 104 include a translation layer that maps input received via the general purpose interface to data types and/or instructions that are capable of being processed by the multi-agent system 112.

The multi-channel device interface 126 and the multi-channel device interface 150 each are the same device interface as the multi-channel device interface 104 in some examples. In other examples, one or more of the multi-channel device interfaces 104, 126, 150 are different device interfaces. In some examples, a user initiates a search using one of the multi-channel device interfaces 104, 126, 150 and reviews or processes search results using a different one of the multi-channel device interfaces 104, 126, 150. In some examples, the computing system monitors the user's use of different channels of the multi-channel interfaces 104, 126, 150 over a time interval, ranks the channels based on the usage data, presents the channels to the user in rank order according to the user's preference, and configures the applicable translation layers to facilitate communication between the multi-agent system 112 and the user-preferred channel or channels.

The prompt data store 105 is a searchable library of GMLM prompt templates. Prompt refers to one or more GMLM instructions, e.g., instructions that are readable by a GMLM, along with the input to which the GMLM is to apply those instructions, and a set of model parameters that control the operations of the GMLM during the processing of the prompt and the generating of output in response to the prompt. GMLM instructions often include natural language statements or questions, e.g., sentences, paragraphs, or phrases as would typically be written by a human, in contrast to programming code or structured data such as embeddings or feature sets.

In some examples, the GMLM instructions include one or more statements, questions, conditions, constraints, and/or prompt examples. Prompt example refers to an illustrative example of the types of output that are to be produced by the GMLM and/or an illustrative example of the types of processing steps the GMLM is to perform in order to generate output in response to the prompt. Prompt examples are commonly included in GMLM instructions to improve the predictability of the output produced by the GMLM in response to the prompt.

The model parameter values contained in the prompt are often specified by the GMLM and are adjustable in accordance with the requirements of a particular design or implementation of the GMLM. Examples of parameter values include the maximum length or size of the prompt and the degree to which the model produces deterministic output versus random output. Because the way in which the elements of the prompt are organized and the phrasing used to articulate the prompt elements often affects the output produced by the GMLM in response to a prompt, prompts are often developed through an iterative prompt engineering process.

Prompt template refers to a pre-defined prompt that includes one or more placeholders for the data to which the GMLM instructions contained in the prompt are to be applied. The prompt templates are often developed through the iterative prompt engineering process and then generalized to accommodate different input values. An example of a prompt template includes one or more GMLM instructions with embedded placeholders for signals 110 and context 108.

The content data store 106 is a repository of searchable digital content from which search results are retrievable in response to an execution of a query. The searchable digital content stored in content data store 106 includes structured data and/or unstructured data. In some examples, the searchable digital content stored in content data store 106 includes entity profiles, web pages, articles, documents, images, videos, audio files, source code files, and/or other types of digital content.

The multi-agent system 112 is an agent-based search application. The multi-agent system 112 includes multiple computer-executable components, such as a determine query input component 118, an execute query component 134, a subquery data store 135, an evaluate query results component 142, and a query learning component 130. The multiple computer-executable components of the multi-agent system 112 are implemented using multiple autonomous or semi-autonomous agents. In some examples, the determine query input component 118 is implemented using a query input agent, the execute query component 134 is implemented using a query execution agent, the evaluate query results component 142 is implemented using a query result evaluation agent, and the query learning component is implemented using an orchestrator agent. In other examples, some of the components of the multi-agent system 112 are not implemented using agents while other components are implemented using agents. In some examples, portions of the multi-agent system 112 are implemented using the multi-agent architecture described with reference to FIG. 2 and/or FIG. 4.

The GMLM 116 is a generative machine learning model. In some examples, the GMLM 116 is a pre-trained large language model. In some examples, the GMLM 116 includes an encoder-decoder model, such as a transformer model. Examples of model architectures and processes that are usable to create and train the GMLM 116 are described with reference to FIG. 13A, FIG. 13C, and FIG. 13E.

In operation, the determine query input component 118 of multi-agent system 112 receives one or more signals 110 via multi-channel device interface 104. The signals 110 include one or more search terms. In some examples, the signals 110 include an entity identifier and input, such as natural language text, provided by a user of the multi-channel device interface 104 using an input mechanism such as a keypad, microphone, or mouse.

In some examples, the determine query input component 118 applies one or more constraints to the signals 110, such as rules that specify required and optional inputs. In some examples, the constraints specify that, e.g., role, job title, or job description is a required input while skill, educational experience, work experience, geographic location, and/or other inputs are optional.

The determine query input component 118 uses the one or more signals 110 to search context data store 102 to identify and retrieve context 108 that is associated with the search terms included in the one or more signals 110. In some examples, the signals 110 include a job title or role (e.g., software engineer) and the context 108 includes a history of user profiles for people with that job title (e.g., software engineers) who the user has hired previously.

The determine query input component 118 retrieves a prompt template from prompt data store 105 that is formulated to cause the GMLM 116 to summarize query input. Query input refers to a combination of the signals 110 and the context 108. The determine query input component 118 formulates a query input summarization instruction 120 by combining the query input (e.g., the signals 110 and the context 108) with the query input summarization prompt template retrieved from the prompt data store 105.

The determine query input component 118 sends the query input summarization instruction 120 to the GMLM 116. Send refers to a process of providing, passing, transmitting, or otherwise communicating input to the GMLM 116, e.g., via one or more application programming interface (API) calls or other electronic transmission mechanisms.

The GMLM 116 reads and processes the query input summarization instruction 120 to produce a query input summary 122. The query input summary 122 is a summary of the query input (e.g., a human-readable, natural language summary of the signals 110 and the context 108). In some examples, the query input summary 122 is a textual description of an "ideal" search result from the user's perspective, which is generated and output by the GMLM 116 based on the signals 110 and the context 108. In some examples where the search application includes a hiring platform, the query input summary 122 includes a textual description of the ideal job candidate that the user is looking to hire given the role, title, or job description specified in the signals 110. An example of a query input summary is described with reference to FIG. 9C.

The GMLM 116 outputs the query input summary 122. In some examples, described with reference to the query learning component 130, a query learning process is invoked by presenting the query input summary 124 to the user for review via the multi-channel device interface 126. In some examples, the query input summary 124 is provided to the execute query component 134 whether or not the query learning process is invoked.

The execute query component 134 receives the query input summary 122. The execute query component uses the query input summary 122 to search for and retrieve a query execution prompt template from prompt data store 105. The query execution prompt template is formulated to cause the GMLM 116 to generate a source query and subqueries of the source query, based on the query input summary. In some examples, the source query includes the same digital content as the query input summary 122. In other examples, the source query is an executable version of the query input summary 122, which is optimized for query execution.

The subqueries are multiple different variations of the source query. In some examples, the subqueries assign different weight values to different search terms within the source query, add one or more additional query terms to the source query, or omit one or more query terms from the source query. In some examples, the subqueries are predefined and stored in subquery data store 135. In some examples, the subqueries are represented by a weight matrix that assigns, for each different subquery, different weight values to different terms or phrases within the source query.

The execute query component 134 formulates a query execution instruction 136 by combining the source query (e.g., the query input summary 122) and subqueries retrieved from the subquery data store 135 with the query execution prompt template retrieved from the prompt data store 105. The execute query component 134 sends the query execution instruction 136 to the GMLM 116.

The GMLM 116 reads and processes the query execution instruction 136 to produce query results 138. The GMLM 116 or the execute query component 134 initiates the execution of the multiple subqueries in parallel. In some examples, the query execution instruction 136 causes the GMLM 116 or the execute query component 134 to spawn a separate process or thread for each subquery so that the multiple subqueries execute asynchronously to produce respective query result subsets in parallel. The query results subsets are combined to form query results 138. A retrieval augmented generation (RAG)-based technique is used to generate the query results 138, in some examples.

The query results 138 include a result subset for each of the subqueries executed in parallel. The execute query component 134 or another component of the multi-agent system 112 monitors the parallel executions of the subqueries and invokes the evaluate query results component 142 when all of the subqueries have finished executing.

The evaluate query results component 142 retrieves a query result evaluation prompt template from the prompt data store 105. The query result evaluation prompt template is formulated to cause the GMLM 116 to perform a result-by-result comparison of each of the query results 138 with the source query (e.g., the query input summary 122), and to generate a summary of each such comparison. The evaluate query results component 142 combines the query result evaluation prompt template with information that identifies or references the individual subsets of the query results 138, such as thread identifiers that identify the individual subqueries and their respective result subsets, to produce a query result evaluation instruction 140.

The evaluate query results component 142 sends the query result evaluation instruction 140 to the GMLM 116. The GMLM 116 reads and processes the query result evaluation instruction 136 to produce a query result evaluation summary 146. The query result evaluation summary 146 generated and output by the GMLM 116 in response to the query result evaluation instruction 140 includes a verbal and/or graphical summary of a "fit" measurement, which measures the comparison of each query result with the query input summary 122 in quantitative or qualitive terms (e.g., scores or classification labels). Examples of query result evaluation summaries 146 are described with reference to FIG. 9D1, FIG. 9D2 and FIG. 9E.

In some examples, as described with reference to the query learning component 130, the evaluate query results component 142 provides one or more evaluation signals 144 from the query result evaluation summary 146 to the query learning component 130. Examples of evaluation signals 144 include aggregations of the per-result fit measurements generated by the GMLM 116, such as a count of the number of results rated as a good fit or a poor fit by the GMLM 116 or an average fit score. In some examples, the query result evaluation summary 148 is provided to the multi-channel device interface 150 for user review whether or not the query learning process is invoked.

The query learning component 130 periodically obtains learning signals from one or more sources of learning. The sources of learning include evaluation signals 128, 152 obtained via one or more of the multi-channel device interfaces 126, 150, respectively, and/or evaluation signals 144 obtained from GMLM 116 via the evaluate query results component 142, and/or signals obtained via multi-channel device interface 104. The query learning component 130 processes the sources of learning, e.g., evaluation signals 128, 144, 152 and/or signals 110, and generates one or more learnings 154, 132. The learning processes executed by query learning component 130 include continuous learning processes that are integrated with the online flow of the operations of the multi-agent system and/or offline process that are executed on batches of accumulated learning signals. Examples of query learning processes are described with reference to FIG. 6, FIG. 7A, FIG. 7B, and FIG. 8.

The query learning component 130 provides learning 154 to determine query input component 118. Learning 154 is used by determine query input component 118 to modify the query input summary 122, e.g., by including the learning 154 in a subsequent version of the query input summarization instruction 120, which is provided to the GMLM 116. Including the learning 154 in a subsequent version of the query input summarization instruction 120 often results in the addition of one or more search criteria to the query input summary 122 and/or deletion of one or more search criteria from the query input summary 122.

The query learning component 130 provides learning 132 to execute query component 134. Learning 132 is used by execute query component 134 to modify the query results 138, e.g., by including the learning 132 in a subsequent version of the query result evaluation instruction 140. Including the learning 132 in a subsequent version of the query result evaluation instruction 140 often results in a change to one or more of the fit measurements included in the query result evaluation summary 148 (e.g., an increase or decrease in a fit score or a change to a different classification label), and/or a re-sorting of the query results described in the query result evaluation summary 148 based on the updated fit measurements.

The examples shown in FIG. 1 and the accompanying description are provided for illustration purposes. This disclosure is not limited to the described examples.

Figure 2:
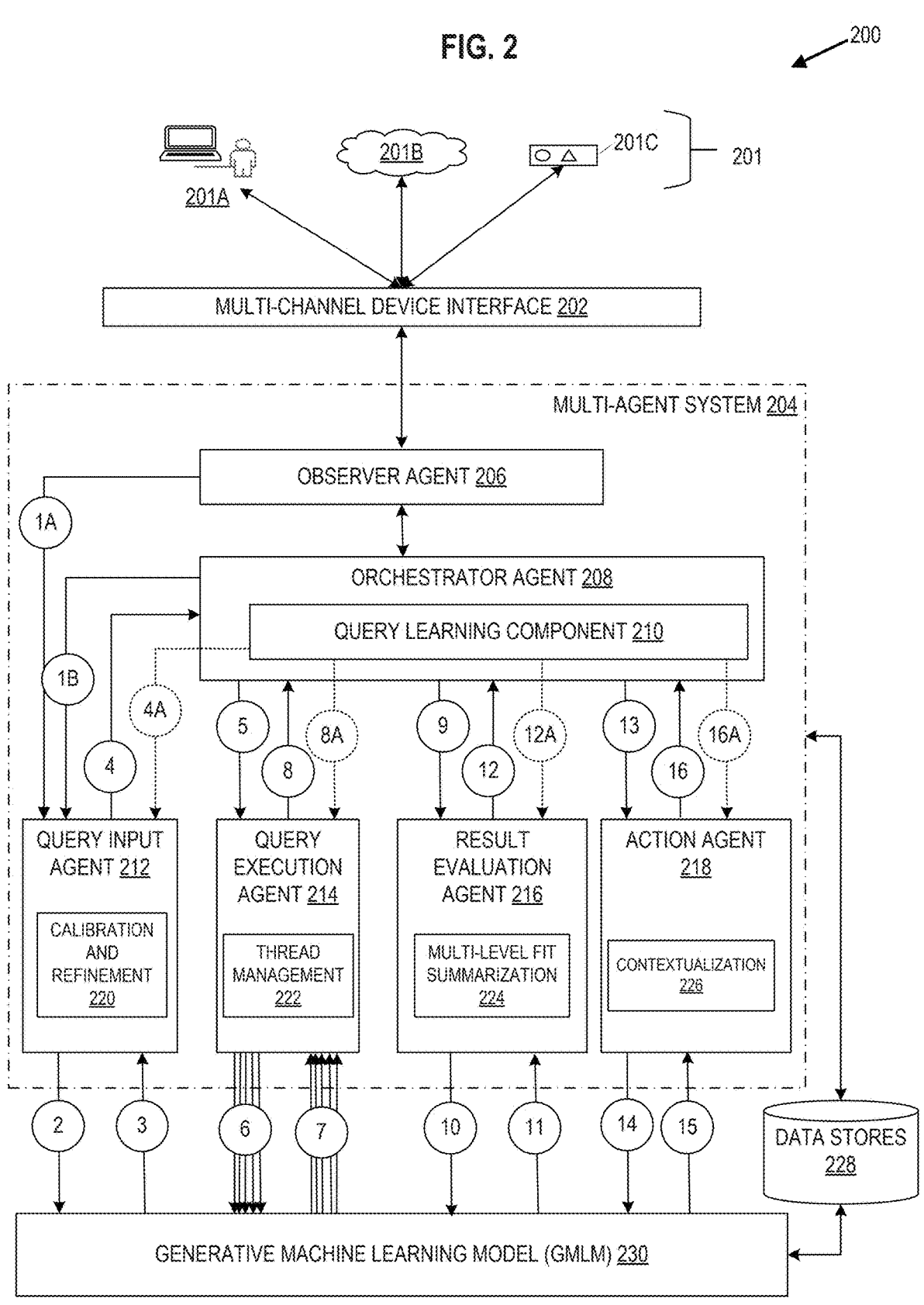
FIG. 2 is a component-based flow diagram of an example method for query execution using a multi-agent system in accordance with some examples of the present disclosure.

FIG. 2 is a component-based flow diagram of an example method for query execution using a multi-agent system in accordance with some examples of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the computing system components shown in FIG. 2. In other examples, portions of the method 200 are performed by the computing system components shown in FIG. 1, FIG. 3, FIG. 4, FIG. 5, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In FIG. 2, the method 200 is represented by arrows connecting components of a computing system. The computing system includes an environment 201, a multi-channel device interface 202, a multi-agent system 204, a generative machine learning model (GMLM) 230, and data stores 228.

The environment 201 includes one or more user devices 201A, a network 201B, and/or one or more sensing devices 201C. Examples of user devices 201A include computing devices, such as laptop computers, smart phones, mobile computing devices, smart appliances, wearable devices, game controls, vehicle controls, buttons, switches, robotic devices, etc. Examples of networks 201B include wireless, optical, and/or wired communication networks. A non-exhaustive list of examples of sensing devices 201C includes motion sensors, load cells, force sensors, light sensors, temperature sensors, physiological sensors, energy sensors, and network sensors.

The multi-channel device interface 202 includes an application layer, presentation layer, and/or data layer of a software application. The multi-channel device interface 202 manages and facilitates electronic and/or electromagnetic communications between the environment 201 and the multi-agent system 204. In some examples, responsive to receiving signals via one or more components of the environment 201, the multi-channel device interface 202 provides portions of the signals to components of the multi-agent system 204 and provides portions of output produced by components of the multi-agent system 204 to the environment 201. Such output includes digital data such as textual or multimodal content. In some examples, the output provided by the multi-channel device interface 202 to the environment 201 includes digital content (e.g., search results, recommendations, user interface elements) capable of being presented to the user via a graphical or multimodal user interface at one or more user devices 201A.

The multi-agent system 204 includes multiple different agents that each execute discrete tasks autonomously or semi-autonomously. The multi-agent system 204 includes an observer agent 206, an orchestrator agent 208, a query input agent 212, a query execution agent 214, a result evaluation agent 216, and an action agent 218.

The observer agent 206 is an event processing system that includes an event listener and an event handler. The event listener subscribes to different types of events that occur during operation of the multi-agent system so that occurrences of those events trigger the event handler to send information about the event occurrences to the observer agent 206.

The orchestrator agent 208 monitors and coordinates the operations of the query input agent 212, the query execution agent 214, the result evaluation agent 216, and the action agent 218. The orchestrator agent 208 includes a query learning component 210. The query learning component 210 executes query learning processes such as those described with reference to query learning component 130 of FIG. 1.

The query input agent 212 obtains query input and interfaces with the GMLM 230 to produce a query input summary. The query input agent 212 includes a calibration and refinement component 220. The calibration and refinement component 220 operates in coordination with the query learning component 210 to calibrate and refine the query input summary. The query input agent 212 executes processes for obtaining query input and generating query input summaries such as those described with reference to determine query input component 118 of FIG. 1. Examples of calibration and refinement processes executable by the calibration and refinement component 220 are described with reference to FIG. 3.

The query execution agent 214 obtains the query input summary, converts the query input summary to an executable source query as needed, generates or obtains subqueries of the source query, and executes the subqueries in parallel. The query execution agent 214 performs query execution processes such as those described with reference to the execute query component 134 of FIG. 1. An example of managing multiple different source query is described with reference to FIG. 9A.

The query execution agent 214 includes a thread management component 222. The thread management component 222 assigns thread identifiers to each of the subqueries and spawns the threads for executing the subqueries asynchronously. The thread management component 222 stores information about the threads, the associated source query, and the associated subquery executions in a data store to facilitate the parallel processing not only of the subqueries associated with the source query but also asynchronous processing and thread management for other source queries.

This enables the multi-agent system 204 to manage multiple different source queries at once.

The result evaluation agent 216 obtains the query results produced by the parallel execution of the subqueries associated with the source query and interfaces with the GMLM 230 to produce query result evaluation summaries. The result evaluation agent 216 includes a multi-level fit summarization component 224. The multi-level fit summarization component 224 performs at least two different types or levels of fit measurement for each query result. In some examples, the multi-level fit summarization component 224 generates a per-query term fit measurement and a per-query result fit summary. Examples of per-query term fit measurements and per-query result fit summaries are described with reference to FIG. 9D1, FIG. 9D2, and FIG. 9E. The result evaluation agent 216 performs query result evaluation processes such as those described with reference to the evaluate query results component 142 of FIG. 1.

The action agent 218 performs one or more downstream actions using one or more of the query result evaluation summaries produced by the result evaluation agent 216. The action agent 218 includes a contextualization component 226. The contextualization component 226 retrieves and maintains context data associated with the query result for which a downstream action is to be performed. Examples of downstream actions include using the GMLM 230 to generate follow-up questions or message drafts, and adding the query result to a pipeline for subsequent processing. In some examples, the contextualization component 226 uses the fit evaluation summary for the query result to filter a list of follow-up questions such that questions that are already answered by the fit evaluation summary are excluded from the list of follow-up questions.

The data stores 228 are capable of storing information and content used by the various agents and components of the multi-agent system 204, such as context data store 102, prompt data store 105, content data store 106, subquery data stores 135, described with reference to FIG. 1, and/or a thread data store used by thread management component 222. The GMLM 230 is a generative machine learning model capable of performing the functions described with reference to the GMLM 116 of FIG. 1.

In operation, the observer agent 206 receives signals from different components of the environment 201 and provides those signals to the orchestrator agent 208 or to query input agent 212. Signal 1A represents a signal that is received from the environment 201 via multi-channel device interface 202 and communicated from the observer agent 206 to query input agent 212. In some examples, the signal 1A contains information about a specific entity, such as a profile of a specific job applicant or a selected query result. The signal 1A is processed by the multi-agent system 204 in a similar manner as search request signals except that portions of the query execution may be omitted so that the information associated with the signal 1A is obtained by the query input agent 212, evaluated by the result evaluation agent 216, and acted upon by the action agent 218.

Signal 1B represents a signal that is received from the environment 201 via multi-channel device interface 202 and communicated from the orchestrator agent 208 to the query input agent 212. In some examples the signal 1B contains a search request, e.g., one or more query terms. The orchestrator agent 208 invokes the query input agent 212 to interface with the GMLM 230 to parse and create a query input summary based on the signal 1A or the signal 1B, as the case may be.

The query input agent 212 sends signal 2 to the GMLM 230. The signal 2 is to cause the GMLM 230 to generate and output the query input summary; e.g., the signal 2 includes a query input summarization prompt. The GMLM 230 sends signal 3 to the query input agent 212 when the GMLM 230 has finished generating the query input summary.

The query input agent 212 sends signal 4 to the orchestrator agent 208 in response to the query input agent 212 receiving the signal 3 from the GMLM 230. In some examples, the orchestrator agent 208 invokes the query learning component 210 in response to signal 4. Query learning component 210 sends signal 4A to the query input agent 212. Signal 4A includes learning produced by query learning component 210 in response to signal 4. In some examples, signal 4A includes information to be added to or deleted from the query input summary. In response to an occurrence of signal 4A, query input agent 212 repeats the process of generating the query input summary using the signal 4A, such that the resulting output is a subsequent version of the query input summary that incorporates the learning represented by signal 4A.

The orchestrator agent 208 invokes the query execution agent using signal 5. Signal 5 includes the query input summary produced by query input agent 212 in coordination with GMLM 230. The query execution agent 214 uses the query input summary to determine a source query. The query execution agent 214 sends signals 6 to the GMLM 230. Each of the signals 6 corresponds to a different subquery of the source query; e.g., a different query execution prompt. The GMLM 230 returns signals 7 to the query execution agent in response to the signals 6. Each of the signals 7 includes a result subset that corresponds to one of the different subqueries of the source query. Collectively, the result subsets represented by the signals 7 are referred to as a query result set or batch.

In some examples, the query execution agent 214 repeats the process indicated by signals 6 and signals 7 to produce multiple batches of query results, where each batch of query results contains a number of result subsets corresponding to different subqueries. The number of subqueries executed in parallel by the query execution agent is variable according to the requirements of a particular design or implementation of the multi-agent system 204, and/or is variable based on learnings produced by query learning component 210.

When query execution agent 214 receives a batch from GMLM 230, query execution agent 214 sends signal 8 to orchestrator agent 208. Signal 8 indicates to the orchestrator agent 208 that the batch is completed. In some examples, the orchestrator agent 208 invokes the query learning component 210 in response to signal 8. Query learning component 210 sends signal 8A to the query execution agent 214. Signal 8A includes learning produced by query learning component 210 in response to signal 8. In some examples, signal 8A includes information to be added to or deleted from the source query and/or subqueries. In response to an occurrence of signal 8A, query execution agent 214 repeats the process of generating query results using the signal 8A, such that the resulting output is a subsequent version of the query results that incorporates the learning represented by signal 8A.

For each batch of query results for which orchestrator agent 208 has received a signal 8, the orchestrator agent 208 invokes the result evaluation agent 216 via a signal 9. The result evaluation agent 216 sends the batch to the GMLM 230 via a signal 10, e.g., a query result evaluation prompt. The GMLM 230 ranks the query results in the batch, generates and outputs a query result evaluation summary for each query result in the batch, and provides the query result evaluation summaries to result evaluation agent 216 via a signal 11. Each query result evaluation summary includes a verbal and/or graphical explanation of a fit measurement that measures a comparison of the query result to the query input summary. In some examples, each query result evaluation summary includes, for a given query result, a classification label (e.g., good fit, poor fit, possible fit), a summary of aspects of the query result that match aspects of the query input summary, and an explanation of how the aspects of the query result match the aspects of the query input summary.

The result evaluation agent 216 sends (e.g., pushes) the query result evaluation summaries for all of the query results in the batch to a query result data store and/or to action agent 218. The query result data store is a portion of data stores 228 that is accessible to result evaluation agent 216. The query evaluation agent 214 invokes the orchestrator agent 208 via a signal 12 (e.g., an agent callback). The signal 12 indicates to the orchestrator agent 208 that the query result evaluation process is finished for the batch. The query result evaluation is an asynchronous process.

In some examples, the query result evaluation summaries include JSON representations of the verbal summaries and explanations. These representations are processable by, e.g., one or more channels of the multi-channel device interface 202, into a format suitable for presentation to the user.

Examples of fit classification labels capable of being applied to {query input summary, query result} pairs include "good fit," "might be a fit," "not a good fit," etc.

An example of a query result evaluation summary capable of being produced by the GMLM 230 in response to a query result evaluation prompt, is "This candidate is a good fit because they have demonstrated strong product intuition through their role as a product consultant, have a design sense indicated by their skill with SoftwareA, and have made technical architecture decisions as part of their product management experience. They have a proven track record of data-driven product decisions through their data analysis skills and show an understanding beyond data and A/B tests with their problem-solving abilities."

In some examples, the orchestrator agent 208 invokes the query learning component 210 in response to signal 12. Query learning component 210 sends signal 12A to the result evaluation agent 216. Signal 12A includes learning produced by query learning component 210 in response to signal 12. In some examples, signal 12A includes information to be added to or deleted from one or more of the query result evaluation summaries. In response to an occurrence of signal 12A, query result evaluation agent 216 repeats the process of generating query result evaluation summaries using the signal 12A, such that the resulting output is a subsequent version of the query result evaluation summaries that incorporates the learning represented by signal 12A.

In some examples, the orchestrator agent 208 invokes one or more action agents 218 in response to a signal 12 or a signal 12A, via a signal 13. An action agent is an agent that performs a downstream task, e.g., a task subsequent to the query results evaluation. In some examples, an action agent 218 organizes query results for presentation to a user via a user interface and causes the presentation of one or more of the evaluated query results via one or more devices. In some examples, an action agent 218 sorts or ranks evaluated query results using the query evaluation output of the query result evaluation agent.

In some examples, an action agent 218 performs a downstream action in response to a signal received via a device, such as a user selection or feedback. The signal 13 identifies one or more query results that have been evaluated and presented to the user. In some examples, the signal 13 identifies a query result that has been selected for further processing via the multi-channel device interface 202. In response to a signal 13, the action agent 218 performs a downstream action using one or more query results identified in the signal 13. In some examples, the downstream action includes invoking the GMLM 230 via a signal 14. In response to a signal 14, the GMLM 230 returns output to action agent 218 via a signal 15. In some examples, the output of GMLM 230 included in signal 15 includes one or more interview questions, e.g., questions that a recruiter or hiring manager is to ask of a job candidate.

The action agent 218 sends a signal 16 to the orchestrator agent 208 when the downstream action is finished. In some examples, the orchestrator agent 208 invokes the query learning component 210 in response to signal 16. Query learning component 210 sends signal 16A to the action agent 218. Signal 16A includes learning produced by query learning component 210 in response to signal 16. In some examples, signal 16A includes information to be added to or deleted from the GMLM output produced in response to signal 14. In response to an occurrence of signal 16A, action agent 216 repeats the process of executing the downstream action using the signal 16A, such that the resulting output is a subsequent version of the GMLM output produced by the GMLM 230 in response to the signal 14, which incorporates the learning represented by signal 16A.

The examples shown in FIG. 2 and the accompanying description are provided for illustration purposes. This disclosure is not limited to the described examples.

FIG. 3 is a component-based flow diagram of an example method for query execution in accordance with some examples of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 300 is performed by the computing system components shown in FIG. 3. In other examples, portions of the method 300 are performed by the computing system components shown in FIG. 1, FIG. 2, FIG. 4, FIG. 5, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In FIG. 3, the method 300 is represented by arrows connecting components of a computing system. The computing system includes a generate query component 306, an execute query component 308, an evaluate query results component 310, an execute downstream action component 312 a threshold met decision block 314, a generative machine learning model (GMLM) 316, and data stores 316. The components of the computing system are arranged into a calibration loop 302 and a refinement loop 304.

The generate query component 306 interfaces with GMLM 318 to generate a query, e.g., a query input summary. The generate query component 306 is capable of performing operations described with reference to query input agent 212 of FIG. 2.

The execute query component 308 interfaces with GMLM 318 to execute the query produced by the generate query component 306. The execute query component 308 is capable of performing operations described with reference to query execution agent 214 of FIG. 2.

The evaluate query results component 310 interfaces with GMLM 318 to evaluate query results produced by the execute query component 308. The evaluate query results component 310 308 is capable of performing operations described with reference to result evaluation agent 216 of FIG. 2.

In some examples, the execute downstream action component includes presenting query results and their respective evaluation summaries to the user and obtaining feedback from the user on the presented query results. Alternatively or in addition, execute downstream action component 312 interfaces with the GMLM 318 to execute one or more additional downstream actions on one or more of the query results evaluated by the evaluate query results component 310. The execute downstream action component 312 is capable of performing operations described with reference to action agent 218 of FIG. 2.

The threshold met decision block 314 controls the flows of the calibration loop 302 and the refinement loop, respectively. The decision block 314 is capable of performing operations described with reference to query learning component 210 of FIG. 2 or the method 600 described with reference to FIG. 6. In some examples, the decision block 314 is implemented as part of an orchestrator agent, such as orchestrator agent 206 described with reference to FIG. 2.

The data stores 316 are capable of storing information and content such as described with reference to data stores 228 of FIG. 2. The GMLM 318 is a generative machine learning model capable of performing the functions described with reference to the GMLM 230 of FIG. 2.

The calibration loop 302 ensures that a result set to be presented to the user contains a threshold number of query results that have a threshold evaluation classification or fit score. In some examples, the calibration loop 302 is used to create a "short list" of query results. The calibration loop 302 is completed before any query results are presented to the user. In the calibration loop 302, the decision block 314 (e.g., orchestrator agent) determines whether a threshold number of query results have a threshold classification or fit level, e.g., whether there are at least a minimum number of query results that have a "good fit" evaluation or a fit score that exceeds a threshold value. The threshold number of query results and the threshold classification or fit level are variable according to the requirement of a particular design or implementation of the computing system.

To make the calibration determination, the decision block 314 receives a batch of query results and their associated evaluation summaries, including classification labels or fit scores, from the evaluate query results component 310. If the calibration threshold is met at decision block 314, the query results or a subset of the query results selected based on the fit scores, and their respective evaluation summaries, including classification labels or fit scores, are provided to the execute downstream action component 312.

If the calibration threshold is not met at decision block 314, control is passed to the execute query component 308 to obtain a subsequent batch of query results and the respective result evaluation summaries, and the calibration loop 302 is repeated using the subsequent batch of query results and their respective evaluation summaries.

The refinement loop 304 occurs after the calibration loop 302 has finished and query results have been presented to the user. In the refinement loop 304, user feedback signals are obtained for query results presented to the user via, e.g., execute downstream action component 312. The feedback signals are received via, e.g., a listening component such as observer agent 206 described with reference to FIG. 2.

In response to user feedback, the threshold decision block 314 determines whether the received user feedback satisfies a refinement threshold such as a threshold amount of user feedback. In some examples, the refinement threshold indicates a minimum amount of information needed to determine whether the received feedback represents a positive signal (e.g., user approval) or a negative signal (e.g., user disapproval). In some examples, a regression model is trained to classify or score the received feedback, where the classification label or score is used to determine whether the feedback is positive or negative, or indeterminate. If the received user feedback satisfies the refinement threshold, control is passed to the generate query component 306 to enable the generate query component 306 to modify the query input summary based on the feedback and its corresponding classification (e.g., positive or negative). Alternatively or in addition, the feedback is passed to the execute query component 308 to enable the execute query component 308 to modify the source query and/or subqueries based on the feedback. If the received user feedback does not satisfy the refinement threshold (e.g., whether the feedback is positive or negative cannot be determined), control is returned to the execute downstream action component 312 to enable the collection of additional user feedback.

In some examples, user feedback received via the refinement loop 304 conflicts with the result evaluation summaries produced by the evaluate query results component 310 and the GMLM 318. If a conflict between the user feedback and the GMLM-generated result evaluation summaries is detected, the user feedback overrides the GMLM-generated result evaluations. Accordingly, in some examples, only the user feedback and not the GMLM-generated result evaluations is used to create subsequent versions of the query input summary. In some examples, both the user feedback and the GMLM-generated result evaluations are usable to create subsequent versions of the source query and/or subqueries.

The examples shown in FIG. 3 and the accompanying description are provided for illustration purposes. This disclosure is not limited to the described examples.

Figure 4:
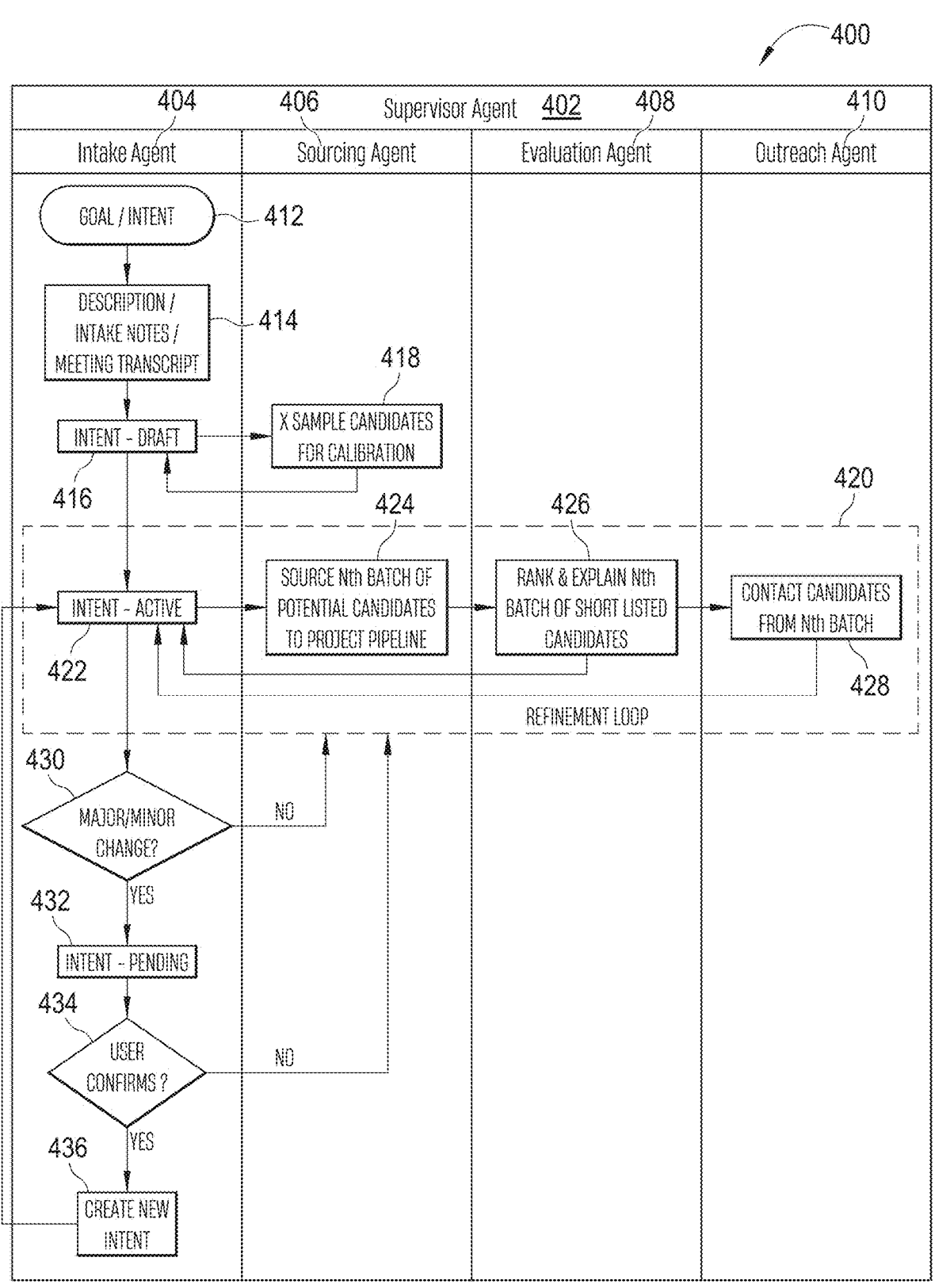
FIG. 4 is a component-based flow diagram of an example method for query execution using a multi-agent system in accordance with some examples of the present disclosure.

FIG. 4 is a component-based flow diagram of an example method for query execution using a multi-agent system in accordance with some examples of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 400 is performed by the computing system components shown in FIG. 4. In other examples, portions of the method 400 are performed by the computing system components shown in FIG. 1, FIG. 2, FIG. 3, FIG. 5, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In FIG. 4, the multi-agent system is used to support a hiring platform through which job candidates can be identified and contacted. The multi-agent system of FIG. 4 includes a supervisor agent 402, an intake agent 404, a sourcing agent 406, an evaluation agent 408, and an outreach agent 410. The supervisor agent 402 is capable of performing operations described with reference to the orchestrator agent 208 of FIG. 2. The intake agent 404 is capable of performing operations described with reference to the query input agent 212 of FIG. 2. The sourcing agent 406 is capable of performing operations described with reference to the query execution agent 214 of FIG. 2. The evaluation agent 408 is capable of performing operations described with reference to the result evaluation agent 216 of FIG. 2. The outreach agent 410 is capable of performing operations described with reference to the action agent 218 of FIG. 2.

Different portions of the method 400 are performed by different agents of the multi-agent system. The supervisor agent 402 monitors and coordinates the operations of and communications with the other agents.

The method 400 begins at the intake agent 404. At operation 412, the intake agent 404 starts the process of determining a goal or intent, such as a search objective or query input summary, based on input signals from a user and/or context data associate with the user. Block 414 describes examples of input signals and/or context data that are usable to determine the goal or intent. These examples include descriptions, such as job descriptions; notes, such as intake notes; and meeting transcripts.

At operation 416, the intake agent 404 interfaces with a GMLM to cause the GMLM to generate and output a goal or intent using the input signals and context data. The goal or intent generated by the GMLM at operation 416 is labeled as a draft intent (e.g., a query input summary).

The intake agent 404 signals to the supervisor agent 402 that the draft intent is finished. The supervisor agent 402 initiates a calibration process involving the intake agent 404 and the sourcing agent 406. At operation 418, the sourcing agent 406 uses the draft intent to sample a threshold number of query results (e.g., job candidates) to be used for calibration. The calibration process includes determining the fit score or classification label for each query result in the sampled group and determining whether a sufficient number "X" of query results in the sampled group have a fit score or classification label above the calibration threshold.

In some examples, the fit score or classification label is determined using the results of the GMLM-based query results evaluation summary. In some examples, the calibration process contains decision logic that determines whether to continue or conclude the calibration process using the GMLM-based query results evaluations without computing a fit score or assigning a classification label. The calibration process returns to operation 416 to re-draft the intent if the sample does not contain at least X (where X is a positive integer) query results above the calibration threshold. At operation 416, the intake agent 404 generates a subsequent draft of the intent. The subsequent draft of the intent is provided to the sourcing agent and a second sample of query results is evaluated to determine if there are now at least X query results above the calibration threshold. The calibration process repeats until there are X query results above the calibration threshold. When the calibration threshold is satisfied, control is returned to the intake agent 404. At operation 422, the intent (e.g., the first draft of the intent or a subsequent draft of the intent created via the calibration process) is labeled as active.

In response to detecting an active intent, the supervisor agent 402 initiates a refinement loop 420. The refinement loop 420 includes multiple operations 422, 424, 426, 428 performed by multiple different agents 402, 404, 406, 408,

410. The active intent is passed to the sourcing agent 406. At operation 424, the sourcing agent generates a Nth (where N is a positive integer) batch of query results (e.g., potential job candidates).

The Nth batch of query results are passed to the evaluation agent 408. At operation 426, the evaluation agent 408 ranks the query results in the Nth batch (e.g., in order from highest fit score to lowest fit score) or groups the query results based on classification label (e.g., a good fit group, a possible fit group, and a poor fit group), selects a subset of the query results based on the classification labels or fit scores (e.g., selects the query results with the top k fit scores or the first k query results in the good fit group, where k is a positive integer), and uses the GMLM to generate verbal explanations and summaries of the fit scores and/or classification labels for the selected subset of the query results (e.g. the k selected query results).

The selected subset of k query results is sometimes referred to as the shortlisted candidates or as a short list. At operation 428, the outreach agent 410 generates draft communications to the shortlisted candidates identified by the evaluation agent 408 and, with the user's permission, initiates the sending of the communications to those candidates.

As part of the refinement loop 420, one or more signals relating to the output of operations 426 and 428 are provided to a learning process operated by the supervisor agent 402. As a result of application of the learning process to output of operation 426 and/or operation 428 the active intent is modified, in some examples.

At the intake agent 404, the learning process includes operations 430, 432, 434, and 436. At operation 430, the intake agent 404 determines whether the signals relating to the output of operations 426 and/or 428 indicate that the active intent needs to be revised. If the intake agent 404 determines that the active intent does not need to be revised, the flow returns to the refinement loop. If the intake agent 404 determines that the active intent needs to be revised, then at operation 432 the intent is modified to create a draft of a subsequent version of the intent, and status of the intent is changed from active to pending.

Because the refinement loop leading to a revision of the intent is fully autonomous, the learning process includes a decision block 434. In some examples, fully autonomous refers to a process, machine, device, agent, etc., is capable of operating independently without human intervention; e.g., decisions and actions are executed based on data collected, programmable logic, and/or machine learning model output, e.g., GMLM output.

At decision block 434, the intake agent 404 determine whether the user has confirmed the draft of the subsequent version of the intent. If the user does not confirm the revision to the intent, the flow returns to the refinement loop. If the user confirms the revision to the intent, the subsequent version of the intent is created at operation 436 and the flow returns to operation 422, where the subsequent version of the intent is now labeled as the active intent. The versioning of the intent and tracking of revisions to the intent are performed by the intake agent 404. In some examples, the intake agent 404 has an associated data store that is used to track and maintain the intent versions.

The examples shown in FIG. 4 and the accompanying description are provided for illustration purposes. This disclosure is not limited to the described examples.

Figure 5:
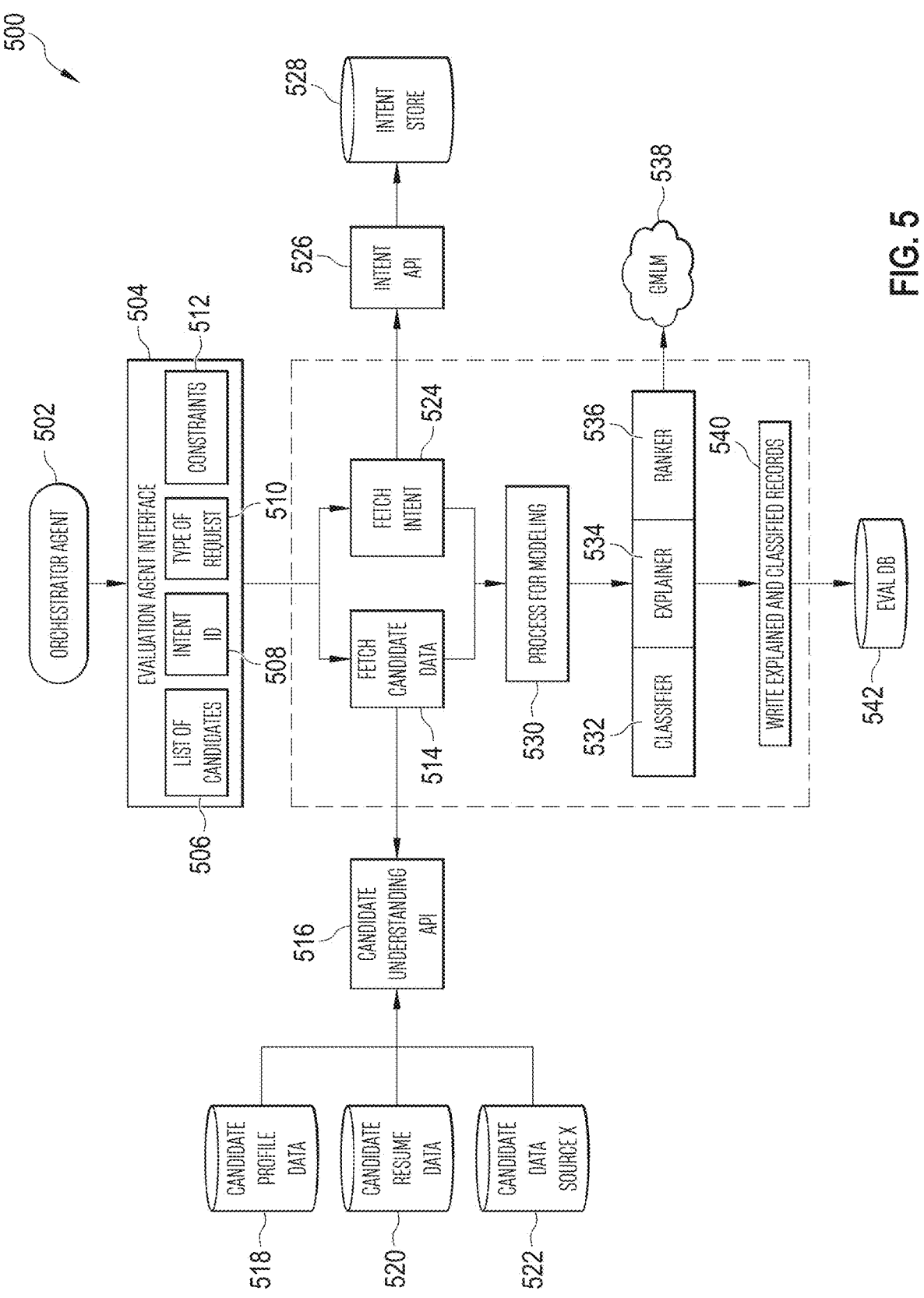
FIG. 5 is a component-based flow diagram of an example method for query result evaluation using a multi-agent system in accordance with some examples of the present disclosure.

FIG. 5 is a component-based flow diagram of an example method for query result evaluation using a multi-agent system in accordance with some examples of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 500 is performed by the computing system components shown in FIG. 5. In other examples, portions of the method 500 are performed by the computing system components shown in FIG. 1, FIG. 2, FIG. 3, FIG. 4, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In FIG. 5, the method 500 is represented by arrows connecting components of a multi-agent system. The multi-agent system of FIG. 5 is designed to support a search application for a hiring platform. The multi-agent system includes an orchestrator agent 502, an evaluation agent 504, a candidate understanding API, a candidate profile data store 518, a candidate resume data store 520, a candidate data source x 522, an intent API 526, an intent store 528, a generative machine learning model (GMLM) 538, and an evaluation database 542.

In the method 500, the orchestrator agent 502 passes a list of candidates 506, an intent identifier (ID) 508, a type of request 510, and constraints 512 to the evaluation agent 504 via an evaluation agent interface.

The evaluation agent 504 includes a fetch candidate data component 514, a fetch intent component 524, a process for modeling 530, a classifier 532, an explainer 534, a ranker 536, and a write explained and classified records component 540.

The list of candidates 506 includes all query results retrieved by, e.g., a sourcing or query execution agent in response to an intent or query input summary generated by an intake or query intent agent, where the intent is identified by the intent ID 508, the intent has an associated type of request 510 (e.g., a search category), and associated constraints 512 (e.g., access restrictions).

For all candidates in the list of candidates 506, the evaluation agent 504 performs the following operations: read and understand candidates based on their profile data 518 and resume data 520; resolve conflicting information between multiple data sources (e.g., data stores 518, 520, 522), such as resolving conflicting information between a profile and resume; and ranks the candidates based on match criteria, e.g., a measure of similarity between the intent and the candidate information. The intent is obtained from the intent store 528 via the fetch intent component 524, the intent API 526, and the intent ID 508. The candidate information is obtained from the data stores 518, 520, 522 via the fetch candidate data component 514 and the candidate understanding API 516. The evaluation agent 504 sorts the evaluated candidates into categories based on the rankings generated based on the match criteria and/or other criteria.

The intent incudes a list of qualification requirements, such as a list of skills and experience. The evaluation agent 504 generates, for each candidate, text-based evidence of how the candidate matches or does not match each qualification requirement. The match does not need to be an exact match. In some examples, if the requirement is "4+ YOE in B2B sales," a match could be, "The candidate has five years of experience in B2B sales."

The evaluation agent 504 generates text-based candidate highlights that summarize (e.g., in 1-2 sentences) reasons why the candidate matches the user's intent.

The evaluation agent 504 detects changes to the intent, e.g., modifications to the qualification requirements, updates the qualification requirements and applies the updated requirements to all candidates in the list of candidates 506 to re-rank and re-evaluate the candidates based on the changes to the intent.

In some examples, the list of candidates is provided to the evaluation agent 504 by the orchestrator agent 502 as a list of candidate identifiers, such as uniform resource names (URNs).

In some examples, the intent store 528 stores the intent ID and the intent version for each intent. In some examples, changes to the intent are evaluated to determine whether the change is a major change or a minor change. The criteria for determining whether a change is a major change or a minor change are variable depending on the requirements of a particular design or implementation. In response to a major change to the intent, the evaluation agent 504 creates a new version of the intent which is presented to the user for evaluation. In response to a minor change to the intent, the evaluation agent 504 creates a new version of the intent but does not present the new version of the intent to the user for evaluation, in some examples.

The versioned hiring intent includes or is associated with the list of qualification requirements. The list of qualification requirements are listed in natural language form. The qualification requirements are grouped into categories, in some examples, such as mandatory requirements and optional or preferred requirements. In some examples, qualification requirements are filters, e.g., facets, which can be used to narrow down the list of potential search results to improve the efficiency of the ranking process. To perform the per-candidate evaluations, the evaluation agent 504 stitches, e.g., concatenates, the fetched candidate data and the fetched intent information into a format that is usable for generating a classification for the candidate and an explanation of the classification.

The process for modeling 530 includes the classifier 532, the explainer 534, and the ranker 536, which interface with the GMLM 538. Given the candidate data stitched with the intent for a candidate, the process for modeling 530 generates and outputs a classification label or fit score via the classifier 532 and the explanation of the classification or fit score via the explainer 534, for that candidate.

In some examples, the classifier 532 includes a regression-based machine learning model trained to classify combinations of candidate data and intent into categories such as good, maybe, bad. In some examples, the classifier 532 outputs a fit score instead of or in addition to the classification label, e.g., a higher fit score indicates a better fit and a lower fit score indicates a worse fit between the candidate data and the intent. In some examples, the GMLM 538 is used as the classifier 532, e.g., a prompt is specifically formulated to cause the GMLM 538 to output a classification label or fit score in response to input of a combination of candidate data and intent.

The explainer 534 uses the GMLM 538 to generate the explanation of the classification or fit score, e.g., a prompt is specifically formulated to cause the GMLM 538 to generate and output the explanation based on, e.g., the combination of candidate data, intent, and the fit score or classification label.

The ranker 536 sorts or groups the candidates based on the classification labels or fit scores output by the classifier 532. The ranked list of candidates and associated explanations is stored in the evaluation database 542. The evaluation agent 504 provides lists of candidates, e.g., a list of URNs stored in the evaluation database 542, to the orchestrator agent 502. The list of URNs is grouped according to the classification labels in some examples, e.g., into good, maybe, and bad groups or sub lists.

The examples shown in FIG. 5 and the accompanying description are provided for illustration purposes. This disclosure is not limited to the described examples.

Figure 6:
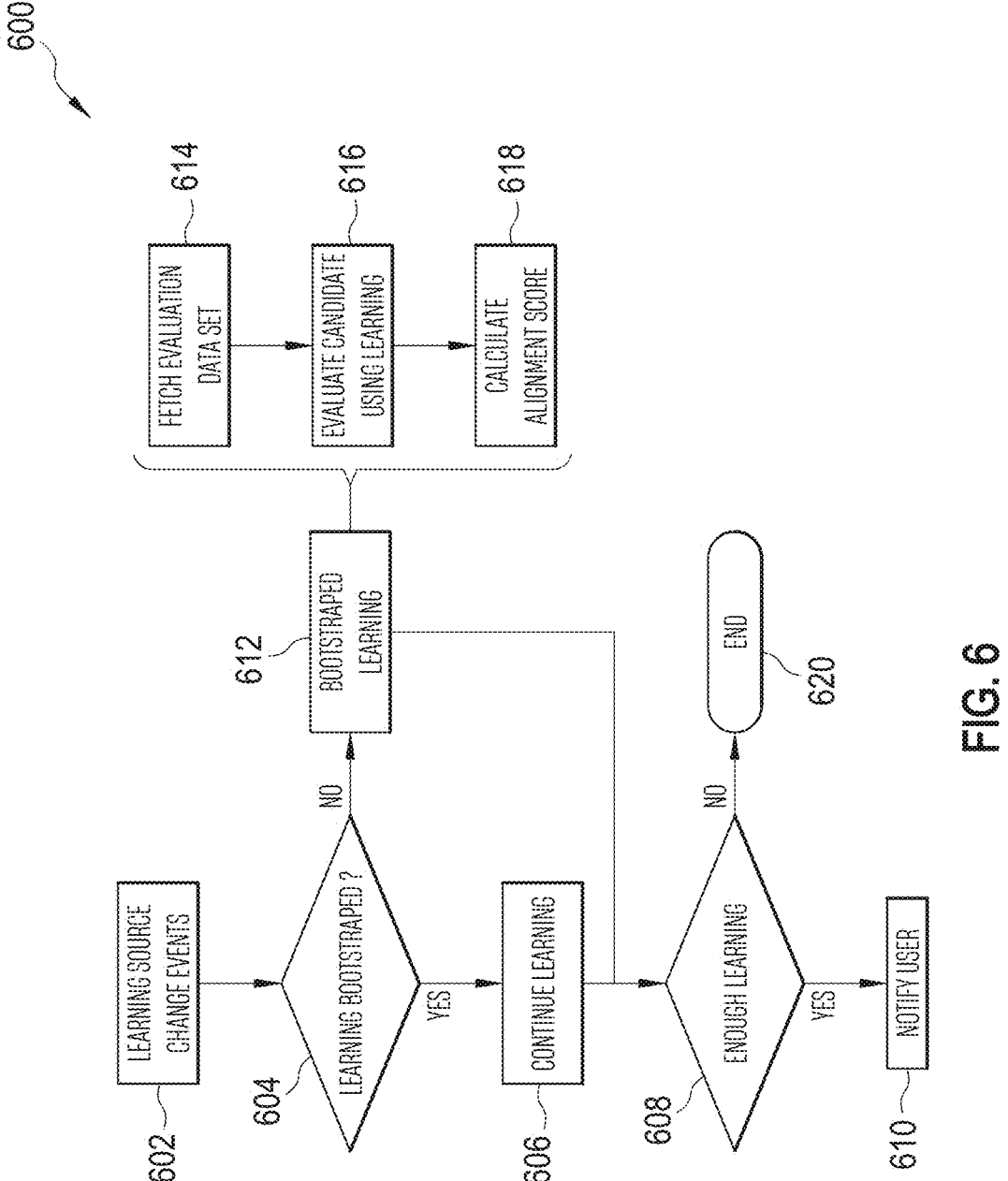
FIG. 6 is a flow diagram of an example method for query learning in accordance with some examples of the present disclosure.

FIG. 6 is a flow diagram of an example method for query learning in accordance with some examples of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 600 is performed by the computing system components shown in FIG. 6. In other examples, portions of the method 600 are performed by the computing system components shown in FIG. 1, FIG. 2, FIG. 4, FIG. 5, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

Operation 602 initiates a listener, e.g., an observer agent, to track user activity in the search application to learn change events. The operation 602 is capable of tracking user activity across various channels, e.g., across different channels of the multi-channel device interface 104. User activity is learned at a global level across multiple users or in the aggregate per user, in accordance with user intent and/or other requirements. The tracked user activity is used to determine whether changes to the intent, e.g., the query input summary, are needed, either at the user-specific level or at a global level. Alternatively or in addition, the tracked user activity is used to determine whether changes to the source query, subqueries, or evaluation summaries are needed.

Query learning, e.g., intent or query input learning, includes a bootstrap learning phase and continuous learning. The bootstrap learning phase is used to initialize the learning based on historical activity data. In some examples, the continuous learning refines the intent based on live user activities during use of the search application. In some examples, the continuous learning refines the query result evaluation process, the query execution process, or any combination of the query intent determination, the query result evaluation, or the query execution process.

Operation 604 determines whether the bootstrap learning has been completed. If the bootstrap learning phase has not completed, the flow proceeds to operation 612. If the bootstrap learning phase has completed, the flow proceeds to operation 606. At operation 606, the continuous learning process is invoked.

Operation 608 performs a learning alignment evaluation. The learning alignment evaluation evaluates the learning algorithm itself using data produced by the user during use of the search application, e.g., production data, to ensure that the outputs produced by the algorithm are aligned with the user's actual activity.

The learning algorithm samples the production data to create a data set that includes ground truth or actual good fit and not good fit candidates. These samples are considered ground truth examples because they have been produced by the user during actual use of the application.

The ground-truth labeled candidates are input to the evaluation agent with the intent but without the ground-truth labels. The classification labels or scores generate by the evaluation agent are compared with the ground-truth labels obtained from the user activity. An alignment score is computed based on the comparison of the classification labels or scores produced by the evaluation agent with the ground truth labels obtained from the user.

Operation 608 compares the alignment scores with a threshold alignment score to determine whether to continue the learning process or end the learning process. The value of the threshold alignment score is variable according to the requirements of a particular design or implementation of the search application. If the alignment scores exceed the threshold alignment score, the flow advances to operation 620 where the learning ends. If the alignment scores do not exceed the threshold alignment score, the flow proceeds to operation 610, where the user is notified of the learning results. Other methods of determining whether to continue or end the learning process are used in other examples, such as determining whether a difference between the alignment score and the threshold value is increasing, decreasing, or remaining substantially unchanged from iteration to iteration of the learning process.

Operations 614, 616, 618 represent the learning alignment evaluation process described with reference to operation 608. While shown in connection with the bootstrap learning operation 612, the operations 614, 616, 618 are also used for continuous learning except that the evaluation data set is different.

Operation 614 fetches an evaluation data set. The evaluation data set includes historical activity data during the bootstrap learning phase and includes activity data collected during live use of the application during the continuous learning phase. The evaluate candidate using learning 616 sends the candidate data and associated intent to the evaluation agent to obtain a classification label or fit score generated by the evaluation agent. Operation 618 computes the alignment score using the output of the evaluation agent and the evaluation data set.

The learning process is capable of collecting information useful for learning user intent (e.g., tracked user activity), and/or performing other types of learning (e.g., query evaluation, query execution), from a variety of sources depending on the functionality of the specific search application. In some examples, sources of learning include job postings, screening questions, search queries, query refinements, information about query performance such as the number of candidates selected for downstream processing, saved, or messaging. These sources of learning are used to modify the user intent (e.g., the query input summary) if they are associated with good-performing queries.

The examples shown in FIG. 6 and the accompanying description are provided for illustration purposes. This disclosure is not limited to the described examples.

Figure 7A:
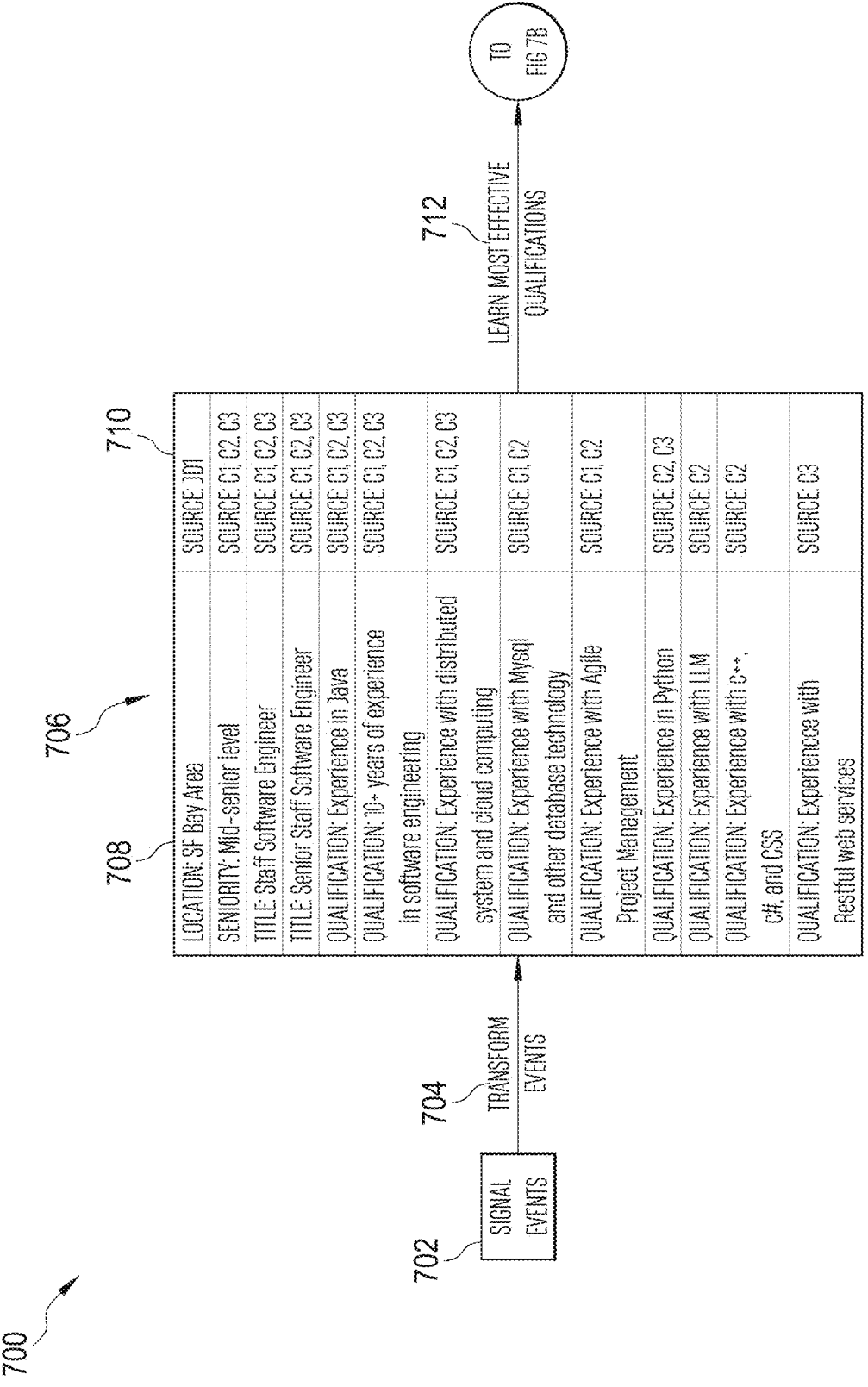
FIG. 7A and FIG. 7B are a schematic diagram of an example of query learning in accordance with some examples of the present disclosure.
Figure 7B:
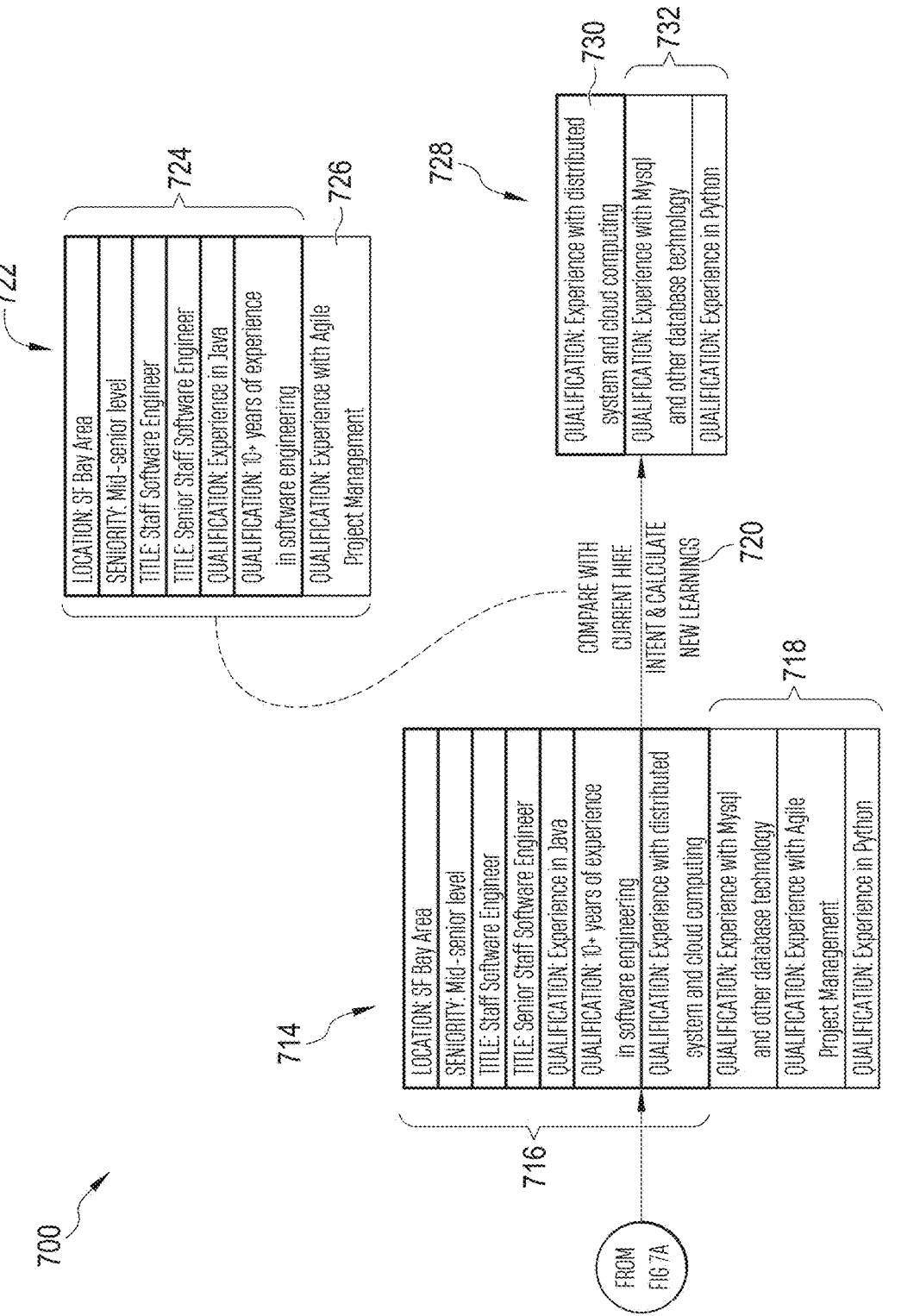

FIG. 7A, FIG. 7B are a schematic diagram of an example of query learning in accordance with some examples of the present disclosure.

A query learning example 700 illustrates how the query learning process is capable of learning from good fit and not good fit candidates during continuous online learning. To learn from good fig events, signal events 702 indicating good fit are transformed into a verbal representation 706 of the signal events. The verbal representation 706 includes query terms 708 (e.g., qualifications) and source identifiers 710 for each of the query terms 708. The verbal representation 706 is used to learn the most effective query terms, e.g., the most common qualifications associated with the good fit candidates. These most common qualifications are stack ranked them by frequency of occurrence in the sources of learning. A GMLM is used to generalize qualifications such as education, years of experience etc., and to match or combine similar qualifications, such as distributed system, cloud computing, scalable system, etc. In the stack ranking, the most frequently occurring qualifications, e.g., qualifications 716 of table 714 are ranked higher than qualifications that occur less frequently in the signal events 702, e.g., qualifications 718, indicating that the qualifications 716 have a higher probability of corresponding to the user intent than the qualifications 718.

The same process is applied to not a good fit candidates in an inverse way. For example, if Java is a skill that appears in the descriptions of both good fit candidates and not a good fit candidates, that skill has a lower likelihood of being a good differentiator of user intent. Thus, qualifications that occur only in connection with good fit candidates and not in connection with not a good fit candidates are ranked more highly as a positive signal of user intent than qualifications that occur in both good fit candidates and not a good fit candidates. Qualifications that occur only in connection with not a good fit candidates and do not occur in connection with good fit candidates are ranked more highly as a negative signal of user intent than qualifications that occur in both good fit candidates and not a good fit candidates.

Tables 722 and 728 illustrate additional stack rankings based on fit. Table 728 results from a compare with current intent and calculate new learnings process 720 that also includes table 722 as evidence of the current intent. In table 722, qualifications 724 are considered stronger positive signals of user intent than qualification 726. In table 728, qualification 730 is determined to be a stronger positive signal of user intent than the qualifications 732.

The examples shown in FIG. 7A, FIG. 7B, and the accompanying description are provided for illustration purposes. This disclosure is not limited to the described examples.

Figure 8:
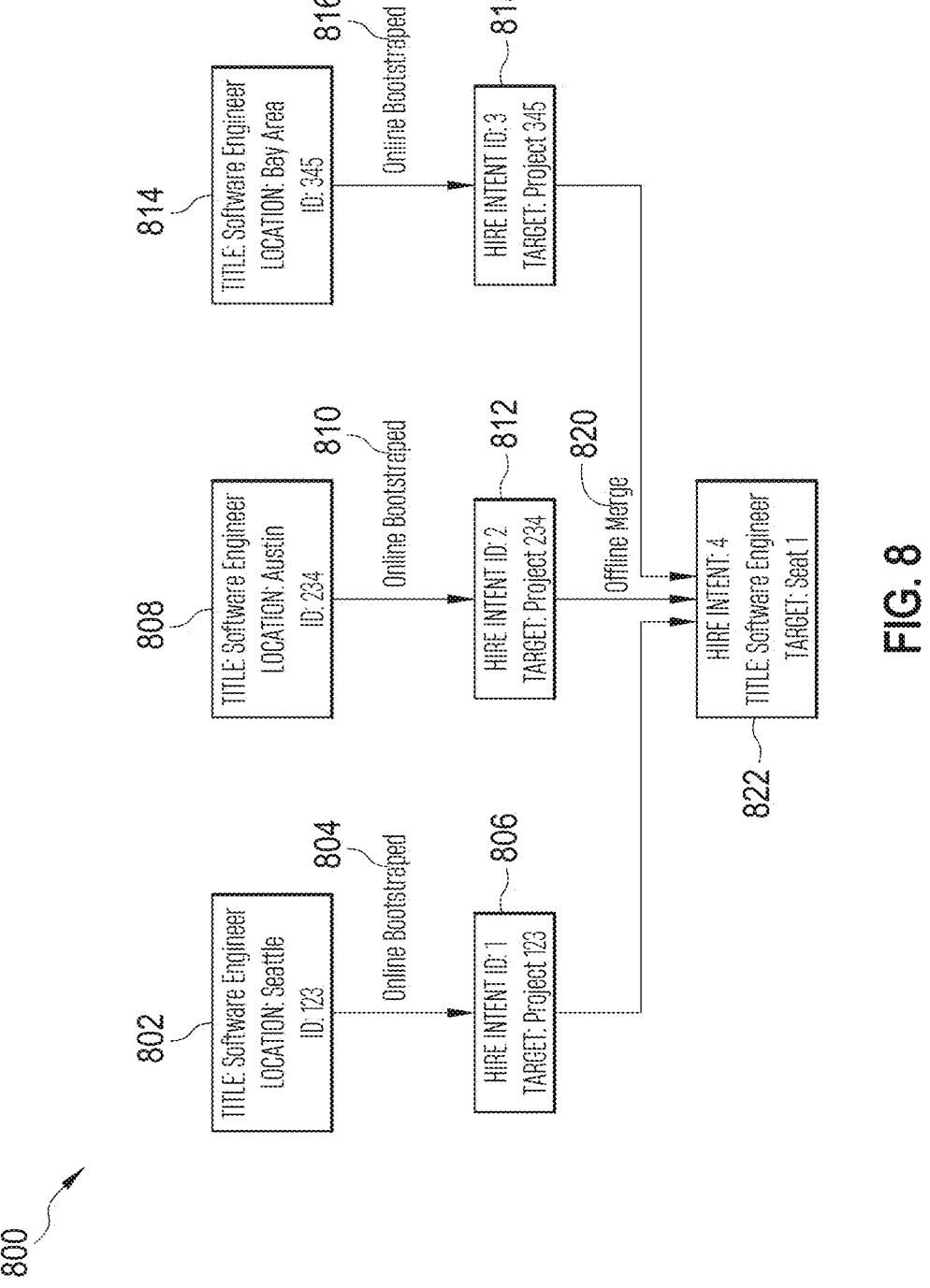
FIG. 8 is a schematic diagram of an example of query learning in accordance with some examples of the present disclosure.

FIG. 8 is a schematic diagram of an example of query learning in accordance with some examples of the present disclosure.

A query learning example 800 illustrates how query learning is capable of being used to aggregate and group learned intents based on common data values of qualifications. This example of query learning is implemented as an offline process in some examples. This example of query learning is useful for users who repeatedly perform the same or similar queries, and enables the search application to retain intent information across queries based on the query terms. In the example 800, a first query included the query terms 802, a second query included the query terms 808, and a third query included the terms 814.

Using the first query 802, an online bootstrapped learning 804 process produced intent data 806. Using the second query 808, an online bootstrapped learning process 810 produced intent data 812. Using the third query 814, an offline bootstrapped learning process produced intent data

818. An offline merge process 820 produces a learned intent 822 that includes the query term (software engineer) that is common to all three of the queries 802, 808, and 814.

The examples shown in FIG. 8 and the accompanying description are provided for illustration purposes. This disclosure is not limited to the described examples.

FIG. 9A, FIG. 9B, FIG. 9C, FIG. 9D1, FIG. 9D2, FIG. 9E, FIG. 9F, FIG. 9G, and FIG. 9H are screen captures of example user interface displays in accordance with some examples of the present disclosure.

FIG. 9A, FIG. 9B, FIG. 9C, FIG. 9D1, FIG. 9D2, FIG. 9E, FIG. 9F, FIG. 9G, and FIG. 9H illustrate examples of processes for query determination, execution, evaluation, and learning, including example depictions of graphical user interface elements, in accordance with some examples of the present disclosure. The user interfaces shown in FIG. 9A, FIG. 9B, FIG. 9C, FIG. 9D1, FIG. 9D2, FIG. 9E, FIG. 9F, FIG. 9G, and FIG. 9H are presented by an agent system, in some examples.

In the user interface examples shown in FIG. 9A, FIG. 9B, FIG. 9C, FIG. 9D1, FIG. 9D2, FIG. 9E, FIG. 9F, FIG. 9G, and FIG. 9H, certain data that would normally be displayed via the user interface is anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 9A, FIG. 9B, FIG. 9C, FIG. 9D1, FIG. 9D2, FIG. 9E, FIG. 9F, FIG. 9G, and FIG. 9H are presented to a user via one or more devices, e.g., by an application system. In some examples, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated examples, or to visual displays, or to graphical user interfaces.

Figure 9A:
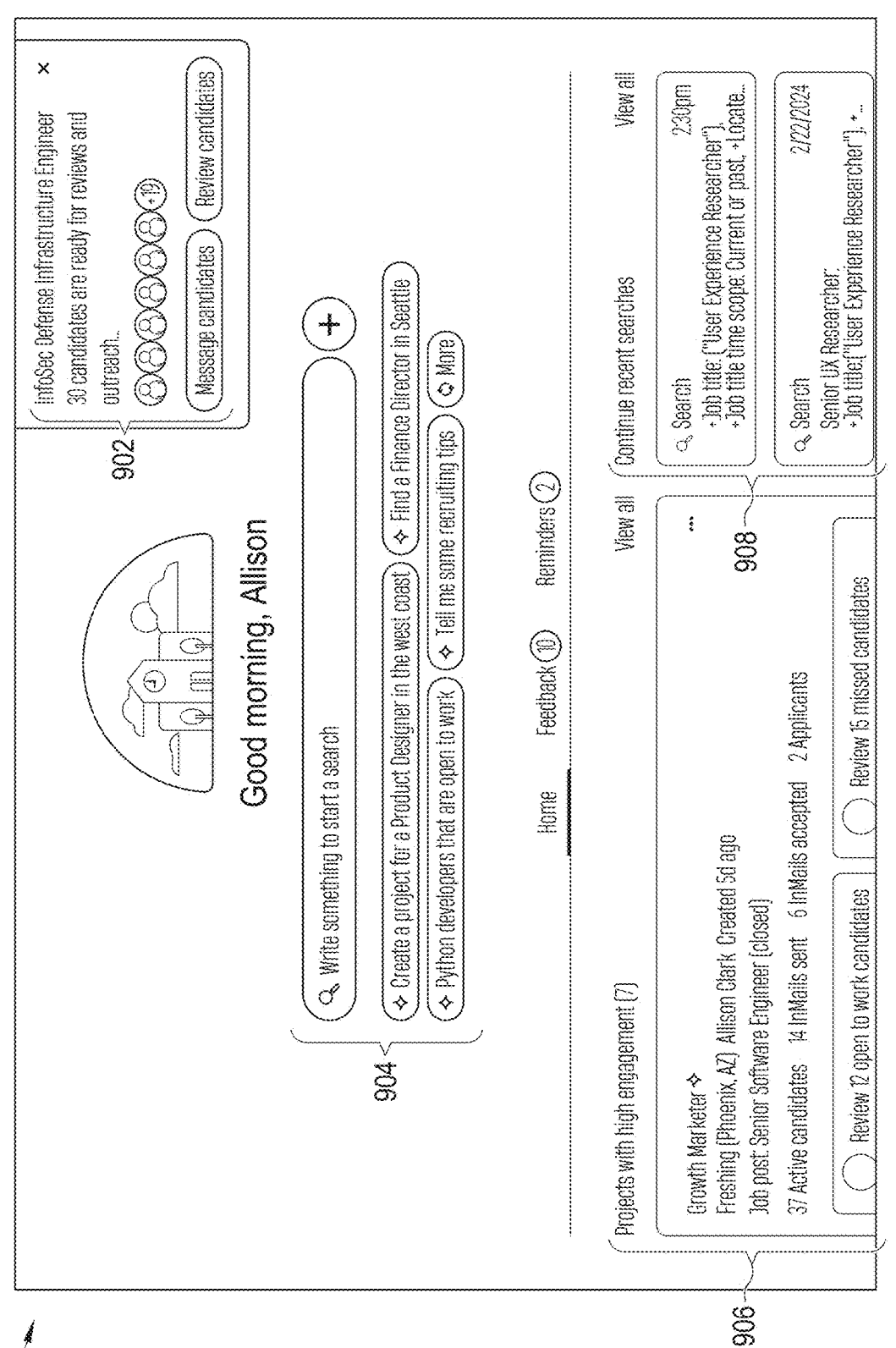

In FIG. 9A, a user interface 900 illustrates an example of a display screen that is capable of being presented to a user via, e.g., a user system. The user interface 900 illustrates a home page of a search application. User interface 900 includes display sections 902, 904, 906, 908. Each of the display sections 902, 904, 906, 908 displays information pertaining to different searches.

Display section 902 includes a notification relating to searches that have been performed autonomously using a query execution agent or sourcing agent of a multi-agent system. Display section 904 includes an input box to input information to start a search and suggested queries. The suggested queries are generated based on the user's context data, in some examples. Display section 904 is operated and managed using a query input agent or intake agent of a multi-agent system. Display section 906 incudes a status update on search projects that are in progress. Display section 908 includes a list of the user's recent search history, enabling the user to resume a previously started search. Display sections 906 and 908 are operated and managed using an orchestrator agent or supervisor agent as described herein, in some examples. The user interface 900 illustrates how the different agents of the multi-agent system are capable of operating asynchronously. For example, the query input agent is capable of initiating new searches while the query execution agent manages the execution of queries for a different project.

Figure 9B:
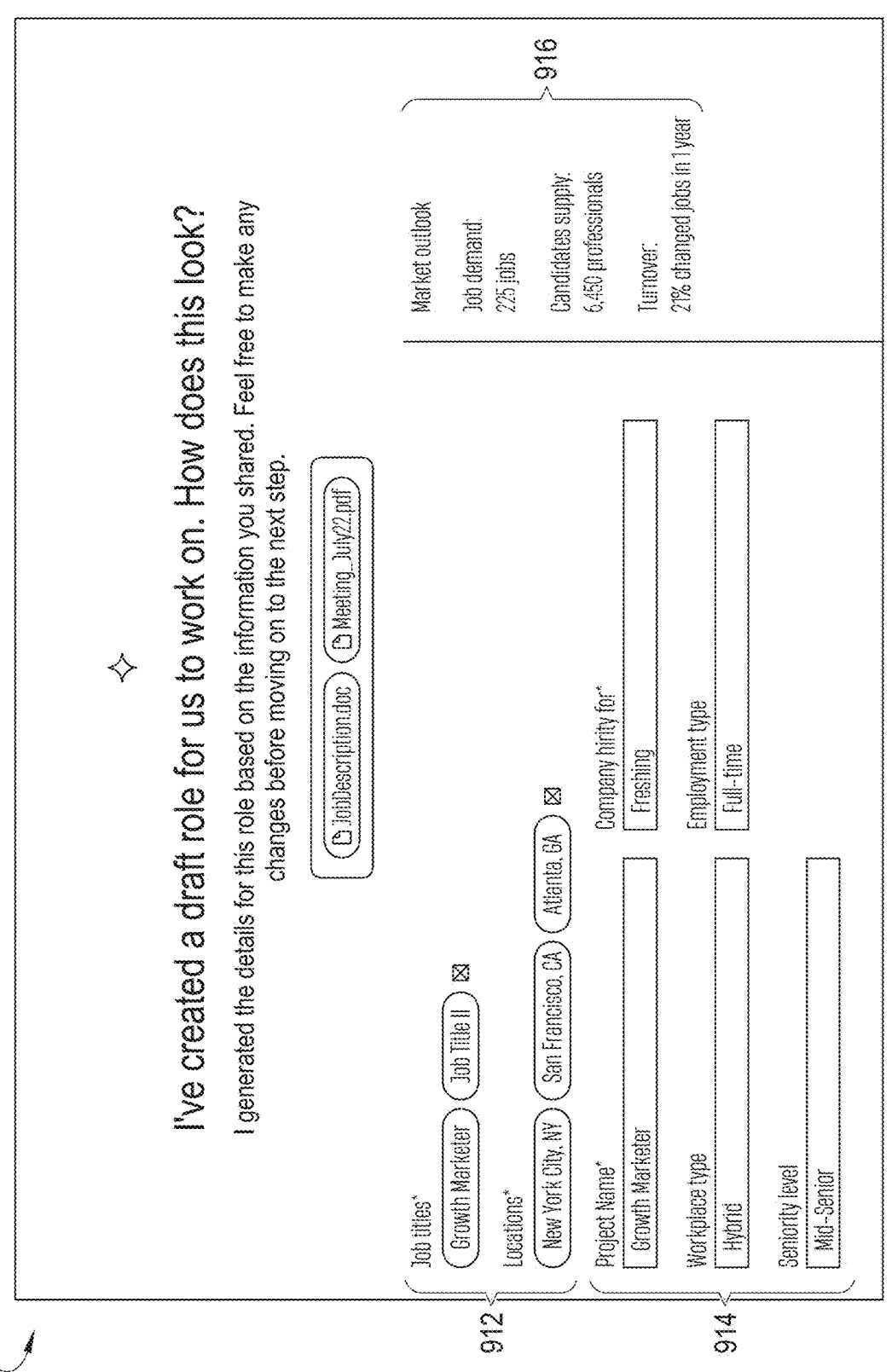

In FIG. 9B, a user interface 910 illustrates an example of a display screen that is capable of being presented to a user via, e.g., a user system. The user interface 910 illustrates an example of a first draft of a query input or intent. The user interface 910 is operated and managed using a query input agent or intake agent and a learning component of a multi-agent system as described herein, in some examples. The user interface 910 includes required query terms 912, optional query terms 914, and a summary of context data 916. Optional query terms 914 are displayed using input boxes to enable the user to modify the optional query terms 914 if desired.

Figure 9C:
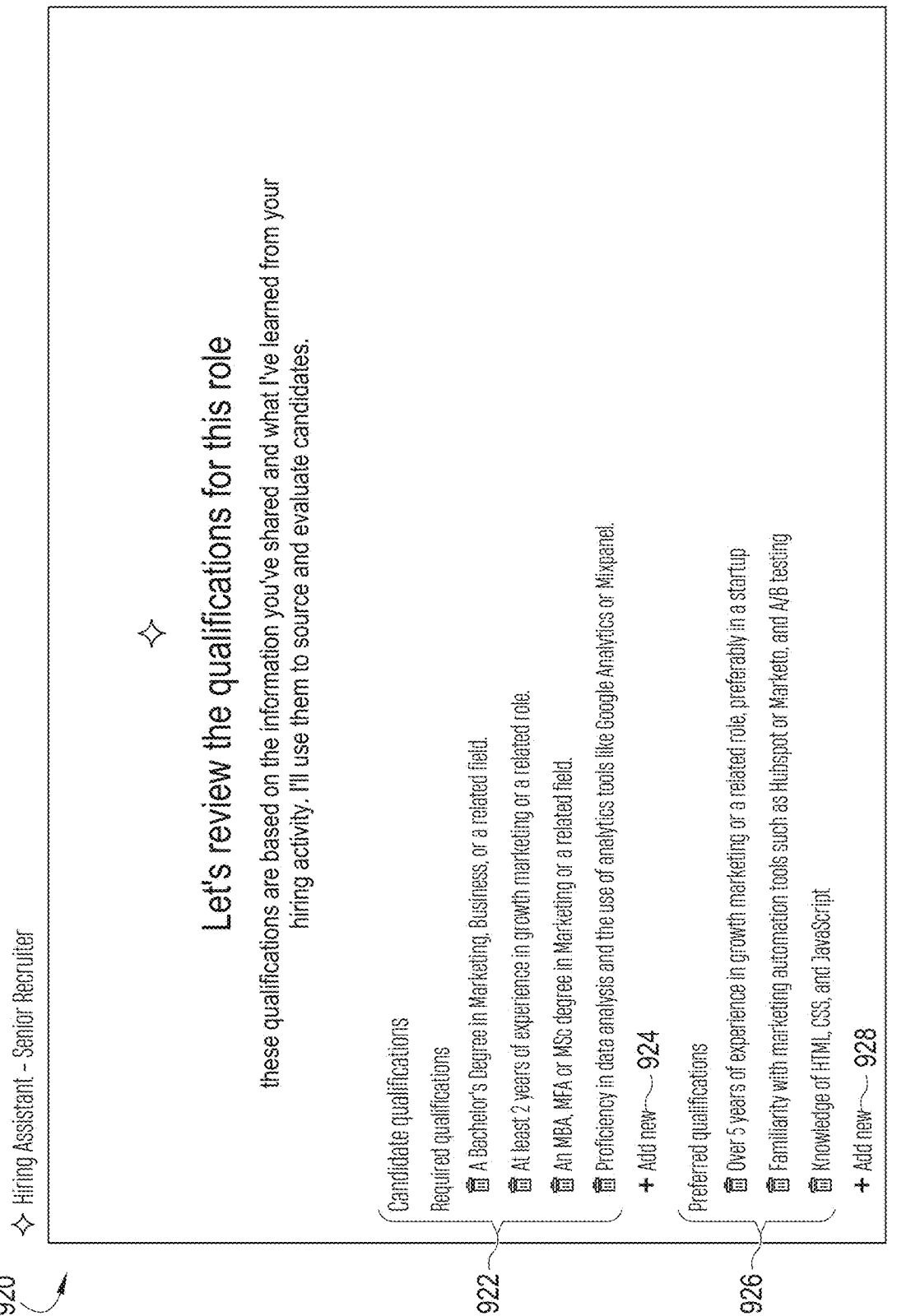

In FIG. 9C, a user interface 920 illustrates an example of a display screen that is capable of being presented to a user via, e.g., a user system. The user interface 920 illustrates an example of a query input summary, e.g., a summary of an "ideal" query or candidate. The query input summary of user interface 920 is generated and output by a GMLM in response to a query input summarization instruction. The query input summary includes a summary of required search terms or qualifications 922, a summary of optional or preferred search terms or qualifications 926, and user interface elements 924, 928 to enable the user to modify the required qualifications or search terms 922 and the optional or preferred search terms or qualification 926, respectively. The user interface 920 is operated and managed using a query input agent or intake agent and a learning component of a multi-agent system as described herein, in some examples.

In FIG. 9D1 and FIG. 9D2, a user interface 930 illustrates an example of a display screen that is capable of being presented to a user via, e.g., a user system. The user interface 930 illustrates an example of a display of a search result in combination with the corresponding result evaluation summary. The user interface 930 includes profile metadata 932 that identifies the search result, a first-level evaluation summary 934, an evaluation explanation 935, a second-level evaluation summary 936, a graphical second-level evaluation summary 937, and a profile summary 938. The first-level evaluation summary 934, an evaluation explanation 935, a second-level evaluation summary 936, a graphical second-level evaluation summary 937 each are generated and output by a GMLM in response to corresponding instructions formulated by a query result evaluation agent of a multi-agent system as described herein, in some examples.

The first-level evaluation summary 934 is generated in response to input of the second level evaluation summary 937 and a summarization prompt to the GMLM. The first-level evaluation summary 934 provides an overall summary of how well the search result matches the search criteria or qualifications, collectively. The evaluation explanation 935 provides an explanation for the classification label, e.g., the search result was classified as a "top candidate" because 5 out of 5 required qualifications specified in the query input summary were met and 2 out of 5 preferred qualifications specified in the query input summary were met.

The second-level evaluation summary 936 and graphical second-level evaluation summary 937 provide per-qualification evaluations of how well the search result matches each of the individual qualifications specified in the query input summary. The graphical second-level evaluation summary 937 indicates whether a particular qualification is met or not met by the search result. For example, a symbol such as a check mark is displayed next to a qualification to indicate that the search result matches that qualification. A different symbol such as a "x" is displayed next to a qualification if the search result does not match that qualification. Thus, the result evaluation agent in cooperation with the GMLM is capable of generating and outputting a multi-level result evaluation summary that includes an overall summary of how well the result matches the query input summary as well as a per-search term evaluation summary that indicates whether the particular search term is met by the result.

The profile summary 938 provides a summary of profile data associated with the search result. In some examples, the profile summary 938 is generated and output by the GMLM in response to an input that includes a summarization instruction and the full profile data associated with the search result.

Figure 9E:
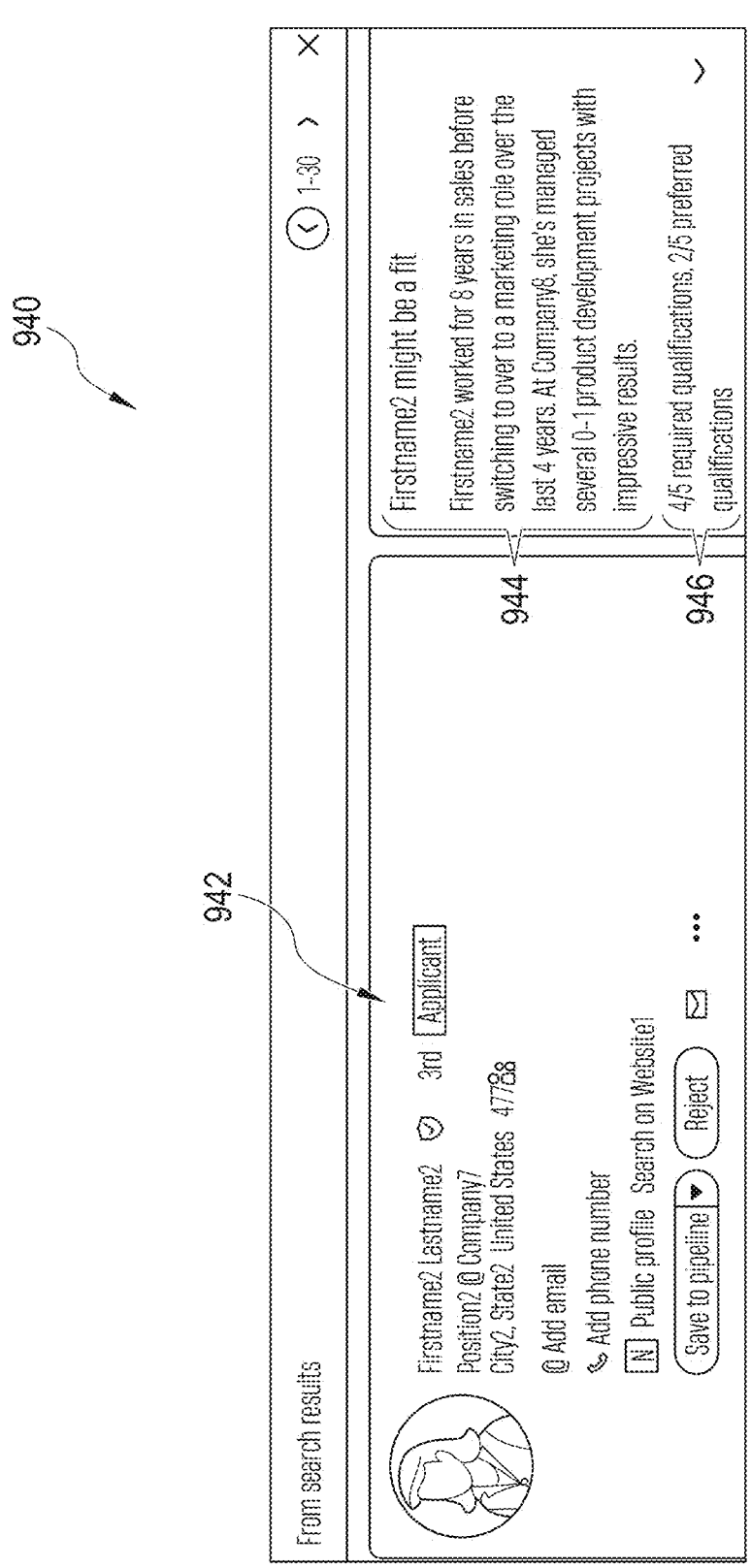

In FIG. 9E, a user interface 940 illustrates an example of a display screen that is capable of being presented to a user via, e.g., a user system. The user interface 940 identifies a search result 942. The user interface 940 includes a result evaluation summary 944 and an explanation 946. FIG. 9E is provided as another example of a result evaluation classification. Whereas FIG. 9D1, FIG. 9D2 illustrates a search result classified as a "top candidate" by the query result evaluation agent, FIG. 9E illustrates a search result classified as "might be a fit". The explanation 946 provides information about why the search result is classified as might be a fit, e.g., four out of five of the required qualifications are met. The user interface 940 is capable of including other elements in addition to those shown in FIG. 9E, such as elements similar to those shown in FIG. 9D1, FIG. 9D2, including second-level or per-search term result evaluation summaries corresponding to the first-level evaluation summary 944.

In FIG. 9F, a user interface 950 illustrates an example of a display screen that is capable of being presented to a user via, e.g., a user system. The user interface 950 illustrates an example of a continuous learning process described herein. The user interface 950 displays detailed information about the qualifications of a search result, e.g., a job candidate that the user has selected from a list of search results. These qualifications include a profile summary 962 and a description of work experience associated with the candidate.

In the process of reviewing the candidate's information and qualifications, the user has highlighted 956 a portion 954 of the work experience with an input mechanism (e.g., a mouse, stylus, or touchscreen device). The highlighted portion 954 indicates particular aspects of the candidate's qualifications that are interesting to the user. Using the continuous learning mechanism described herein, the user's action of highlighting 956 the highlighted portion 954 automatically triggers the display of a pop-up element requesting user feedback. The pop-up element includes selectable icons 958, 960 and an input box 964. The user has selected the icon 958 and provided feedback 966 in the input box 964.

Selecting the highlighted portion 954 indicates which aspects of the summary 962, e.g., sourced candidate profile, is favorable and/or non-favorable. This selection is capable of being used as specific feedback (e.g., classification of labels) for training or fine tuning. Additionally or alternatively, this feedback is capable of being used for ranking query results, e.g., as a positive signal or negative signal. By enabling highlighting text of interest, either as a positive or negative signal, the system enables the user to quickly indicate the portions of the summary 962, e.g., text (or parts of a candidate's profile), that are or are not favorable for the training process. Alternatively or in addition, the thumbs up or thumbs down icons are selectable to supplement the highlighted portion 954, e.g., to provide a classifier label for machine learning model training or fine tuning (e.g., to fine tune the GMLM used to generate query input summaries, query evaluations summaries, etc.). In some examples, the highlighted portion 954 includes one or more portions of a GLM-generated summary. In other examples, the highlighted portion includes one or more portions of other content, such as a portion of a user profile, which is presented adjacent to GMLM-generated content in some examples.

In response to this feedback, the continuous learning mechanisms described herein compute an alignment score that measures how well the user's feedback matches the evaluation summary generated by the evaluation agent. Based on the alignment score, the continuous learning system determines whether or not to modify the query input summary and/or other aspects of the query input, execution, and evaluation pipeline described herein.

The design of the pop-up element soliciting user feedback is variable according to the requirements of a particular design or implementation of the search application. In some examples, the pop-up element contains only one icon instead of two icons 958, 960, or the icons contain other graphical elements such as check marks and x's instead of thumbs up and thumbs down, or the pop-up element only contains the input box 964. The pop-up element is displayed in close proximity to the highlighted portion 954, e.g., the pop-up element is displayed adjacent to the highlighted portion 954.

Figure 9G:

In FIG. 9G, a user interface 970 illustrates an example of a display screen that is capable of being presented to a user via, e.g., a user system. The user interface 970 illustrates an example of output produced by a query learning process described herein. The query learning process executes autonomously to identify learnings 972. The learnings 972 include potential changes to the query input summary, e.g., additions or refinements to the qualifications of the ideal candidate. A user interface element 974 requests input from the user to confirm whether one or more of the learnings 972 should be incorporated into a subsequent version of the query input summary.

Figure 9H:
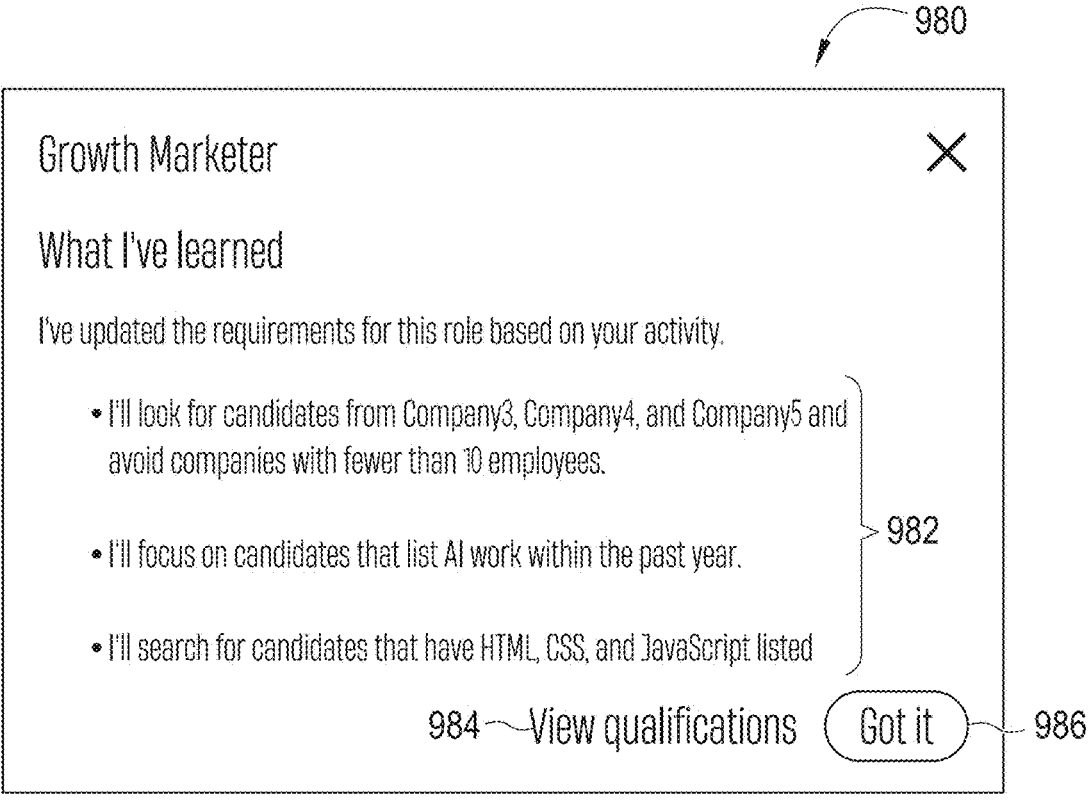

In FIG. 9H, a user interface 980 illustrates an example of a display screen that is capable of being presented to a user via, e.g., a user system. The user interface 980 illustrates an example of output produced by a query learning process described herein. The query learning process executes autonomously to identify learnings 982. The learnings 982 include potential changes to the query input summary, e.g., additions or refinements to the qualifications of the ideal candidate. A user interface element 984 enables the user to review the entire list of qualifications, e.g., the query input summary. A user interface element 986 requests input from the user to confirm that one or more of the learnings 982 should be incorporated into a subsequent version of the query input summary. A difference between the learning processes illustrated by FIG. 9G and FIG. 9H is the level of autonomy of the learning process. In the example of FIG. 9G, user approval is requested before the qualification updates are incorporated into the query input summary. In the example of FIG. 9H, the requirements are updated automatically and then user review and approval is requested. The semi-autonomous process illustrated by FIG. 9G is triggered in response to the learning mechanisms classifying the updates as major while the autonomous process illustrated by FIG. 9H is triggered in response to the learning mechanism classifying the updates as minor, in some examples.

The examples shown in FIG. 9A, FIG. 9B, FIG. 9C, FIG. 9D1, FIG. 9D2, FIG. 9E, FIG. 9F, FIG. 9G, and FIG. 9H, and the accompanying description, are provided for illustration purposes. The illustrative examples are applicable to smaller form factors such as smart phones, tablet computers, or wearable devices, and/or the user interfaces are adaptable to other forms of electronic devices, such as desktop computers and/or laptop devices, or vice versa. This disclosure is not limited to the described examples.

FIG. 10 is a flow diagram of an example method for query learning in accordance with some examples of the present disclosure.

The method 1000 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, portions of the method 1000 are performed by the computing system components shown in FIG. 1, FIG. 2, FIG. 3, FIG. 4, FIG. 5, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

At operation 1010, the processing device sends query input and a query input summarization instruction to a generative machine learning model (GMLM), where the query input is obtained via a first device and the query input summarization instruction is to cause the GMLM to generate and output a query input summary of a combination of the query input and context data associated with the query input. Examples of use of a GMLM to generate a query input summary are described with reference to, e.g., FIG. 1, FIG. 2, FIG. 9B, and FIG. 9C. Examples of GMLMs are described with reference to, e.g., FIG. 13C, FIG. 13D, and FIG. 13E.

At operation 1020, the processing device sends the query input summary and a query execution instruction to the GMLM, where the query execution instruction is to cause the GMLM to obtain query results using multiple different queries and the query input summary. Examples of use of a GMLM to obtain query results are described with reference to, e.g., FIG. 1, FIG. 2, and FIG. 3.

At operation 1030, the processing device uses the query results and a query result evaluation instruction to cause the GMLM to perform a comparison of a query result of the identified query results with the query input summary and summarize the comparison. Examples of use of a GMLM to evaluate query results are described with reference to, e.g., FIG. 1, FIG. 2, FIG. 3, FIG. 4, and FIG. 5.

At operation 1040, the processing device receives a query result evaluation summary, where the query result evaluation summary is a summary of the comparison of the query result with the query input summary, and where the query result evaluation summary is generated and output by the GMLM, e.g., using the query result evaluation instruction. Examples of use of a GMLM to produce a query result evaluation summary are described with reference to, e.g., FIG. 1, FIG. 2, FIG. 3, FIG. 4, and FIG. 5.

At operation 1050, the processing device receives a signal from a cursor position selecting first content from within a presentation of second content associated with the query result evaluation summary (e.g., the second content includes a portion of the query result evaluation summary and/or other content presented in association with the query result evaluation summary), via a second device, where the signal includes a measure of alignment between the query result evaluation summary and the query input summary. Examples of using signals for result evaluation are described with reference to FIG. 1, FIG. 2, FIG. 3, FIG. 4, FIG. 5, FIG. 6, FIG. 7A, FIG. 7B, FIG. 8, FIG. 9F, FIG. 9G, FIG. 9H.

At operation 1060, the processing device updates the query input summarization instruction to include the signal in the query input summary. Examples of using signals for learning are described with reference to FIG. 1, FIG. 2, FIG. 3, FIG. 4, FIG. 5, FIG. 6, FIG. 7A, FIG. 7B, FIG. 8, FIG. 9F, FIG. 9G, FIG. 9H.

In some examples, the processing device determines a preferred channel of a plurality of different channels available to communicate with the first device, the second device, or the first device and the second device; and receives the signal via the preferred channel in response to the presentation of the query result evaluation summary via the second device.

In some examples, the processing device determines whether the signal meets or exceeds a signal threshold; and updates the query input summarization instruction in response to determining that the signal meets or exceeds the signal threshold.

In some examples, the processing device sends the query input and the query input summarization instruction to the GMLM is performed by a query input agent of a multi-agent system; and uses the query results and the query result evaluation instruction to cause the GMLM to perform a comparison of the query result with the query input summary and summarize the comparison is performed by a query evaluation agent of the multi-agent system.

In some examples, sending the query input summary and the query execution instruction to the GMLM is performed by a query execution agent of the multi-agent system. In some examples, the query evaluation agent sends a portion of the query result evaluation summary to the query input agent; and the query input agent includes a portion of the query result evaluation summary in the query input summarization instruction.

In some examples, the query evaluation agent sends a portion of the query result evaluation summary to the query execution agent; and the query execution agent includes a portion of the query result evaluation summary in the query execution instruction.

The examples shown in FIG. 10 and the accompanying description are provided for illustration purposes. This disclosure is not limited to the described examples.

FIG. 11 is a flow diagram of an example method for query execution and evaluation in accordance with some examples of the present disclosure.

The method 1100 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, portions of the method 1100 are performed by the computing system components shown in FIG. 1, FIG. 2, FIG. 3, FIG. 4, FIG. 5, one or more components of computing system 1200 of FIG. 12, and/or agent system 1450 of FIG. 14. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

At operation 1110, the processing device provides a multi-agent system including a query input agent, an orchestrator agent, a query execution agent, and a query evaluation agent, each including an autonomous element executable asynchronously with autonomous elements of other agents of the multi-agent system. Examples of functionality performed by a multi-agent system with autonomous elements executing asynchronously are described with reference to FIG. 1 (e.g., multi-agent system 112) and FIG. 2 (e.g., multi-agent system 204). Examples of functionality performed by a query input agent are described with reference to FIG. 1 (e.g., determine query input 118), FIG. 2 (e.g., query input agent 212), and FIG. 3 (e.g., generate query 306). Examples of functionality performed by an orchestrator agent are described with reference to FIG. 1 (e.g., multi-agent system 112), FIG. 2 (e.g., orchestrator agent 208), FIG. 4 (e.g., supervisor agent 402), FIG. 5 (e.g., orchestrator agent 502). Examples of functionality performed by a query execution agent are described with reference to FIG. 1 (e.g., execute query 134), FIG. 2 (e.g., query execution agent 214), FIG. 3 (e.g., execute query 308), and FIG. 4 (e.g., sourcing agent 406). Examples of functionality performed by a query evaluation agent are described with reference to FIG. 1 (e.g., evaluate query results 142), FIG. 2 (e.g., result evaluation agent 216), FIG. 3 (e.g., evaluate query results 310), FIG. 4 (e.g., evaluation agent 408), FIG. 5, FIG. 6 (e.g., evaluate candidate using learning 616).

At operation 1120, the processing device, via the orchestrator agent, receives a query input, e.g., from the query input agent or directly at the orchestrator agent. Examples of query input are described with reference to, e.g., FIG. 1.

At operation 1130, the processing device, via the orchestrator agent, provides the query input and a first instruction to a generative machine learning model (GMLM), where the first instruction is to cause the GMLM to determine different queries using the query input. Examples of query generation using a GMLM are described with reference to, e.g., FIG. 1, FIG. 2, FIG. 3, and FIG. 4.

At operation 1140, the processing device, via the query execution agent, executes the different queries in parallel using the query input. Examples of parallel query execution are described with reference to, e.g., FIG. 1, FIG. 2, FIG. 3, and FIG. 4. Examples of GMLMs are described with reference to, e.g., FIG. 13C, FIG. 13D, and FIG. 13E.

At operation 1150, the processing device, via the orchestrator agent, determines that the different queries are executing. Examples of use of an orchestrator agent to monitor query execution are described with reference to, e.g., FIG. 2, FIG. 3, and FIG. 4.

At operation 1160, the processing device, via the query evaluation agent, provides query results of execution of each of the different queries and a second instruction to the GMLM, where the second instruction is to cause the GMLM to generate, for each query result, a query result summary including an evaluation of alignment of a query result with the query input. Examples of use of a query evaluation agent and a GMLM to generate a query result summary are described with reference to, e.g., FIG. 1, FIG. 2, FIG. 3, FIG. 4, and FIG. 5.

At operation 1170, the processing device, via the orchestrator agent, using the query result summaries to determine a subset of the query results for presentation via a device. Examples of use of an orchestrator agent to manage presentation of query results are described with reference to, e.g., FIG. 2 and FIG. 4.

In some examples, the processing device, via the query input agent, receives the query input from a user-preferred communication channel; and maps the query input to a standardized query input. In some examples, the second instruction to the GMLM is to cause the GMLM to generate and include, in the query result summary, an evaluation of the query result as a whole and an attribute-by-attribute comparison of the query input to the query result. In some examples, the second instruction to the GMLM is to cause the GMLM to generate and include, in the query result summary, an evaluation of the query result as a whole and an attribute-by-attribute comparison of the query input to the query result.

In some examples, the processing device determines whether the query results include a threshold number of results; and in response to determining that the query results do not include the threshold number of results, iterates between the query execution agent and the query evaluation agent until the query results contain the threshold number of results. In some examples, the amount of iterating is controlled by the orchestrator to, e.g., facilitate load balancing and/or prevent stalling of pipeline parallelism.

In some examples, the query execution agent determines whether a query of the different queries is executing and messaging the orchestrator agent in response determining that the query is finished executing; the orchestrator agent uses the messaging to determine whether all of the different queries are finished executing; and the orchestrator agent invokes the query evaluation agent in response to determining that all of the different queries have finished executing. In some examples, the first instruction and the second instruction are included in a same instruction to the GMLM.

In some examples, the query execution agent batches the query results per query of the different queries; and the query evaluation agent causes the GMLM to generate the query result summaries per batch of query results.

In some examples, a second query input is received and the multi-agent system is operated using pipeline parallelism such that the query input and the second query input are processed by the multi-agent system at the same time, e.g., the multi-agent system is arranged to enable pipeline parallelism.

The examples shown in FIG. 11 and the accompanying description, above are provided for illustration purposes. This disclosure is not limited to the described examples.

Figure 12:
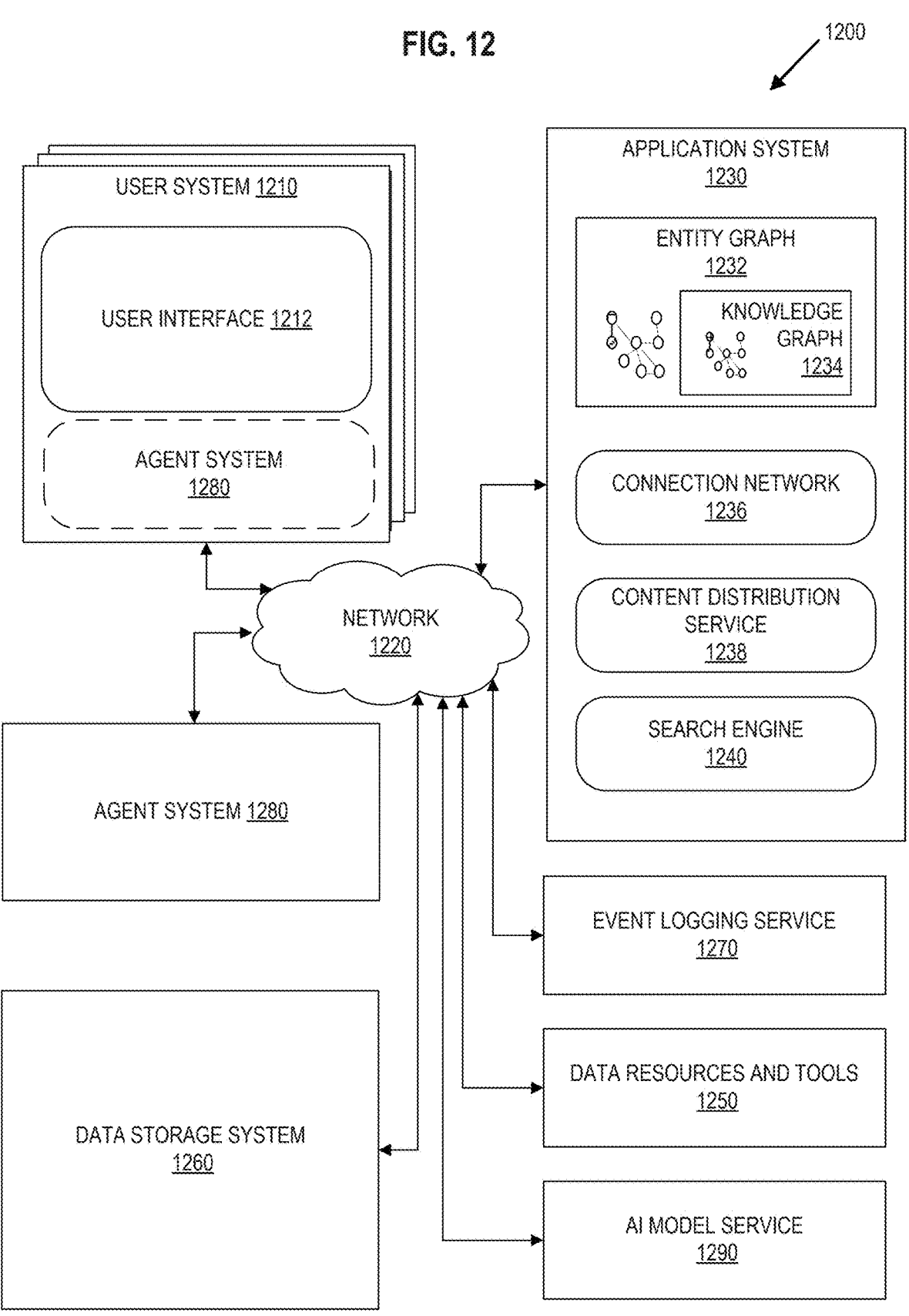
FIG. 12 is a block diagram of a computing system that includes an agent system in accordance with some examples of the present disclosure.

FIG. 12 is a block diagram of a computing system that includes an agent system in accordance with some examples of the present disclosure.

In the example of FIG. 12, a computing system 1200 includes one or more user systems 1210, a network 1220, an application system 1230, data resources and tools 1250, an agent system 1280, a data storage system 1260, an event logging service 1270, and an AI model service 1290.

All or at least some components of agent system 1280 are implemented at the user system 1210, in some examples. For example, portions of agent system 1280 are implemented directly upon a single client device such that communications involving applications running on user system 1210 and agent system 1280 occur on-device without the need to communicate with, e.g., one or more servers, over the Internet. Dashed lines are used in FIG. 12 to indicate that all or portions of agent system 1280 are capable of being implemented directly on the user system 1210, e.g., the user's client device. In some examples, both user system 1210 and agent system 1280 are implemented on the same computing device, in some examples. In other examples, all or portions of agent system 1280 are implemented on one or more servers and in communication with user systems 1210 via network 1220. Components of the computing system 1200 including the agent system 1280 are described in more detail herein.

A user system 1210 includes one or more computing devices. Examples of computing devices include a personal computing device, a server, a mobile computing device, a wearable electronic device, or a smart appliance. The user system 1210 includes one or more software applications that a computing device is capable of executing alone or in combination with one or more other computing devices. Examples of software applications include an operating system or a front end of an online system. Many different user systems 1210 are capable of being connected to network 1220 at the same time or at different times. In some examples, different user systems 1210 contain similar components as described in connection with the illustrated user system 1210. In some examples, many different end users of computing system 1200 interact with many different instances of application system 1230 through their respective user systems 1210, at the same time or at different times.

User system 1210 includes a user interface 1212. User interface 1212 is installed on user system 1210 or accessible to user system 1210 via network 1220. In some examples, user interface 1212 includes a front end portion of a search application or agent system.

User interface 1212 includes, for example, a graphical display screen that includes graphical user interface elements. Examples of graphical user interface elements include an input box or other input mechanism and a slot. A slot as used herein refers to a space on a graphical display such as a web page or mobile device screen, into which output, e.g., digital content such as search results, feed items, chat boxes, or threads, is loaded for display to the user. In some examples, user interface 1212 includes a scrollable arrangement of variable-length slots that simulates an online chat or instant messaging session and/or a scrollable arrangement of slots that contain content items or search results. The locations and dimensions of a particular graphical user interface element on a screen are specified using, for example, a markup language such as HTML (Hypertext Markup Language). On a typical display screen, a graphical user interface element is defined by two-dimensional coordinates. In other examples such as virtual reality or augmented reality examples, a slot is defined using a three-dimensional coordinate system. Example screen captures of user interface screens that are capable of being included in user interface 1212 are shown in the drawings and described herein.

User interface 1212 is capable of interacting with the agent system 1280 and/or one or more application systems 1230. For example, user interface 1212 enables the user of a user system 1210 to interact with the agent system 1280 to create, edit, send, view, receive, process, and organize projects, tasks, plans, search queries, search results, content items, news feeds, and/or portions of online dialogs. In some examples, user interface 1212 enables the user to input requests (e.g., queries) for various different types of information, to initiate user interface events, and to view or otherwise perceive output such as data and/or digital content produced by, e.g., an application system 1230, agent system

1280, content distribution service 1238 and/or search engine 1240. In some examples, user interface 1212 includes a graphical user interface (GUI), a conversational voice/speech interface, a virtual reality, augmented reality, or mixed reality interface, and/or a haptic interface. User interface 1212 includes a mechanism for entering search queries and/or selecting search criteria (e.g., facets, filters, etc.), selecting GUI user input control elements, and interacting with digital content such as search results, entity profiles, posts, articles, feeds, and online dialogs, in some examples. Some examples of user interface 1212 include web browsers, command line interfaces, and mobile app front ends. User interface 1212 as used herein includes application programming interfaces (APIs) in some examples.

Network 1220 includes an electronic communications network. Network 1220 is implemented on any medium or mechanism that provides for the exchange of digital data, signals, and/or instructions between the various components of computing system 1200. Examples of network 1220 include, without limitation, a Local Area Network (LAN), a Wide Area Network (WAN), an Ethernet network or the Internet, or a terrestrial, satellite or wireless link, or a combination of any number of different networks and/or communication links.

Application system 1230 includes, for example, one or more online systems that provide social network services, general-purpose search engines, specific-purpose search engines, messaging systems, content distribution platforms, e-commerce software, enterprise software, or any combination of any of the foregoing or other types of software. Application system 1230 includes any type of application system that provides or enables the retrieval of and interactions with one or more forms of digital content, including machine-generated content via user interface 1212. In some examples, portions of agent system 1280 are components of application system 1230. In some examples, an application system 1230 includes one or more of an entity graph 1232 and/or knowledge graph 1234, a user connection network 15315, a content distribution service 1238, and/or a search engine 1240. In other examples, application system 1230 interacts with agent system 1280 to control a physical machine or device, such as a vehicle or a robot.

In some examples, a front end portion of application system 1230 operates in user system 1210, for example as a plugin or widget in a graphical user interface of a web application, mobile software application, or as a web browser executing user interface 1212. In an example, a mobile app or a web browser of a user system 1210 transmits a network communication such as an HTTP request over network 1220 in response to user input that is received through a user interface provided by the web application, mobile app, or web browser, such as user interface 1212. A server running application system 1230 receives the input from the web application, mobile app, or browser executing user interface 1212, performs one or more operations using the input, and returns output to the user interface 1212 using a network communication such as an HTTP response, which the web application, mobile app, or browser receives and processes at the user system 1210.

In the example of FIG. 12, an application system 1230 includes an entity graph 1232 and/or a knowledge graph 1234. Entity graph 1232 and/or knowledge graph 1234 include data organized according to graph-based data structures that are searchable or traversable via queries and/or indexes to determine relationships between entities. In some examples, entity graph 1232 and/or knowledge graph 1234 is used to compute various types of relationship weights, affinity scores, similarity measurements, and/or statistics between, among, or relating to entities.

Entity graph 1232, knowledge graph 1234 includes a graph-based representation of data stored in data storage system 1260, described herein. For example, entity graph 1232, knowledge graph 1234 represents entities, such as users, organizations (e.g., companies, schools, institutions), content items (e.g., job postings, announcements, articles, comments, and shares), and computing resources (e.g., databases, models, applications, and services), as nodes of a graph. Entity graph 1232, knowledge graph 1234 represents relationships, also referred to as mappings or links, between or among entities as edges, or combinations of edges, between the nodes of the graph. In some examples, mappings between different pieces of data used by an application system 1230 are represented by one or more entity graphs. In some examples, the edges, mappings, or links indicate relationships, online interactions, or activities relating to the entities connected by the edges, mappings, or links. In some examples, if a user clicks on a search result, an edge is created connecting the user entity with the search result entity in the entity graph, where the edge is tagged with a label such as "viewed." If a user viewing a list of search results skip over a search result without clicking on the search result, an edge is not created between the user entity and the search result entity in the entity graph, in some examples.

Portions of entity graph 1232, knowledge graph 1234 are automatically re-generated or updated from time to time based on changes and updates to the stored data, e.g., updates to entity data and/or activity data. In some examples, entity graph 1232, knowledge graph 1234 refers to an entire system-wide entity graph or to only a portion of a system-wide graph. In some examples, entity graph 1232, knowledge graph 1234 refers to a subset of a system-wide graph, where the subset pertains to a particular user or group of users of application system 1230.

Knowledge graph 1234 includes a graph-based representation of data stored in data storage system 1260, described herein. Knowledge graph 1234 represents relationships, also referred to as links or mappings, between entities or concepts as edges, or combinations of edges, between the nodes of the graph. In some examples, mappings between different pieces of data used by application system 1230 or across multiple different application systems are represented by the knowledge graph 1234.

In some examples, knowledge graph 1234 is a subset or a superset of entity graph 1232. In some examples, knowledge graph 1234 includes multiple different entity graphs 1232 that are joined by cross-application or cross-domain edges. In some examples, knowledge graph 1234 joins entity graphs 1232 that have been created across multiple different databases or across different software products. In some examples, the entity nodes of the knowledge graph 1234 represent concepts, such as product surfaces, verticals, or application domains. In some examples, knowledge graph 1234 includes a platform that extracts and stores different concepts that is used to establish links between data across multiple different software applications. Examples of concepts include topics, industries, and skills. As with other portions of entity graph 1232, knowledge graph 1234 is usable to compute various types of relationship weights, affinity scores, similarity measurements, and/or statistical correlations between or among entities and/or concepts.

In the example of FIG. 12, application system 1230 includes a user connection network 1236. User connection network 1236 includes, for instance, a social network service, professional social network system and/or other social graph-based applications. Content distribution service 1238 includes, for example, a feed, chatbot or chat-style system, or a messaging system, such as a peer-to-peer messaging system that enables the creation and exchange of messages between users of application system 1230 and the application system 1230. Search engine 1240 includes a search engine that enables users of application system 1230 to input and execute search queries to retrieve information from one or more sources of information, such as user connection network 1236, entity graph 1232, knowledge graph 1234, one or more data stores of data storage system 1260, or one or more data resources and tools 1250.

In the example of FIG. 12, application system 1230 includes a content distribution service 1238. The content distribution service 1238 includes a data storage service, such as a web server, which stores digital content items, and transmits digital content items to users via user interface 1212. In some examples, content distribution service 1238 processes requests from, for example, application system 1230 and/or agent system 1280, and distributes digital content items to user systems 1210 in response to requests.

A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, an input of a search query, or a page load. In some examples, content distribution service 1238 is part of application system 1230. In other examples, content distribution service 1238 interfaces with application system 1230 and/or agent system 1280, for example, via one or more application programming interfaces (APIs).

In the example of FIG. 12, application system 1230 includes a search engine 1240. Search engine 1240 includes a software system designed to search for and retrieve information by executing queries on one or more data stores, such as databases, connection networks, and/or graphs. The queries are designed to find information that matches specified criteria, such as keywords and phrases contained in user input and/or system-generated queries. For example, search engine 1240 is used to retrieve data in response to user input and/or system-generated queries, by executing queries on various data stores of data storage system 1260 and/or data resources and tools 1250, or by traversing entity graph 1232, knowledge graph 1234.

Data resources and tools 1250 include computing resources, such as data stores, databases, embedding-based retrieval mechanisms, code generators, etc., that are capable of being used to operate an agent or agent system. Data resources and tools 1250 include computing resources that are internal to application system 1230 or external to application system 1230. Examples of data resources and tools 1250 include entity graphs, knowledge graphs, indexes, databases, networks, applications, models (e.g., large language models and/or other artificial intelligence models or machine learning models), taxonomies, data services, web pages, vectors (e.g., data stores that store embeddings), and searchable digital catalogs. Each data resource or tool 1250 enables an agent or agent system to access the data resource or tool, for example by providing an application programming interface (API). Each data resource or tool 1250 includes a monitoring service that periodically generates, publishes, or broadcasts availability and/or other performance metrics associated with the data resource, in some examples. A data resource or tool 1250 provides a set of APIs that are used by an agent or agent system to access the data resource or tool, obtain output from the data resource, and/or obtain performance metrics for the data resource or tool, in some examples.

Data storage system 1260 includes data stores and/or data services that store digital data received, used, manipulated, and produced by application system 1230 and/or agent system 1280, including contextual data, state data, prompts and/or prompt templates for generative artificial intelligence models or large language models, user inputs, system-generated outputs, metadata, attribute data, activity data. Databases or data stores that are capable of being used in some of the described examples include but are not limited to vector databases, graph databases, relational databases, and key-value stores.

In the example of FIG. 12, data storage system 1260 includes various data stores that store, for example, entity data, context data, prompts, embeddings, etc. A data store includes a volatile memory such as a form of random access memory (RAM) and/or persistent memory, which can be available on user system 1210 or another device (e.g., one or more servers) for storing state data generated at the user system 1210 or an application system 1230. In some examples, a separate, personalized version of each or any data store is created for each user such that data is not shared between or among the separate, personalized versions of the data stores.

In some examples, data storage system 1260 includes multiple different types of data storage and/or a distributed data service. In some examples, data service refers to a physical, geographic grouping of machines, a logical grouping of machines, or a single machine. In some examples, a data service includes a data center, a cluster, a group of clusters, or a machine. Data stores of data storage system 1260 are capable of storing data produced by real-time and/or offline (e.g., batch) data processing. A data store configured for real-time data processing is referred to as a real-time data store, in some examples. A data store configured for offline or batch data processing is referred to as an offline data store, in some examples. Data stores are capable of being implemented using databases, such as key-value stores, relational databases, and/or graph databases. Data is written to and read from data stores using query technologies, e.g., SQL or NoSQL.

Data storage system 1260 resides on one or more persistent and/or volatile storage devices that reside within the same local network as other devices of computing system 1200 and/or in a network that is remote relative to other devices of computing system 1200. Thus, although depicted as being included in computing system 1200, portions of data storage system 1260 are part of computing system 1200 or accessed by computing system 1200 over a network, such as network 1220, in some examples.

Event logging service 1270 captures and records activity data generated during operation of application system 1230 and/or agent system 1280, including user interface events generated at user systems 1210 via user interface 1212, in real time, and formulates the user interface events and/or other network activity data into a data stream that is consumed by, for example, a stream processing system. Examples of network activity data include logins, page loads, dialog inputs, input of search queries or query terms, selections of facets or filters, clicks on search results or graphical user interface control elements, scrolling lists of search results, and social action data such as likes, shares, comments, and social reactions (e.g., "insightful," "curious," "like," etc.). For instance, when a user of application system 1230 via a user system 1210 enters input or clicks on a user interface element, such as a workflow element, or a user interface control element such as a view, comment, share, or reaction button, or uploads a file, or inputs a query, or scrolls through a feed, etc., event logging service 1270 fires an event to capture and store log data including an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web applications and mobile applications.

For instance, when a user enters input or reacts to system-generated output, such as a list of search results, event logging service 1270 stores the corresponding event data in a log. Event logging service 1270 generates a data stream that includes a record of real-time event data for each user interface event that has occurred. Event data logged by event logging service 1270 is pre-processed and anonymized as needed so that it is capable of being used as context data to, for example, configure one or more instructions for one or more artificial intelligence models (e.g., large language models), or to modify weights, affinity scores, or similarity measurements that are assigned by the agent system to search results or data resources.

Agent system 1280 includes any one or more of the components, features, or functions described herein with respect to an agent system or search application. For example, agent system 1280 includes components of a multi-agent system as described herein.

AI model service 1290 includes one or more artificial intelligence-based models, such as large language models and/or other types of machine learning models including discriminative and/or generative models, neural networks, probabilistic models, statistical models, transformer-based models, and/or any combination of any of the foregoing. AI model service 1290 enables automated agents and agent systems to access to these models, for example by providing one or more application programming interfaces (APIs). AI model service 1290 includes a monitoring service that periodically generates, publishes, or broadcasts latency and/or other performance metrics associated with the models. In some examples, AI model service 1290 provides a set of APIs that are used by an agent or agent system to obtain performance metrics for large language models and/or other machine learning models.

While not specifically shown, it should be understood that any of user system 1210, application system 1230, data resources and tools 1250, data storage system 1260, event logging service 1270, agent system 1280, and AI model service 1290 includes an interface embodied as computer programming code stored in computer memory that when executed causes a computing device to enable bidirectional communication with any other of user system 1210, application system 1230, data resources and tools 1250, data storage system 1260, event logging service 1270, agent system 1280, and AI model service 1290 using a communicative coupling mechanism. Examples of communicative coupling mechanisms include network interfaces, inter-process communication (IPC) interfaces and application program interfaces (APIs).

Each of user system 1210, application system 1230, data resources and tools 1250, data storage system 1260, event logging service 1270, agent system 1280, and AI model service 1290 is implemented using one or more computing devices that are communicatively coupled to electronic communications network 1220. Any of user system 1210, application system 1230, data resources and tools 1250, data storage system 1260, event logging service 1270, agent system 1280, and AI model service 1290 are capable of being bidirectionally communicatively coupled by network 1220. User system 1210 as well as other different user systems (not shown) are bidirectionally communicatively coupled to application system 1230 and/or agent system 1280, in some examples.

Examples of users of user system 1210 include an administrator or end user of application system 1230 or agent system 1280. User system 1210 is configured to communicate bidirectionally with any of application system 1230, data resources and tools 1250, data storage system 1260, event logging service 1270, agent system 1280, and AI model service 1290 over network 1220.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 1210, application system 1230, data resources and tools 1250, data storage system 1260, event logging service 1270, agent system 1280, and AI model service 1290 are implemented using computer software, hardware, or software and hardware, and include combinations of automated functionality, data structures, and digital data, which are represented schematically in the figures. User system 1210, application system 1230, data resources and tools 1250, data storage system 1260, event logging service 1270, agent system 1280, and AI model service 1290 are shown as separate elements in FIG. 15 for ease of discussion but, except as otherwise described, the illustration is not meant to imply that separation of these elements is required. The illustrated systems, services, and data stores (or their functionality) of each of user system 1210, application system 1230, data resources and tools 1250, data storage system 1260, event logging service 1270, agent system 1280, and AI model service 1290 are capable of being divided over any number of physical systems, including a single physical computer system, and are capable of communicating with each other in any appropriate manner.

Figure 14:
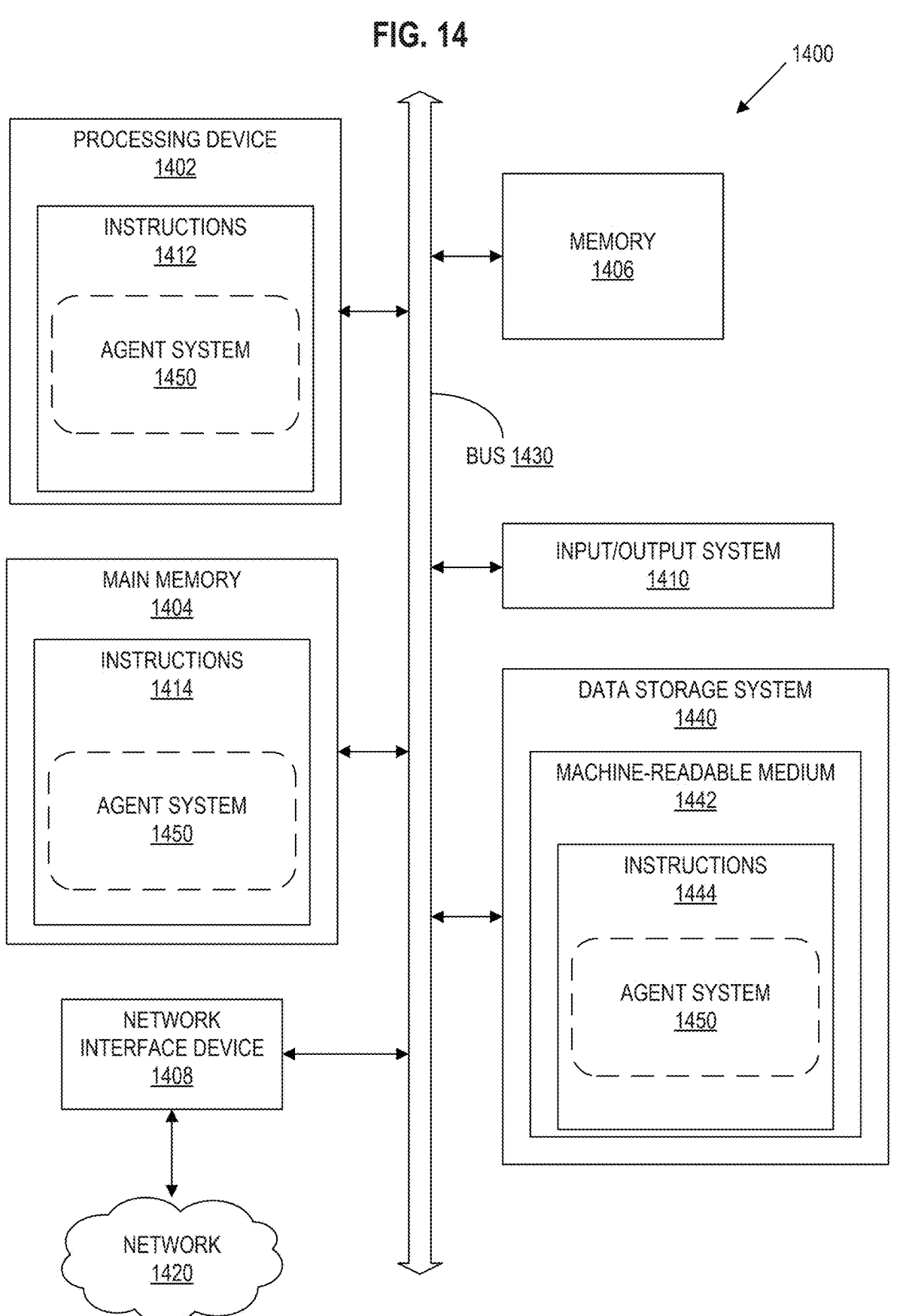
FIG. 14 is a block diagram of an example computer system including components of an agent system in accordance with some examples of the present disclosure.

In the example of FIG. 14, portions of agent system 1280 that are capable of being implemented on a front end system, such as one or more user systems, and portions of agent system 1280 that are capable of being implemented on a back end system such as one or more servers, are collectively represented as agent system 1450 for case of discussion only. In some examples, portions of agent system 1280 are not required to be implemented all on the same computing device, in the same memory, or loaded into the same memory at the same time. In some examples, access to portions of agent system 1280 is limited to different, mutually exclusive sets of user systems and/or servers. In some examples, a separate, personalized version of agent system 1280 is created for each user of the agent system 1280 such that data is not shared between or among the separate, personalized versions of the agent system 1280. Certain portions of agent system 1280 are capable of being implemented on user systems while other portions of agent system 1280 are capable of being implemented on a server computer or group of servers. In some examples, one or more portions of agent system 1280 are implemented on user systems. Agent system 1280 is entirely implemented on user systems, e.g., client devices, in some examples. In some examples, a version of agent system 1280 is embedded in a client device's operating system or stored at the client device and loaded into memory at execution time.

The examples shown in FIG. 12 and the accompanying description, above are provided for illustration purposes. This disclosure is not limited to the described examples.

FIG. 13A, FIG. 13B, FIG. 13C, FIG. 13D, and FIG. 13E are block diagrams of examples of machine learning models that are usable by and/or included in an agent system in accordance with some examples of the present disclosure.

Figure 13A:
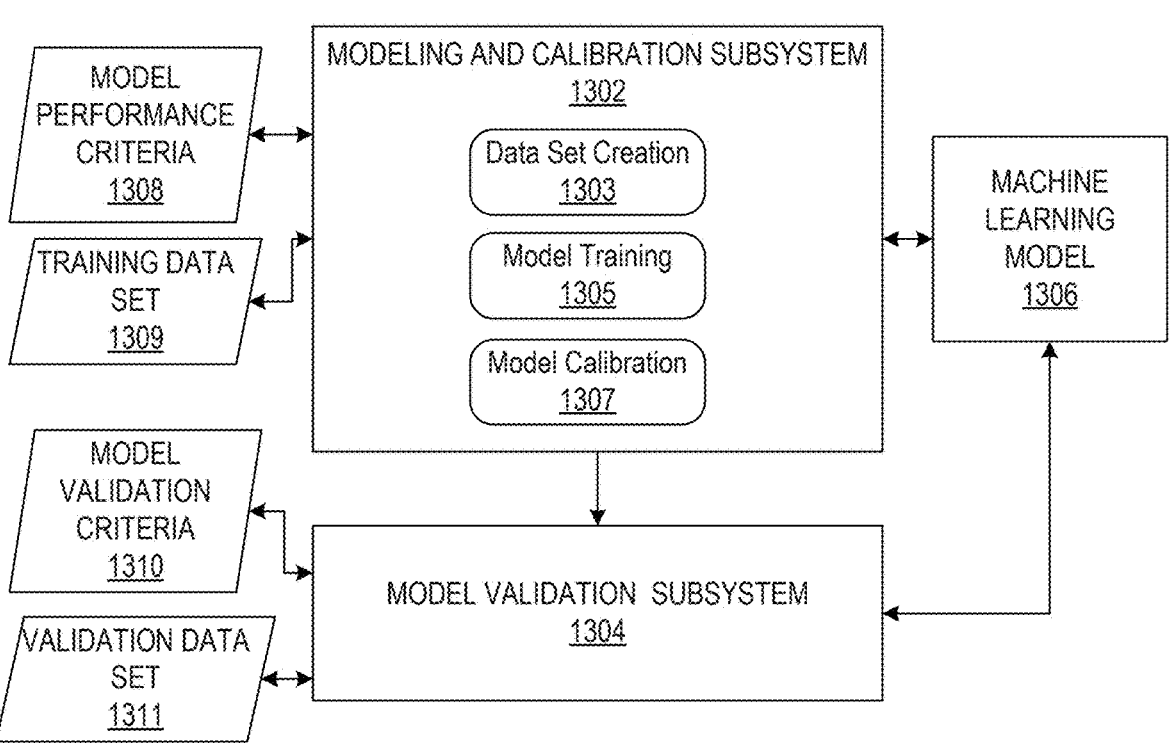
FIG. 13A, FIG. 13B, FIG. 13C, FIG. 13D, and FIG. 13E are block diagrams of examples of machine learning models that are usable by and/or included in an agent system in accordance with some examples of the present disclosure.

FIG. 13A is a block diagram of a machine learning modeling system that is capable of being used by and/or included in an agent system in accordance with some examples of the present disclosure.

Machine learning models are computer-implemented structures that are capable of generating predictive output in response to raw input. A machine learning model includes a probabilistic or statistical algorithm that is configured to perform a specific predictive function through a training process that involves iteratively exposing the models to many samples of data and adjusting one or more model parameters until the models achieve a satisfactory prediction accuracy and reliability. The predictive accuracy and reliability of a machine learning model in relation to a particular task is dependent upon the training process and the data used in the training.

Machine learning systems include components and processes that perform data generation, model training, model evaluation (e.g., calibration and validation), and application. Data preparation includes obtaining and aggregating model input data. The preparation of training data includes labeling the aggregated data, in some examples. Training data includes structured data, unstructured data, text, multimodal data, or any combination of any of the foregoing. Model training includes setting values of hyperparameters, determining performance metrics, adjusting weights of the machine learning model in response to the training data, evaluating the performance metrics, and parameter tuning. Application includes applying the trained machine learning model to the real-world environment, e.g., in a specific use case using data not included in the training data (e.g., unlabeled data). The application phase is referred to as inferencing or inference time, in some examples.

In FIG. 13A, a machine learning modeling system 1300 includes a machine learning model 1306, a modeling and calibration subsystem 1302, and a model validation subsystem 1304. The machine learning model 1306 is any type or combination of one or more machine learning models, such as any of the types of machine learning models shown in FIG. 13B, FIG. 13C, FIG. 13D, and FIG. 13E and/or any other types or combinations of machine learning models.

The modeling and calibration subsystem 1302 receives model input, such as input feature sets, embeddings, digital content, or prompts. The model input is engineered to train the machine learning model 1306 to perform one or more tasks, such as discriminative tasks like classification or scoring and/or generative tasks such as content generation tasks. Modeling and calibration subsystem 1302 includes a data set creation component 1303, a model training component 1305, and a model calibration component 1307.

Data set creation component 1303 divides the model input, e.g., input feature sets, into one or more training data sets and one or more validation data sets, e.g., training data set 1309 and validation data set 1311. Model training component 1305 and model calibration component 1307 cooperatively execute a training process. In some examples, the training process causes the machine learning model 1306 to develop, by iterative adjustments to weights or coefficients, a mathematical representation of the relationships between different items of data, such as relationships between different inputs (e.g., similarity estimates or estimates of user preferences), or relationships between inputs and categorical data such as classification labels, or relationships between inputs and outputs. The resulting trained model is used to generate predictive output (e.g., scores, labels, or other output) based on subsequent model input.

One or more different approaches are used to train the machine learning model 1306, for example, supervised machine learning, semi-supervised machine learning, or unsupervised machine learning. In supervised machine learning, the set of training data includes indications of expected model output coupled with respective model input; for example, ground-truth labeled data samples. In some examples, an instance of training data for supervised learning includes a model input (e.g., a set of features) and an associated expected output (e.g., a classification label), where the expected output is human curated or machine-generated. In some examples, an instance of training data for supervised machine learning includes a digital image and a title or caption for the image that describes the contents of the image. In unsupervised machine learning, the training examples are unlabeled. In unsupervised machine learning, a machine learning algorithm such as a clustering algorithm is used to identify similarities among data samples and create clusters or groupings of similar data using one or more similarity criteria. In some examples, unsupervised learning is used to group digital content items, such as images, articles, or videos, into topics, where the topics are determined based on the features of the content items themselves rather than supplied by labels. Semi-supervised machine learning combines supervised and unsupervised machine learning, using both labeled and unlabeled data to train machine learning models.

Model training component 1305 applies machine learning model 1306 to training data set 1309 iteratively and adjusts the value of one or more model parameters and/or feature coefficients of the machine learning model 1306 based on the processing of the training data set 1309 by the model 1306 until the difference between the predicted model output generated by the machine learning model 1306 and the expected model output evidenced by the training data set 1309 satisfies (e.g., meets or exceeds) model performance criteria 1308. When the model performance criteria 1308 are satisfied, modeling and calibration subsystem 1302 ends the model training process and produces a trained machine learning model 1306.

Model validation subsystem 1304 applies a model validation process to the trained machine learning model 1306 produced by modeling and calibration subsystem 1302. Model validation subsystem 1304 uses the validation data set 1311 to determine whether model validation criteria 1310 are satisfied (e.g., met or exceeded). In some examples, the validation data set 1311 is created by setting aside a portion of the training data set 1309 until after training, such that the validation data set 1311 is used to compare and evaluate the difference between the predictive output produced by the trained model to the expected model output evidenced by the set-aside portion of the training data set 1309.

A validated machine learning model 1306 is used for inferencing, e.g., to generate predictive output, e.g., labels, scores, or other content, in response to model input. Alternatively or in addition, the output produced by the validated machine learning model 1306 is stored for future use (e.g., for access or lookup by one or more downstream processes, systems, or services).

There are many different types and configurations of machine learning models. Illustrative, nonlimiting examples of some of the different types of machine learning models are shown in FIG. 13B, FIG. 13C, FIG. 13D, and FIG. 13E, described below. The AIs, models, and AI model services described herein are capable of including or using any of the various types of machine learning models, including but not limited to one or more of the types of models shown in FIG. 13B, FIG. 13C, FIG. 13D, and FIG. 13E.

The examples shown in FIG. 13A and the accompanying description, above are provided for illustration purposes. This disclosure is not limited to the described examples.

Figure 13B:
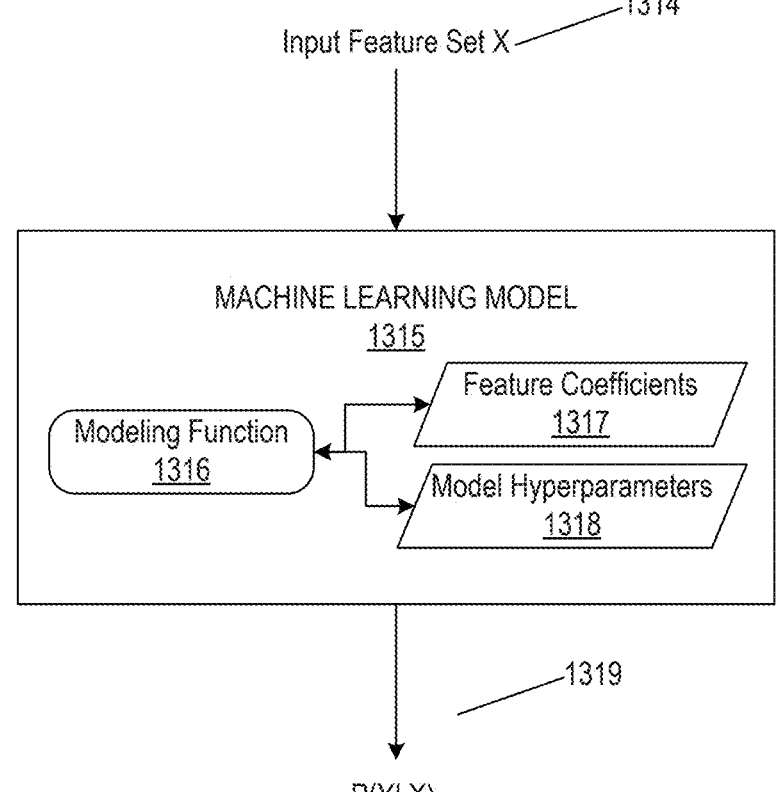

FIG. 13B is a block diagram of a machine learning model that is capable of being used by and/or included in an agent system in accordance with some examples of the present disclosure.

In the example of FIG. 13B, a machine learning system 1312 includes a machine learning model 1315. Machine learning model 1315 is or includes a probabilistic or statistical machine learning model that uses a modeling function 1316 to model the relationship between model input 1314 (e.g., input feature set X) and model output (e.g., Y, P (Y|X)).

In some examples, the machine learning model 1315 is configured as a discriminative model such that the machine learning model 1315 produces output that indicates the probabilistic or statistical likelihood of an output Y given an input X. Some examples of the machine learning model 1315 are alternatively or additionally configured as a generative model. In some examples, a machine learning model performs both discriminative and generative tasks.

One illustrative example of a discriminative model is a logistic regression function. Mathematically, a simplified form of the logistic function is capable of being expressed as $P(X)=f(x)=1/1+e^{-(\beta_0+\beta_1 x)}$, where e is the exponential constant and $\beta_0$ and $\beta_1$ are feature coefficients. During training of the logistic regression model 1315, logistic regression estimates the values of the coefficients in the linear combination based on the feature values in the training data set. The machine learning model 1315 is configured (e.g., values of model parameters are adjusted) via training, calibration, and validation processes such as those described with reference to FIG. 13A.

The machine learning model 1315 includes a modeling function 1316. The modeling function 1316 includes feature coefficients 1317. The values of one or more of the feature coefficients 1317 are established via machine learning model training, calibration, and validation processes based on training data sets and/or validation data sets.

In the logistic regression example, the feature coefficients 1317 include a regression coefficient $\beta$ for each feature input x (e.g., $f(i)=\beta_0+\beta_1 x_{1,i}+ \ldots \beta_m x_{m,i}$), where $x_i$ is a particular item of the feature set and m is the number of feature inputs x in the input feature set X 1314. The regression coefficient indicates the relative effect of the particular feature input x of the feature set X on the predicted outcome P(Y|X), e.g., a predicted label or score, based on the values of the feature inputs x in the feature set X 1314. The values of the feature coefficients are initialized and adjusted during model training and calibration.

The machine learning model 1315 also includes model hyperparameters 1318. The values of hyperparameters 1318 are selected or tuned at a global level and generally are not modified based on specific instances of training data. In the logistic regression example, model hyperparameters 1318 include a penalty or regularization parameter (e.g., L1 or L2) and the C or regularization strength parameter. The penalty or regularization parameter is tunable to adjust model generalization error and regulate overfitting. The C or regularization strength parameter regulates overfitting in conjunction with the penalty. The model hyperparameters 1318 is tuned using, for example, a hyperparameter tuning tool or hyperparameter optimization method.

Some examples of the machine learning model 1315 are configured as a binary classifier or as a scoring model. In a binary classification mode, the output of the machine learning model 1315 indicates whether the model input is or is not associated with a certain output (e.g., either 0 if the input is not mathematically likely to be associated with the output or 1 if the input is mathematically likely to be associated with the output), for a given set of input features. In a scoring mode, the output of the machine learning model 1315 includes a score, which corresponds to a probability of the predicted output (e.g., a numerical value between zero and 1, inclusive).

The model input 1314 (e.g., input feature set X) includes numerical features, categorical features, quantitative values, qualitative values, raw features, compressed representations of raw features (e.g., vector representations or embeddings, and/or other forms of digital content.

In response to an instance of features of feature set X, machine learning model 1315 computes and outputs an estimated output P(Y|X) 1319. The estimated output produced by machine learning model 1315 based on an instance of features of feature set X 1314 is in the form of a binary output or a score, in some examples. The output is stored in a data storage for subsequent lookup or provided to one or more downstream systems, processes, devices, frameworks, and/or services.

The machine learning model 1315 is configured and implemented as a network service, in some examples. In some examples, the machine learning model 1315 is configured using a machine learning library and an application programming interface (API), e.g., via an API call such as ML_library.model(p1, p2, . . . pn), where p indicates a parameter or argument of the call, such as a model hyperparameter or an input feature set identifier. Once configured, the machine learning model 1315 and/or its output is hosted on one or more servers and/or data storage devices for accessibility to one or more requesting processes, systems, devices, frameworks, or services.

The examples shown in FIG. 13B and the accompanying description, above are provided for illustration purposes. This disclosure is not limited to the described examples.

Figure 13C:
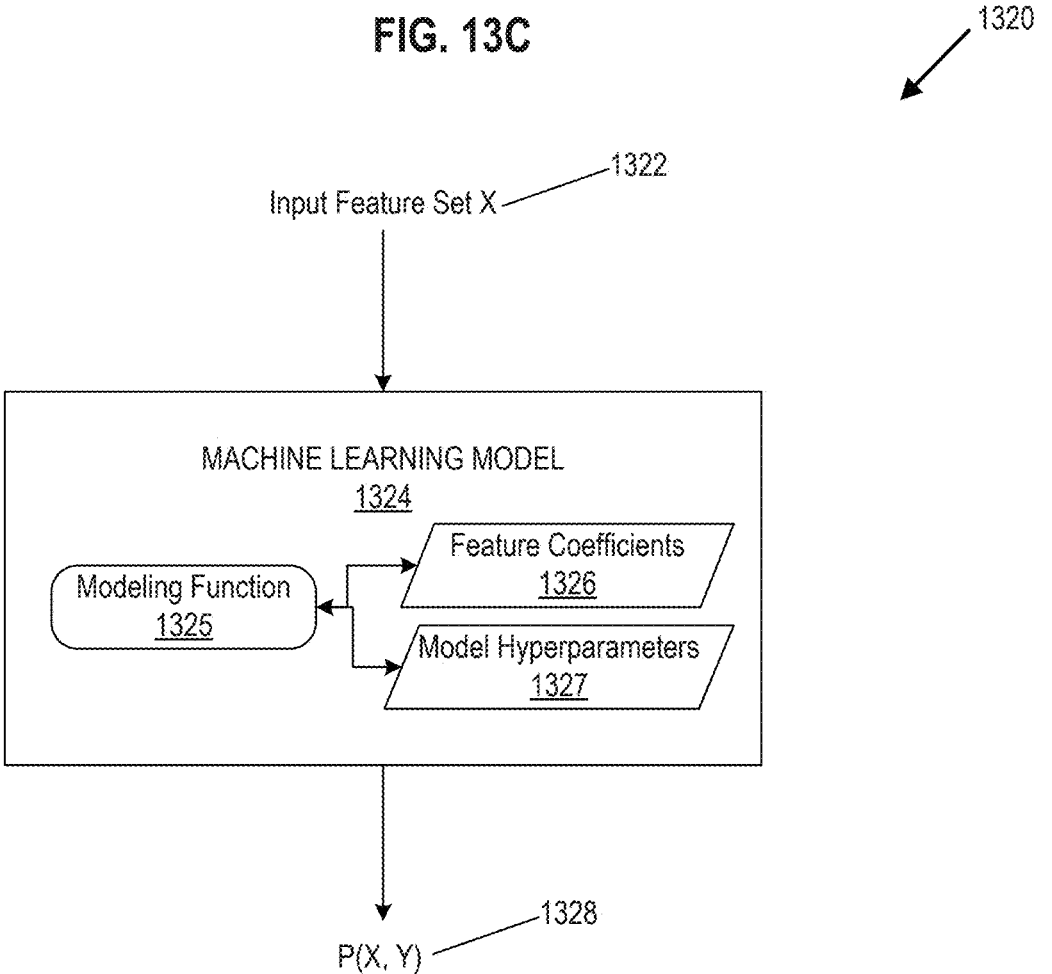

FIG. 13C is a block diagram of a machine learning model that is capable of being used by and/or included in an agent system in accordance with some examples of the present disclosure.

A generative machine learning model (GMLM) or generative model uses artificial intelligence technology, e.g., machine learning, neural networks, to machine-generate digital content based on model inputs and the previously existing data with which the model has been trained. Whereas discriminative models are based on conditional probabilities P (y|x), that is, the probability of an output y given an input x, generative models capture joint probabilities P (x, y), that is, the likelihood of x and y occurring together. A generative language model is a particular type of GMLM that is capable of generating content in response to model input. The model input includes a task description, also referred to as a prompt. The task description includes instructions (e.g., natural language instructions such as "please generate a summary of these search results") and/or examples of digital content (e.g., examples of summaries written using a particular writing style or tone). Portions of the task description are in the form of natural language text, such as a question or a statement, in some examples. Alternatively or in addition, a task description or prompt includes non-text forms of content, such as digital imagery and/or digital audio.

In the example of FIG. 13C, a machine learning system 1320 includes a machine learning model 1324. Machine learning model 1324 is or includes a probabilistic or statistical machine learning model that uses a modeling function to model the likelihood of cooccurrence of input feature set X and output Y; e.g., the likelihood of X and Y occurring together. The machine learning model 1324 is configured via training, calibration, and validation processes such as those described with reference to FIG. 13A. Some examples of the machine learning model 1324 are alternatively or additionally configured as a discriminative model. In some examples, a machine learning model performs both discriminative and generative tasks.

The machine learning model 1324 includes a modeling function 1325. The modeling function 1325 includes feature coefficients or weights 1326. The values of one or more of the feature coefficients is established via machine learning model training, calibration, and validation processes based on training data sets and/or validation data sets. The machine learning model 1324 also includes model hyperparameters 1327. The values of model hyperparameters 1327 are selected or tuned at a global level and generally are not modified based on specific instances of training data.

The model input 1322 (e.g., input feature set X) includes numerical features, categorical features, quantitative values, qualitative values, raw features, compressed representations of raw features (e.g., vector representations or embeddings), and/or other forms of digital content.

In response to an instance of model input 1322 (e.g., instance of feature set X), machine learning model 1324 computes and outputs an estimated output P(X,Y) 1328. The estimated output produced by machine learning model 1324 based on a model input 1322 is in the form of an input-output pair and a score or simply includes the highest scoring input-output pair. In some examples, the output is stored in a data storage for subsequent lookup or provided to one or more downstream systems, processes, devices, frameworks, and/or services.

The machine learning model 1324 is configured and implemented as a network service, in some examples. The machine learning model 1324 is configured using a machine learning library and an application programming interface (API), e.g., via an API call such as ML_library.model(p1, p2, . . . pn), where p indicates a parameter or argument of the call, such as a model hyperparameter or an input feature set identifier, in some examples. Once configured, the machine learning model 1324 and/or its output are hosted on one or more servers and/or data storage devices for accessibility to one or more requesting processes, systems, devices, frameworks, or services.

The examples shown in FIG. 13C and the accompanying description, above are provided for illustration purposes. This disclosure is not limited to the described examples.

Figure 13D:
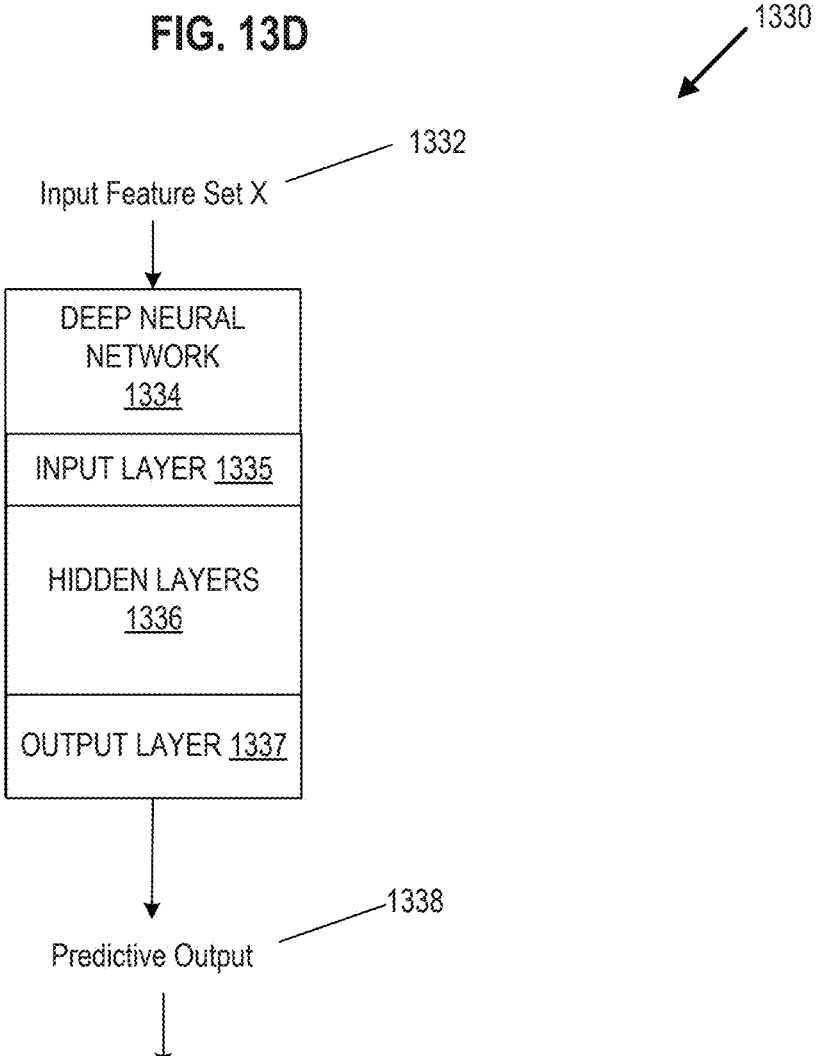

FIG. 13D is a block diagram of a machine learning model that is capable of being used by and/or included in an agent system in accordance with some examples of the present disclosure.

A specific example of a machine learning model is a deep neural network. Some machine learning models, such as multi-task models, include multiple interconnected deep neural networks. In the example of FIG. 13D, a machine learning system 1330 includes a deep neural network 1334. The deep neural network 1334 is configured via training, calibration, and validation processes such as those described with reference to FIG. 13A. Some examples of the deep neural network 1334 are configured as a discriminative model and/or a generative model. In some examples, a deep neural network 1334 performs both discriminative and generative tasks.

In computer science, deep learning refers to a class of machine learning that uses computer-implemented neural networks to generate predictive output, where the neural networks have one or more internal (or hidden) layers between and in addition to an input layer and an output layer. Each layer in a deep neural network (or deep learning model) performs a set of computational operations on the input to that layer.

Each layer of the neural network includes a set of nodes that each apply an activation function to one or more portions of the input to that layer to produce an output. The activation function performs a nonlinear transformation of the input and sends its output to the next layer of the network. For example, if the output of the activation function is equal to or exceeds a threshold value, the node passes its output to the next layer, but if the output is less than the threshold value, the output passed to the next layer is zero or a null value. The type of activation function used at a node or layer is selected based on the particular predictive task for which the model is configured and/or based on the model architecture. Examples of activation functions include the SoftMax function (for multi-class classification), the sigmoid function (for internal layers), and rectifier functions (e.g., ramp, or Rectified Linear Unit (ReLU)).

The input layer of a deep neural network receives and processes the model input, which includes raw data and/or pre-processed data such as aggregations, derivations, embeddings or vector representations of raw data. In some examples, the output of a layer of the neural network is connected to and used as the input to one or more other layers, such that each layer of the deep learning model creates a different (e.g., progressively more highly processed) set of information relating to the original, raw input (e.g., producing a different representation of the raw input at each layer). Weights are applied to the output of each node of each layer before the output is propagated to the next layer. The weight values are adjusted so that the outputs of some nodes or layers influences the final output more or less than the outputs of other nodes or layers, in some examples. The output layer of the neural network produces the final predictive output, which is made accessible to one or more downstream models, applications, systems, operations, processes or services.

Backpropagation is an example of a method that is often used to train a neural network model. In a feedforward step, the training data is propagated from the input layer through the internal layers to the final output by computing each successive layer's outputs up to and including the final output. A loss function (or cost function, such as cross-entropy, log loss, or squared error loss, or a logistic function) is used to compute error for the final output, for example, based on a comparison of the difference between the output predicted by the model and the expected or target output to the error computed on a previous iteration. The model weights (or parameters or coefficients) are adjusted to reduce the error, iteratively, until the error falls within an acceptable range or the error stops changing by more than a threshold amount (e.g., the model converges). In backpropagation, these iterative weight adjustments are propagated backward from the output layer through the internal layers. The gradient of the loss function or gradient descent (e.g., stochastic gradient descent) is often used in backpropagation.

In some examples, recommendation systems use deep learning models to generate predictive output and use the predictive output to configure or control one or more downstream operations. In some examples, recommendation systems compute statistical or probabilistic predictions that are used to select, rank, or sort digital content items for presentation to users via electronic devices. Examples of downstream operations that are capable of using the predictive output of deep learning recommendation systems include news feeds, automated product recommendations, and automated connection (e.g., friend, follower, or contact) recommendations for online platforms such as social networks. Other examples include systems that support human decision making, such as systems that use artificial intelligence to generate recommendations for health care, financial services, training, education, and/or other fields or topics. Still other examples include control systems that use artificial intelligence to recommend courses of action to other components of automated systems in operational environments, such as "smart" vehicles, appliances, robots, and other automated devices.

In the example of FIG. 13D, the deep neural network 1334 includes an input layer 1335, one or more hidden layers 1336, and an output layer 1337. The input layer 1335 receives one or more batches of model input 1323 (e.g., input feature sets X). In some examples, the input layer 1335 includes a number of nodes that corresponds to the number of input features in a given input feature set X. The output of the input layer 1335 becomes the input to the one or more hidden layers 1336. The output of the one or more hidden layers 1336 becomes the input to the output layer 1337. The output layer 1337 outputs the final predictive output 1338. In some examples, each of the layers of the deep neural network 1334 is fully connected in the sense that the output of each node of each layer is connected to the input of each node of the next subsequent layer. In other examples, the deep neural network 1334 includes portions that are not fully connected.

The deep neural network 1334 is capable of being configured and implemented as a network service. In some examples, the deep neural network 1334 is configured using a machine learning library and an application programming interface (API), e.g., via an API call such as ML_library.model(p1, p2, . . . pn), where p indicates a parameter or argument of the call, such as a model hyperparameter or an input feature set identifier. Once configured, the deep neural network 1334 and/or its output are hosted on one or more servers and/or data storage devices for accessibility to one or more requesting processes, systems, devices, frameworks, or services.

The input feature set X includes numerical features, categorical features, quantitative values, qualitative values, raw features, compressed representations of raw features (e.g., vector representations or embeddings), natural language, and/or other forms of digital content. Embedding refers to a numerical representation of a set of features, in some examples. An embedding encodes information, e.g., a set of features associated with an entity and/or attribute, relative to an embedding space. Embeddings and embedding spaces are generated by artificial intelligence (AI) models. An embedding is often expressed as a vector, where each dimension of the vector includes a numerical value that is an integer or a real number (e.g., a floating point value). The numerical value assigned to a given dimension of the vector conveys information about the data represented by the embedding, relative to the embedding space, also referred to as a vector space. The embedding space (or vector space) includes all of the possible values of each dimension of the vector. The embedding space is defined by the way in which the AI model used to generate the vector has been trained and configured, including the training data used to train the AI model. In some examples, train as used herein refers to an iterative process of applying an AI algorithm to one or more sets of training data, analyzing the output of the AI model in comparison to expected model output using a loss function (also referred to as a cost function or error function), adjusting values of one or more parameters and/or coefficients of the AI model, and repeating the process until the difference between the actual model output and the expected model output falls within an acceptable range of error or tolerance.

Embedding-based retrieval (EBR) is a method of searching for similar digital content, such as documents or portions of documents. Embedding-based retrieval involves converting digital data, e.g., sets of features, to embeddings and then using a similarity algorithm, such as nearest-neighbor search or cosine similarity, to identify embeddings that are similar to one another. Match or map refers to an exact match or an inexact match, in various examples. Match or map refers to a machine-determined predicted or estimated degree of relevance, similarity or compatibility between entities or data items that satisfies (e.g., meets or exceeds) a threshold level of relevance, similarity or compatibility, where the threshold level of relevance, similarity or compatibility is variable based on the requirements of a particular design or implementation. The threshold level of relevance, similarity, or compatibility is set lower or higher for different types of matching or mapping, in some examples.

In response to an instance of feature set X, deep neural network 1334 computes and outputs a predictive output 1338. The predictive output 1338 is stored in a data storage for subsequent lookup or provided to one or more downstream systems, processes, devices, frameworks, and/or services.

The deep neural network 1334 is configured and implemented as a network service, in some examples. The deep neural network 1334 is configured using a machine learning library and an application programming interface (API), e.g., via an API call such as ML_library.model(p1, p2, . . . pn), where p indicates a parameter or argument of the call, such as a model hyperparameter or an input feature set identifier, in some examples. Once configured, the machine learning model 1306 and/or its output are hosted on one or more servers and/or data storage devices for accessibility to one or more requesting processes, systems, devices, frameworks, or services.

The examples shown in FIG. 13D and the accompanying description, above are provided for illustration purposes. This disclosure is not limited to the described examples.

Figure 13E:
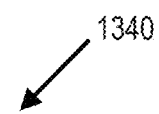

FIG. 13E is a block diagram of a machine learning model that is capable of being used by and/or included in an agent system in accordance with some examples of the present disclosure.

A specific example of a deep neural network is a sequence to sequence model, which takes sequential data such as words, phrases, or images (sequences of characters, tokens, or pixel values) or time series data as input and outputs sequential data. An example of a sequence to sequence model is an encoder-decoder model. In an encoder-decoder model, a first neural network known as an encoder transforms the model input into an encoded version of the model input, e.g., an embedding or vector. In some examples, an encoder transforms a sentence or an image into a sequence of numbers. A second neural network known as the decoder takes the output of the encoder (e.g., the encoded version of the model input) and decodes it. In some examples, a decoder transforms the sequence of numbers created and output by the encoder into a translated sentence or another form of output.

A specific example of an encode-decoder model is a transformer model. A transformer model is a deep neural network encoder-decoder model that uses a technique called attention or self-attention to detect relationships and dependencies among data elements in a sequence. Transformer models are capable of being used to perform various natural language processing (NLP) tasks and other machine learning tasks, such as generating content based on input attributes or tokens. In some examples, the attention mechanism facilitates the detection of relationships and dependencies between words and phrases.

In the example of FIG. 13E, a machine learning system 1340 includes a transformer model 1342. The transformer model 1342 is constructed using a neural network-based machine learning model architecture. In some examples, the neural network-based architecture includes one or more self-attention layers (e.g., multi-head attention layer 1345, masked multi-head attention layer 1355, and multi-head attention layer 1357) that allow the model to assign different weights to different features included in the model input. Alternatively, or in addition, the neural network architecture includes feed-forward layers (e.g., feed-forward layer 1347 and feed-forward layer 1359) and residual connections (e.g., add & norm layer 1346, add & norm layer 1348, add & norm layer 1356, add & norm layer 1358, add & norm layer 1360) that allow the model to machine-learn complex data patterns including relationships between different states, actions, and rewards in multiple different contexts. In some examples, transformer model 1342 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the user trajectory processing system.

As shown in FIG. 13E, transformer model 1342 feeds embedded subsequences 1350 into encoder 1344 and decoder 1354. For example, transformer model 1342 feeds inputs of embedded subsequences 1350 into multi-head attention layer 1345 of encoder 1344. In some examples, inputs of embedded subsequences 1350 are a series of tokens and the output of the encoder (e.g., encoder output representation 1352), is a fixed-dimensional representation for each of the tokens of embedded subsequences 1350 including an embedding for inputs of embedded subsequences 1350. Transformer model 1342 feeds encoder output representation 1352 and outputs of embedded subsequences 1350 into decoder 1354 which generates a sequence of tokens based on encoder output representation 1352 and the input embeddings. While a specific architecture of encoder 1344 and decoder 1354 is shown for simplicity, as explained above, the exact number and arrangement of layers of each type as well as the hyperparameter values used to configure the model are determined based on the requirements of a particular design or implementation. Therefore, in some examples, transformer model 1342 includes different numbers, arrangements, and types of layers, such that each input token of embedded subsequences 1350 is fed through the layers of transformer model 1342 and is dependent on other input tokens of embedded subsequences 1350.

Transformer model 1342 illustrates a generic encoder/decoder model for simplicity. In such a model, encoder 1344 encodes the input into a fixed-length vector (e.g., encoder output representation 1352) and decoder 1354 decodes the fixed-length vector into an output sequence. Encoder 1344 and decoder 1354 are trained together to maximize the conditional log-likelihood of the output given the input. Once trained, encoder 1344 and decoder 1354 are capable of generating output given an input sequence or scoring a pair of input-output sequences based on their probability of coexistence.

As shown in FIG. 13E, encoder 1344 includes multi-head attention layer 1345, add & norm layer 1346, feed-forward layer 1347, and add & norm layer 1348. Multi-head attention layer 1345 receives inputs of embedded subsequences 1350 and computes output representations for each of the input tokens of embedded subsequences 1350 based on the inputs of embedded subsequences 1350. For example, multi-head attention layer 1345 converts each input token of embedded subsequences 1350 into queries, keys, and values using query, key, and value matrices. Multi-head attention layer 1345 computes the output representation of the input tokens of embedded subsequences 1350 as the weighted sum of the values of all of the input tokens of embedded subsequences 1350. Multi-head attention layer 1345 computes the weights for the weighted sum by applying a compatibility function to the corresponding key and query for the value. For example, multi-head attention layer 1345 uses a scaled dot product on the key and query of an input token to determine a weight to apply to a value of the input token. Multi-head attention layer 1345 includes multiple attention blocks which each compute an output representation for the input token. Multi-head attention layer 1345 aggregates the output representations of these attention blocks to generate a final output representation for multi-head attention layer 1345.

Transformer model 1342 feeds the output representation generated by multi-head attention layer 1345 and residual connections from the inputs of embedded subsequences 1350 into add & norm layer 1346. By including these residual connections, transformer model 1342 ensures that it does not "forget" features of embedded subsequences 1350 during training. Forgetting in the context of machine learning refers to a phenomenon that occurs as the model continues to be sequentially trained on different datasets over time. Because the model continually adjusts the values of feature coefficients as it is trained on subsequent training datasets, these continuous adjustments of the feature coefficient values is capable of causing the influence of the datasets used earlier in training on those coefficient values to be lost or diluted.

Add & norm layer 1346 sums the output representation generated by multi-head attention layer 1345 and the residual connections from inputs of embedded subsequences 1350 and applies a layer normalization to the result. In some examples, the add & normal layers also apply a SoftMax function to generate action probabilities for the inputs of embedded subsequences 1350. For example, add & norm layer 1346 generates estimated probabilities $\hat{p}(a_k|s)$, where $a_k$ is the action policy and s is the state features.

Transformer model 1342 feeds the normalized output of add & norm layer 1346 into feed-forward layer 1347. Feed-forward layer 1347 is a feed-forward network that receives the normalized output, feeds it through the hidden layers of feed-forward layer 1347, and then feeds the output of feed-forward layer 1347 into add & norm layer 1348. Feed-forward layer 1347 processes the information received from add & norm layer 1346 and updates the hidden layers of feed-forward layer 1347 based on the information (e.g., during training) and/or generate an output based on the hidden layers processing the information (e.g., during evaluation and/or inference). For example, during training, transformer model 1342 updates the weights of the hidden layers of feed-forward layer 1347 based on the inputs and the loss of the transformer system. Further details with regard to the loss of the transformer system as well as training objectives and metrics are discussed below. As an alternative example, during evaluation and/or inference, the weights of the hidden layers of feed-forward layer 1347 are used to determine the output representation 1352 of each of the input tokens of embedded subsequences 1350.

Transformer model 1342 feeds the output of feed-forward layer 1347 into add & norm layer 1348 as well as residual connections from the output of add & norm layer 1346. Add & norm layer 1348 sums the output of feed-forward layer 1347 with the residual connections from add & norm layer 1346 and applies a layer normalization to the result to generate encoder output representation 1352. Transformer model 1342 feeds encoder output representation 1352 into multi-head attention layer 1357 of decoder 1354 as explained below.

Masked multi-head attention layer 1355 receives outputs of embedded subsequences 1350 and computes representations for each of the output tokens of embedded subsequences 1350 based on masked outputs of embedded subsequences 1350. For example, masked multi-head attention layer 1355 computes representations for each of the output tokens of embedded subsequences 1350 based on previous output tokens while masking future output tokens. Masked multi-head attention layer 1355 therefore only computes representations using tokens that come before the token masked multi-head attention layer 1355 is trying to predict.

Transformer model 1342 feeds the representation generated by masked multi-head attention layer 1355 and residual connections from the outputs of embedded subsequences 1350 into add & norm layer 1356. Add & norm layer 1356 sums the representation generated by masked multi-head attention layer 1355 and the residual connections from outputs of embedded subsequences 1350 and applies a layer normalization to the result.

Transformer model 1342 feeds the normalized output of add & norm layer 1356 into multi-head attention layer 1357. Multi-head attention layer 1357 receives the normalized output of add & norm layer 1356 as well as encoder output representation 1352 from encoder 1344 and generates a representation based on both.

Transformer model 1342 feeds the representation generated by multi-head attention layer 1357 and residual connections from the output of add & norm layer 1356 into add & norm layer 1358. Add & norm layer 1358 sums the representation generated by multi-head attention layer 1357 and the residual connections from the output of add & norm layer 1356 and applies a layer normalization to the result.

Transformer model 1342 feeds the normalized output of add & norm layer 1358 into feed-forward layer 1359. Feed-forward layer 1359 is a feed-forward network that receives the normalized output, feeds it through the hidden layers of feed-forward layer 1359, and then feeds the output of feed-forward layer 1359 into add & norm layer 1369. Feed-forward layer 1359 processes the information received from add & norm layer 1358 and updates the hidden layers of feed-forward layer 1359 based on the information (e.g., during training) and/or generate an output based on the hidden layers processing the information (e.g., during evaluation and/or inference). For example, during training, transformer model 1342 updates the weights of the hidden layers of feed-forward layer 1359 based on the inputs and the loss of the transformer system. Further details with regard to the loss of the transformer system as well as training objectives and metrics are discussed below. As an alternative example, during evaluation and/or inference, the weights of the hidden layers of feed-forward layer 1359 are used to determine the output of feed-forward layer 1359.

Transformer model 1342 feeds the output of feed-forward layer 1359 into add & norm layer 1360 as well as residual connections from the output of add & norm layer 1358. Add & norm layer 1360 sums the output of feed-forward layer 1359 with the residual connections from add & norm layer 1358 and applies a layer normalization to the result to generate an output.

Transformer model 1342 generates output probabilities 1362 from the output of add & norm layer 1360. For example, transformer model 1342 applies a linear transformation and a SoftMax function to the output of add & norm layer 1360 to generate a normalized vector of output probabilities 1362.

In some examples, such as during training, transformer model 1342 determines a loss for the system based on output probabilities 1362. In some examples, transformer model 1342 uses deep quantile regression for training. In such an example, output probabilities 1362 includes a mean prediction probability and estimations for the upper and lower bounds of the range of prediction such that output probabilities 626 includes an uncertainty range. In one example, the loss function of transformer model 1342 using deep quantile regression is represented by the following equation:

$$\mathcal{L}(\xi_i|\alpha) = \begin{cases} \alpha\xi_i & \text{if } \xi_i \geq 0, \\ (\alpha-1)\xi_i & \text{if } \xi_i < 0 \end{cases},$$

where $\alpha$ is the required quantile (a value between 0 and 1 representing the desired quantile) and $\zeta_i = y_i - f(x_i)$, where $f(x_i)$ is the mean predicted by output probabilities 1362, $y_i$ are the outputs of embedded subsequences 1350 and $x_i$ are the inputs of embedded subsequences 1350. The loss over the entirety of a dataset of embedded subsequences 1350 where embedded subsequences 1350 has a length of N is capable of being represented by the following equation:

$$\mathcal{L}(y, f|\alpha) = \frac{1}{N}\sum_{i=1}^{N}\mathcal{L}(y_i - f(x_i)|\alpha).$$

In such examples, output probabilities 1362 includes three values: a mean prediction, a lower bound quantile, and an upper bound quantile. In some examples, transformer model 1342 uses upper confidence bound or Thompson sampling. In some examples, transformer model 1342 determines model output 1364 based on the mean prediction, the lower bound quantile, and the upper bound quantile based on upper confidence bound and/or Thompson sampling.

In some examples, transformer model 1342 is trained to optimize the model parameters with trajectory-specific normalizations using cross-entropy loss. For example, transformer model 1342 uses a loss function represented by the following equation:

$$L(\theta) = \frac{1}{N_{traj}} \sum_i^{N_{traj}} \sum_{t=1}^{T_i} w_i \sum_k \log\left(\hat{p}\left(a_k^{(it)} \middle| s^{(it)}\right)\right),$$

where $N_{traj}$ is the trajectory count, $w_i$ is the normalization weight, $a_k^{(it)}$ is the predicted action for the trajectory i at timestep t, and $s^{(it)}$ is the state of the online system for the trajectory i at timestep t. In some examples, transformer model 1342 uses trajectory-wise normalization. In some examples, the add & norm layers of transformer model 1342 normalize the weights according to the following equation:

$$w_i = \frac{1}{T_i},$$

where $T_i$ is the length of trajectory i. In some examples, transformer model 1342 uses global normalization. In some examples, the add & norm layers of transformer model 1342 normalize the weights according to the following equation: $w_i=c$, where c is a positive scalar. In some examples, the scalar c is predetermined.

Language models, including large language models and other generative models, are capable of being implemented using transformer models. A generative model is commonly constructed using a neural network-based machine learning model architecture. In some examples, the neural network-based architecture includes one or more input layers that receive task descriptions (or prompts), generate one or more embeddings based on the task descriptions, and pass the one or more embeddings to one or more other layers of the neural network. In other examples, the one or more embedding are generated based on the task description by a pre-processor, the embeddings are input to the generative language model, and the generative language model outputs digital content, e.g., natural language text or a combination of natural language text and non-text output, based on the embeddings.

The neural network-based machine learning model architecture of the generative model often includes one or more self-attention layers that allow the model to assign different weights to different portions of the model input (e.g., different words or phrases included in the model input). Alternatively or in addition, the neural network architecture includes feed-forward layers and residual connections that allow the model to machine-learn complex data patterns including relationships between different words or phrases in multiple different contexts. The language model or other type of generative model is capable of being constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation.

In some examples, the neural network-based machine learning model architecture of a generative model includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that significantly advance the state-of-the-art in various linguistic tasks such as machine translation, sentiment analysis, question answering and sentence similarity. In some examples, the neural network-based machine learning model architecture includes or is based on one or more predictive content neural models that receive digital content input and generate one or more outputs based on processing the digital content with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on digital content input. Accordingly, in some examples, a multimodal neural network is capable of outputting digital content that includes a combination of two or more of text, images, video or sound.

A generative language model is capable of being trained on a large dataset of natural language text. In some examples, training samples of natural language text extracted from publicly available data sources are used to train a generative language model. The size and composition of the dataset used to train the generative language model are variable according to the requirements of a particular design or implementation. In some examples, the dataset used to train the generative language model includes hundreds of thousands to millions or more different natural language text training samples. In some examples, a generative language model includes multiple generative language models trained on differently sized datasets. In some examples, a generative language model includes a comprehensive but low capacity model that is trained on a large data set and used for generating examples. The same generative language model also includes a less comprehensive but high capacity model that is trained on a smaller data set, such that the high capacity model is used to generate outputs based on data obtained from the low capacity model. In some examples, reinforcement learning is used to further improve the output of the generative language model. In reinforcement learning, ground-truth examples of desired model output are paired with respective prompts, and these prompt-output pairs are used to train or fine tune the generative language model.

Prompt engineering is a technique used to optimize the structure and/or content of a prompt input to a generative model. Some prompts include examples of outputs to be generated by the generative model (e.g., few-shot prompts), while other prompts include no examples of outputs to be generated by the generative model (e.g., zero-shot prompts). Chain of thought prompting is a prompt engineering technique where the prompt includes a request that the model explain reasoning in the output. For example, the generative model performs the task described in the prompt using a series of steps and outputs reasoning as to each step performed.

Supervised learning is a method of training (or fine-tuning) a machine learning model given input-output pairs, where the output of the input-output pair is known (e.g., an expected output, a labeled output, a ground truth). Other training methods including semi-supervised learning or federated learning are capable of being used to train a machine learning model or to fine-tune a pretrained machine learning model.

The transformer model 1342 is configured and implemented as a network service, in some examples. The transformer model 1342 is configured using a machine learning library and an application programming interface (API), e.g., via an API call such as ML_library.model(p1, p2, . . . pn), where p indicates a parameter or argument of the call, such as a model hyperparameter or an input identifier. Once configured, the transformer model 1342 and/or its output are hosted on one or more servers and/or data storage devices for accessibility to one or more requesting processes, systems, devices, frameworks, or services.

The examples shown in FIG. 13E and the accompanying description, above are provided for illustration purposes. This disclosure is not limited to the described examples.

FIG. 14 is a block diagram of an example computer system including components of an agent system in accordance with some examples of the present disclosure.

In FIG. 14, an example machine of a computer system 1400 is shown, within which a set of instructions for causing the machine to perform any of the methodologies discussed herein are capable of being executed. In some examples, the computer system 1400 corresponds to a component of a networked computer system (e.g., any one or more of the components shown in FIG. 1, FIG. 3, FIG. 4, FIG. 6, FIG. 9A-9H, or FIG. 12) that includes, is coupled to, or utilizes a machine to execute an operating system to perform operations corresponding to any one or more components shown in FIG. 1, FIG. 3, FIG. 4, FIG. 6, FIG. 9A-9H, or FIG. 12. For example, computer system 1400 corresponds to a portion of a computing system when the computing system is executing a portion of any one or more components shown in FIG. 1, FIG. 3, FIG. 4, FIG. 6, FIG. 9A-9H, or FIG. 12.

The machine is connected (e.g., networked) to other machines in a network, such as a local area network (LAN), an intranet, an extranet, and/or the Internet. The machine operates in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM) or Rambus DRAM (RDRAM), etc.), a memory 1403 (e.g., flash memory, static random access memory (SRAM), etc.), an input/output system 1410, and a data storage system 1440, which communicate with each other via a bus 1430.

Processing device 1402 represents one or more general-purpose processing devices such as a microprocessor, a central processing unit, or the like. In some examples, the processing device is a complex instruction set computing (CISC) microprocessor, reduced instruction set computing (RISC) microprocessor, very long instruction word (VLIW) microprocessor, or a processor implementing other instruction sets, or processors implementing a combination of instruction sets. In some examples, processing device 1402 includes a special-purpose processing device such as an application specific integrated circuit (ASIC), a field programmable gate array (FPGA), a digital signal processor (DSP), network processor, or the like. The processing device 1402 is to execute instructions 1412 for performing the operations and steps discussed herein.

In some examples of FIG. 14, agent system 1450 represents portions of agent system 1280 while the computer system 1400 is executing those portions of agent system 1280. Instructions 1412 include portions of agent system 1450 when those portions of the agent system 1450 are being executed by processing device 1402. Thus, the agent system 1450 is shown in dashed lines as part of instructions 1412 to illustrate that, at times, portions of the agent system 1450 are executed by processing device 1402. For example, when at least some portion of the agent system 1450 is embodied in instructions to cause processing device 1402 to perform the method(s) described herein, some of those instructions are read into processing device 1402 (e.g., into an internal cache or other memory) from main memory 1404 and/or data storage system 1440. In some examples, it is not required that all of the agent system 1450 be included in instructions 1412 at the same time and portions of the agent system 1450 are stored in another component of computer system 1400 at other times, e.g., when a portion of the agent system 1450 is not being executed by processing device 1402.

The computer system 1400 further includes a network interface device 1408 to communicate over the network 1420. Network interface device 1408 provides a two-way data communication coupling to a network. In some examples, network interface device 1408 includes an integrated-services digital network (ISDN) card, cable modem, satellite modem, or a modem to provide a data communication connection to a corresponding type of telephone line. In some examples, network interface device 1408 includes a local area network (LAN) card to provide a data communication connection to a compatible LAN. Wireless links are included, in some examples. Network interface device 1408 sends and receives electrical, electromagnetic, or optical signals that carry digital data representing various types of information.

The network link is capable of providing data communication through one or more networks to other data devices. In some examples, a network link provides a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1400.

Computer system 1400 is capable of sending messages and receiving data, including program code, through the network(s) and network interface device 1408. In some examples, a server is capable of transmitting a requested code for an application program through the Internet and network interface device 1408. The received code is executed by processing device 1402 as it is received, and/or stored in data storage system 1440 or other non-volatile storage for later execution.

The input/output system 1410 includes an output device, such as a display, for example a liquid crystal display (LCD) or a touchscreen display, for displaying information to a computer user, or a speaker, a haptic device, or another form of output device. The input/output system 1410 includes an input device, for example, alphanumeric keys and other keys configured for communicating information and command selections to processing device 1402. An input device sometimes includes a cursor control, such as a mouse, a trackball, or cursor direction keys for communicating direction information and command selections to processing device 1402 and for controlling cursor movement on a display. An input device sometimes includes a microphone, a sensor, or an array of sensors, for communicating sensed information to processing device 1402. Examples of sensed information include voice commands, audio signals, geographic location information, haptic information, and/or digital imagery, for example.

The data storage system 1440 includes a machine-readable storage medium 1442 (also known as a computer-readable medium) on which is stored instructions 1444 or software embodying any of the methodologies or functions described herein. The instructions 1444 sometimes reside, completely or at least partially, within the main memory 1404 and/or within the processing device 1402 during execution thereof by the computer system 1400, the main memory 1404 and the processing device 1402 also constituting machine-readable storage media. In one example, the instructions 1444 include instructions to implement functionality corresponding to an automated agent or agent system (e.g., any one or more of the components shown in any one or more components shown in FIG. 1, FIG. 3, FIG. 4, FIG. 6, FIG. 9A-9H, or agent system 1280 of FIG. 12).

Dashed lines are used in FIG. 14 to indicate that it is not required that the agent system be embodied entirely in instructions 1412, 1414, and 1444 at the same time. In one example, portions of the agent system are embodied in instructions 1414, which are read into main memory 1404 as instructions 1414, and portions of instructions 1412 are read into processing device 1402 as instructions 1412 for execution. In another example, some portions of the agent system are embodied in instructions 1444 while other portions are embodied in instructions 1414 and still other portions are embodied in instructions 1412.

While the machine-readable storage medium 1442 is shown in an example to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

The examples shown in FIG. 14 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure refers to actions and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations described herein. This apparatus is specially constructed for the intended purposes, in some examples. In other examples, the apparatus includes a general-purpose computer selectively activated or reconfigured by a computer program stored in the computer. In some examples, a computer system or other data processing system including any one or more of the components shown in FIG. 1, FIG. 2, FIG. 3, FIG. 4, FIG. 5, FIG. 6, FIG. 9A-FIG. 9G, FIG. 10, FIG. 11, FIG. 12, FIG. 13A-13E and/or FIG. 14, carries out the above-described computer-implemented methods in response to its processor executing a computer program (e.g., a sequence of instructions) contained in a memory or other non-transitory machine-readable storage medium. Such a computer program is be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems are capable of being used. A more specialized apparatus is constructed, in some examples. Examples of structure for these systems are provided in the description. Aspects of this disclosure are not limited to any particular programming language. A variety of programming languages are usable to implement the various aspects of this disclosure.

Some examples of the present disclosure are provided as a computer program product, or software, which includes a machine-readable medium having stored thereon instructions, which is used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein are capable of being implemented with privacy safeguards to protect user privacy. Furthermore, the techniques described herein are capable of being implemented with user privacy safeguards to prevent unauthorized access to personal data and confidential data. The training of the AI models described herein is executed to benefit all users fairly, without causing or amplifying unfair bias.

According to some examples, the techniques for the models described herein do not make inferences or predictions about individuals unless requested to do so through an input. According to some examples, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users are capable of having full control over the visibility of their content and who sees their content, as is controlled via the visibility settings. According to the techniques described herein, users are capable of having full control over the level of their personal data that is shared and distributed between different AI platforms that provide different functionalities.

According to the techniques described herein, users are capable of choosing to share personal data with different platforms to provide services that are more tailored to the users. In instances where the users choose not to share personal data with the platforms, the choices made by the users will not have any impact on their ability to use the services that they had access to prior to making their choice.

According to the techniques described herein, users are capable of having full control over the level of access to their personal data that is shared with other parties. According to the techniques described herein, personal data provided by users is capable of being processed to determine prompts when using a generative AI feature at the request of the user, but not to train generative AI models. In some examples, users are capable of providing feedback while using the techniques described herein, which is capable of being used to improve or modify the platform and products. In some examples, any personal data associated with a user, such as personal information provided by the user to the platform, is deleted from storage upon user request. In some examples, personal information associated with a user is permanently deleted from storage when a user deletes their account from the platform.

According to the techniques described herein, personal data is capable of being removed from any training dataset that is used to train AI models. In some examples, the techniques described herein utilize tools for anonymizing member and customer data. A user's personal data is capable of being redacted and minimized in training datasets for training AI models through delexicalization tools and other privacy enhancing tools for safeguarding user data. The techniques described herein are capable of minimizing use of any personal data in training AI models, including removing and replacing personal data. In examples of the techniques described herein, notices are communicated to users to inform how their data is being used and users are provided controls to opt-out from their data being used for training AI models.

According to some examples, tools are used with the techniques described herein to identify and mitigate risks associated with AI in all products and AI systems. In some examples, notices are provided to users when AI tools are being used to provide features.

Illustrative examples of the technologies disclosed herein are provided below. An example of the technologies includes any of the examples described herein, or any combination of any of the examples described herein, or any combination of any portions of the examples described herein.

In some aspects, the techniques described herein relate to a method including: sending query input and a query input summarization instruction to a generative machine learning model (GMLM), wherein the query input is obtained via a first device and the query input summarization instruction is to cause the GMLM to generate and output a query input summary of a combination of the query input and context data associated with the query input; sending the query input summary and a query execution instruction to the GMLM, wherein the query execution instruction is to cause the GMLM to provide query results using multiple different queries and the query input summary; using the query results and a query result evaluation instruction to cause the GMLM to perform a comparison of a query result of the identified query results with the query input summary and summarize the comparison; receiving a query result evaluation summary, wherein the query result evaluation summary is a summary of the comparison of the query result with the query input summary, and wherein the query result evaluation summary is generated and output by the GMLM; receiving a signal from a cursor position selecting first content from within a presentation of second content associated with the query result evaluation summary via a second device, wherein the signal includes a measure of alignment between the query result evaluation summary and the query input summary; and updating the query input summarization instruction to include the signal in the query input summary.

In some aspects, the techniques described herein relate to a method, further including: determining a preferred channel of a plurality of different channels available to communicate with the first device, the second device, or the first device and the second device; and receiving the signal via the preferred channel in response to the presentation of the query result evaluation summary via the second device.

In some aspects, the techniques described herein relate to a method, wherein: determining whether the signal meets or exceeds a signal threshold; and updating the query input summarization instruction in response to determining that the signal meets or exceeds the signal threshold.

In some aspects, the techniques described herein relate to a method, wherein: sending the query input and the query input summarization instruction to the GMLM is performed by a query input agent of a multi-agent system; and using the query results and the query result evaluation instruction to cause the GMLM to perform a comparison of the query result with the query input summary and summarize the comparison is performed by a query evaluation agent of the multi-agent system.

In some aspects, the techniques described herein relate to a method, wherein: sending the query input summary and the query execution instruction to the GMLM is performed by a query execution agent of the multi-agent system.

In some aspects, the techniques described herein relate to a method, further including: the query evaluation agent sending a portion of the query result evaluation summary to the query input agent; and the query input agent including a portion of the query result evaluation summary in the query input summarization instruction.

In some aspects, the techniques described herein relate to a method, further including: the query evaluation agent sending a portion of the query result evaluation summary to the query execution agent; and the query execution agent including a portion of the query result evaluation summary in the query execution instruction.

In some aspects, the techniques described herein relate to a system including: a processor; and a memory coupled to the processor, wherein the memory includes an instruction that when executed by the processor causes the processor to: send query input and a query input summarization instruction to a generative machine learning model (GMLM), wherein the query input is obtained via a first device and the query input summarization instruction is to cause the GMLM to generate and output a query input summary of a combination of the query input and context data associated with the query input; send the query input summary and a query execution instruction to the GMLM, wherein the query execution instruction is to cause the GMLM to obtain query results using multiple different queries and the query input summary; use the query results and a query result evaluation instruction to cause the GMLM to perform a comparison of a query result of the identified query results with the query input summary and summarize the comparison; receive a query result evaluation summary, wherein the query result evaluation summary is a summary of the comparison of the query result with the query input summary, and wherein the query result evaluation summary is generated and output by the GMLM using the query result summarization instruction; receive a signal from a cursor position selecting content from within a presentation of the query result evaluation summary via a second device, wherein the signal includes a measure of alignment between the query result evaluation summary and the query input summary; and update the query input summarization instruction to include the signal in the query input summary.

In some aspects, the techniques described herein relate to a system, wherein the instruction, when executed by the processor, further causes the processor to: determine a preferred channel of a plurality of different channels available to communicate with the first device, the second device, or the first device and the second device; and receiving the signal via the preferred channel in response to the presentation of the query result evaluation summary via the second device.

In some aspects, the techniques described herein relate to a system, wherein the instruction, when executed by the processor, further causes the processor to: determine whether the signal meets or exceeds a signal threshold; and update the query input summarization instruction in response to determining that the signal meets or exceeds the signal threshold.

In some aspects, the techniques described herein relate to a system, wherein: sending the query input and the query input summarization instruction to the GMLM is performed by a query input agent of a multi-agent system; and using the query results and the query result evaluation instruction to cause the GMLM to perform a comparison of the query result with the query input summary and summarize the comparison is performed by a query evaluation agent of the multi-agent system.

In some aspects, the techniques described herein relate to a system, wherein: sending the query input summary and the query execution instruction to the GMLM is performed by a query execution agent of the multi-agent system.

In some aspects, the techniques described herein relate to a system, wherein the instruction, when executed by the processor, further causes the processor to: via the query evaluation agent, send a portion of the query result evaluation summary to the query input agent; and via the query input agent, include a portion of the query result evaluation summary in the query input summarization instruction.

In some aspects, the techniques described herein relate to a system, wherein the instruction, when executed by the processor, further causes the processor to: via the query evaluation agent, send a portion of the query result evaluation summary to the query execution agent; and via the query execution agent, include a portion of the query result evaluation summary in the query execution instruction.

In some aspects, the techniques described herein relate to a non-transitory computer-readable medium including an instruction that when executed by a processor causes the processor to: send query input and a query input summarization instruction to a generative machine learning model (GMLM), wherein the query input is obtained via a first device and the query input summarization instruction is to cause the GMLM to generate and output a query input summary of a combination of the query input and context data associated with the query input; send the query input summary and a query execution instruction to the GMLM, wherein the query execution instruction is to cause the GMLM to obtain query results using multiple different queries and the query input summary; use the query results and a query result evaluation instruction to cause the GMLM to perform a comparison of a query result of the identified query results with the query input summary and summarize the comparison; receive a query result evaluation summary, wherein the query result evaluation summary is a summary of the comparison of the query result with the query input summary, and wherein the query result evaluation summary is generated and output by the GMLM using the query result summarization instruction; receive a signal from a cursor position selecting content from within a presentation of the query result evaluation summary via a second device, wherein the signal includes a measure of alignment between the query result evaluation summary and the query input summary; and update the query input summarization instruction to include the signal in the query input summary.

In some aspects, the techniques described herein relate to a non-transitory computer-readable medium, wherein the instruction, when executed by the processor causes the processor to: determine a preferred channel of a plurality of different channels available to communicate with the first device, the second device, or the first device and the second device; and receiving the signal via the preferred channel in response to the presentation of the query result evaluation summary via the second device.

In some aspects, the techniques described herein relate to a non-transitory computer-readable medium, wherein the instruction, when executed by the processor causes the processor to: determine whether the signal meets or exceeds a signal threshold; and update the query input summarization instruction in response to determining that the signal meets or exceeds the signal threshold.

In some aspects, the techniques described herein relate to a non-transitory computer-readable medium, wherein: sending the query input and the query input summarization instruction to the GMLM is performed by a query input agent of a multi-agent system; and using the query results and the query result evaluation instruction to cause the GMLM to perform a comparison of the query result with the query input summary and summarize the comparison is performed by a query evaluation agent of the multi-agent system; and sending the query input summary and the query execution instruction to the GMLM is performed by a query execution agent of the multi-agent system.

In some aspects, the techniques described herein relate to a non-transitory computer-readable medium, wherein the instruction, when executed by the processor, further causes the processor to: via the query evaluation agent, send a portion of the query result evaluation summary to the query input agent; via the query input agent, include a portion of the query result evaluation summary in the query input summarization instruction.

In some aspects, the techniques described herein relate to a non-transitory computer-readable medium, wherein the instruction, when executed by the processor, further causes the processor to: via the query evaluation agent, send a portion of the query result evaluation summary to the query execution agent; and via the query execution agent, include a portion of the query result evaluation summary in the query execution instruction.

In some aspects, the techniques described herein relate to a method, system, apparatus, or non-transitory computer readable medium including any combination of any of the aspects shown or described anywhere in this disclosure, including in any of (i) the preceding claims, (ii) the specification, (iii) the drawings, or (iv) any combination of (i), (ii), (iii).

In some aspects, the techniques described herein relate to a method including: providing a multi-agent system including a query input agent, an orchestrator agent, a query execution agent, and a query evaluation agent, each including an autonomous element executable asynchronously with autonomous elements of other agents of the multi-agent system; via the orchestrator agent, receiving a query input from the query input agent; via the orchestrator agent, providing the query input and a first instruction to a generative machine learning model (GMLM), wherein the first instruction is to cause the GMLM to determine different queries using the query input; via the query execution agent, executing the different queries in parallel using the query input; via the orchestrator agent, determining that the different queries have finished executing; via the query evaluation agent, providing query results of execution of each of the different queries and a second instruction to the GMLM, wherein the second instruction is to cause the GMLM to generate, for each query result, a query result summary including an evaluation of alignment of a query result with the query input; and via the orchestrator agent, using the query result summaries to determine a subset of the query results for presentation via a device.

In some aspects, the techniques described herein relate to a method, further including: via the query input agent, receiving the query input from a user-preferred communication channel; and mapping the query input to a standardized query input.

In some aspects, the techniques described herein relate to a method, wherein the second instruction to the GMLM is to cause the GMLM to generate and include, in the query result summary, an evaluation of the query result as a whole and an attribute-by-attribute comparison of the query input to the query result.

In some aspects, the techniques described herein relate to a method, further including: determining whether the query results include a threshold number of results; and in response to determining that the query results do not include the threshold number of results, iterating between the query execution agent and the query evaluation agent until the query results contain the threshold number of results.

In some aspects, the techniques described herein relate to a method, further including: the query execution agent determining whether a query of the different queries is finished executing and messaging the orchestrator agent in response determining that the query is finished executing; the orchestrator agent using the messaging to determine whether all of the different queries are finished executing; and the orchestrator agent invoking the query evaluation agent in response to determining that all of the different queries have finished executing.

In some aspects, the techniques described herein relate to a method, wherein the first instruction and the second instruction are included in a same instruction to the GMLM.

In some aspects, the techniques described herein relate to a method, further including: the query execution agent batching the query results per query of the different queries; and the query evaluation agent causing the GMLM to generate the query result summaries per batch of query results.

In some aspects, the techniques described herein relate to a system including: a processor; and a memory coupled to the processor, wherein the memory includes an instruction that when executed by the processor causes the processor to: provide a multi-agent system including a query input agent, an orchestrator agent, a query execution agent, and a query evaluation agent, each including an autonomous element executable asynchronously with autonomous elements of other agents of the multi-agent system; via the orchestrator agent, receive a query input from the query input agent; via the orchestrator agent, provide the query input and a first instruction to a generative machine learning model (GMLM), wherein the first instruction is to cause the GMLM to determine different queries using the query input; via the query execution agent, execute the different queries in parallel using the query input; via the orchestrator agent, determine that the different queries have finished executing; via the query evaluation agent, provide query results of execution of each of the different queries and a second instruction to the GMLM, wherein the second instruction is to cause the GMLM to generate, for each query result, a query result summary including an evaluation of alignment of a query result with the query input; and via the orchestrator agent, use the query result summaries to determine a subset of the query results for presentation via a device.

In some aspects, the techniques described herein relate to a system, wherein the instruction, when executed by the processor, further causes the processor to: via the query input agent, receive the query input from a user-preferred communication channel; and map the query input to a standardized query input.

In some aspects, the techniques described herein relate to a system, wherein the second instruction to the GMLM is to cause the GMLM to generate and include, in the query result summary, an evaluation of the query result as a whole and an attribute-by-attribute comparison of the query input to the query result.

In some aspects, the techniques described herein relate to a system, wherein the instruction, when executed by the processor, further causes the processor to: determine whether the query results include a threshold number of results; and in response to determining that the query results do not include the threshold number of results, iterate between the query execution agent and the query evaluation agent until the query results contain the threshold number of results.

In some aspects, the techniques described herein relate to a system, wherein the instruction, when executed by the processor, further causes the processor to: via the query execution agent, determine whether a query of the different queries is finished executing and messaging the orchestrator agent in response determining that the query is finished executing; via the orchestrator agent, use the messaging to determine whether all of the different queries are finished executing; via the orchestrator agent, invoke the query evaluation agent in response to determining that all of the different queries have finished executing.

In some aspects, the techniques described herein relate to a system, wherein the first instruction and the second instruction are included in a same instruction to the GMLM.

In some aspects, the techniques described herein relate to a system, wherein the instruction, when executed by the processor, further causes the processor to: via the query execution agent, batch the query results per query of the different queries; and via the query evaluation agent, cause the GMLM to generate the query result summaries per batch of query results.

In some aspects, the techniques described herein relate to a non-transitory computer-readable medium including an instruction that when executed by a processor causes the processor to: provide a multi-agent system including a query input agent, an orchestrator agent, a query execution agent, and a query evaluation agent, each including an autonomous element executable asynchronously with autonomous elements of other agents of the multi-agent system; via the orchestrator agent, receive a query input from the query input agent; via the orchestrator agent, provide the query input and a first instruction to a generative machine learning model (GMLM), wherein the first instruction is to cause the GMLM to determine different queries using the query input; via the query execution agent, execute the different queries in parallel using the query input; via the orchestrator agent, determine that the different queries have finished executing; via the query evaluation agent, provide query results of execution of each of the different queries and a second instruction to the GMLM, wherein the second instruction is to cause the GMLM to generate, for each query result, a query result summary including an evaluation of alignment of a query result with the query input; and via the orchestrator agent, use the query result summaries to determine a subset of the query results for presentation via a device.

In some aspects, the techniques described herein relate to a non-transitory computer-readable medium, wherein the instruction, when executed by the processor, further causes the processor to: via the query input agent, receive the query input from a user-preferred communication channel; and map the query input to a standardized query input.

In some aspects, the techniques described herein relate to a non-transitory computer-readable medium, wherein the second instruction to the GMLM is to cause the GMLM to generate and include, in the query result summary, an evaluation of the query result as a whole and an attribute-by-attribute comparison of the query input to the query result.

In some aspects, the techniques described herein relate to a non-transitory computer-readable medium, wherein the instruction, when executed by the processor, further causes the processor to: determine whether the query results include a threshold number of results; and in response to determining that the query results do not include the threshold number of results, iterate between the query execution agent and the query evaluation agent until the query results contain the threshold number of results.

In some aspects, the techniques described herein relate to a non-transitory computer-readable medium, wherein the instruction, when executed by the processor, further causes the processor to: via the query execution agent, determine whether a query of the different queries is finished executing and messaging the orchestrator agent in response determining that the query is finished executing; via the orchestrator agent, use the messaging to determine whether all of the different queries are finished executing; via the orchestrator agent, invoke the query evaluation agent in response to determining that all of the different queries have finished executing.

In some aspects, the techniques described herein relate to a non-transitory computer-readable medium, wherein the instruction, when executed by the processor, further causes the processor to: via the query execution agent, batch the query results per query of the different queries; and via the query evaluation agent, cause the GMLM to generate the query result summaries per batch of query results.

In some aspects, the techniques described herein relate to a method, system, apparatus, or non-transitory computer readable medium including any combination of any of the aspects shown or described anywhere in this disclosure, including in any of (i) the preceding aspects, (ii) the specification, (iii) the drawings, or (iv) any combination of (i), (ii), (iii).

Clause 1. A computer-implemented method comprising: sending (1010) a query input and a query input summarization instruction to a generative machine learning model, GMLM, wherein the query input is obtained via a first device and the query input summarization instruction is to cause the GMLM to generate and output a query input summary of a combination of the query input and context data associated with the query input; sending (1020) the query input summary and a query execution instruction to the GMLM, wherein the query execution instruction is to cause the GMLM to provide query results using multiple different queries and the query input summary; using (1030) the query results and a query result evaluation instruction to cause the GMLM to perform a comparison of a query result of the identified query results with the query input summary and summarize the comparison; receiving (1040) a query result evaluation summary, wherein the query result evaluation summary is a summary of the comparison of the query result with the query input summary, and wherein the query result evaluation summary is generated and output by the GMLM; receiving (1050) a signal from a cursor position selecting first content from within second content associated with a presentation of the query result evaluation summary via a second device, wherein the signal comprises a measure of alignment between the query result evaluation summary and the query input summary; and updating (1060) the query input summarization instruction to include the signal in the query input summary.

Clause 2. The method of clause 1, further comprising: determining a preferred channel of a plurality of different channels available to communicate with the first device, the second device, or the first device and the second device; and receiving the signal via the preferred channel in response to the presentation of the query result evaluation summary via the first device or the second device.

Clause 3. The method of any preceding clause, comprising: determining whether the signal meets or exceeds a signal threshold; and updating the query input summarization instruction in response to determining that the signal meets or exceeds the signal threshold.

Clause 4. The method of any preceding clause, wherein: sending the query input and the query input summarization instruction to the GMLM is performed by a query input agent of a multi-agent system; and using the query results and the query result evaluation instruction to cause the GMLM to perform a comparison of the query result with the query input summary and summarization of the comparison is performed by a query evaluation agent of the multi-agent system.

Clause 5. The method of clause 4, wherein: sending the query input summary and the query execution instruction to the GMLM is performed by a query execution agent of the multi-agent system.

Clause 6. The method of clause 5, further comprising: the query evaluation agent sending a portion of the query result evaluation summary to the query input agent; and the query input agent including a portion of the query result evaluation summary in the query input summarization instruction.

Clause 7. The method of clause 5, further comprising: the query evaluation agent sending a portion of the query result evaluation summary to the query execution agent; and the query execution agent including a portion of the query result evaluation summary in the query execution instruction.

Clause 8. A system comprising: a processor; and a memory coupled to the processor, wherein the memory comprises an instruction that when executed by the processor causes the processor to: send (1010) a query input and a query input summarization instruction to a generative machine learning model, GMLM, wherein the query input is obtained via a first device and the query input summarization instruction is to cause the GMLM to generate and output a query input summary of a combination of the query input and context data associated with the query input; send (1020) the query input summary and a query execution instruction to the GMLM, wherein the query execution instruction is to cause the GMLM to provide query results using multiple different queries and the query input summary; use (1030) the query results and a query result evaluation instruction to cause the GMLM to perform a comparison of a query result of the identified query results with the query input summary and summarize the comparison; receive (1040) a query result evaluation summary, wherein the query result evaluation summary is a summary of the comparison of the query result with the query input summary, and wherein the query result evaluation summary is generated and output by the GMLM; receive (1050) a signal from a cursor position selecting first content from within a presentation of second content associated with the query result evaluation summary via a second device, wherein the signal comprises a measure of alignment between the query result evaluation summary and the query input summary; and update (1060) the query input summarization instruction to include the signal in the query input summary.

Clause 9. The system of clause 8, wherein the instruction, when executed by the processor, further causes the processor to: determine a preferred channel of a plurality of different channels available to communicate with the first device, the second device, or the first device and the second device; and receive the signal via the preferred channel in response to the presentation of the query result evaluation summary via the first device or the second device.

Clause 10. The system of clause 8 or claim 9, wherein the instruction, when executed by the processor, further causes the processor to: determine whether the signal meets or exceeds a signal threshold; and update the query input summarization instruction in response to determining that the signal meets or exceeds the signal threshold.

Clause 11. The system of any of clauses 8 to 10, wherein: sending the query input and the query input summarization instruction to the GMLM is performed by a query input agent of a multi-agent system; and using the query results and the query result evaluation instruction to cause the GMLM to perform a comparison of the query result with the query input summary and summarization of the comparison is performed by a query evaluation agent of the multi-agent system.

Clause 12. The system of clause 11, wherein: sending the query input summary and the query execution instruction to the GMLM is performed by a query execution agent of the multi-agent system.

Clause 13. The system of clause 12, wherein the instruction, when executed by the processor, further causes the processor to: via the query evaluation agent, send a portion of the query result evaluation summary to the query input agent; and via the query input agent, include a portion of the query result evaluation summary in the query input summarization instruction.

Clause 14. The system of clause 12 or claim 13, wherein the instruction, when executed by the processor, further causes the processor to: via the query evaluation agent, send a portion of the query result evaluation summary to the query execution agent; and via the query execution agent, include a portion of the query result evaluation summary in the query execution instruction.

Clause 15. A non-transitory computer-readable medium comprising an instruction that when executed by a processor causes the processor to: send (1010) query input and a query input summarization instruction to a generative machine learning model (GMLM), wherein the query input is obtained via a first device and the query input summarization instruction is to cause the GMLM to generate and output a query input summary of a combination of the query input and context data associated with the query input; send (1020) the query input summary and a query execution instruction to the GMLM, wherein the query execution instruction is to cause the GMLM to provide query results using multiple different queries and the query input summary; use (1030) the query results and a query result evaluation instruction to cause the GMLM to perform a comparison of a query result of the identified query results with the query input summary and summarize the comparison; receive (1040) a query result evaluation summary, wherein the query result evaluation summary is a summary of the comparison of the query result with the query input summary, and wherein the query result evaluation summary is generated and output by the GMLM; receive (1050) a signal from a cursor position selecting first content from within a presentation of second content associated with the query result evaluation summary via a second device, wherein the signal comprises a measure of alignment between the query result evaluation summary and the query input summary; and update (1060) the query input summarization instruction to include the signal in the query input summary.

Clause 16. The non-transitory computer-readable medium of clause 15, wherein the instruction, when executed by the processor causes the processor to: determine a preferred channel of a plurality of different channels available to communicate with the first device, the second device, or the first device and the second device; and receiving the signal via the preferred channel in response to the presentation of the query result evaluation summary via the first device or the second device.

Clause 17. The non-transitory computer-readable medium of clause 15 or claim 16, wherein the instruction, when executed by the processor causes the processor to: determine whether the signal meets or exceeds a signal threshold; and update the query input summarization instruction in response to determining that the signal meets or exceeds the signal threshold.

Clause 18. The non-transitory computer-readable medium of any of clauses 15 to 17, wherein: sending the query input and the query input summarization instruction to the GMLM is performed by a query input agent of a multi-agent system; using the query results and the query result evaluation instruction to cause the GMLM to perform a comparison of the query result with the query input summary and the summarization of the comparison is performed by a query evaluation agent of the multi-agent system; and sending the query input summary and the query execution instruction to the GMLM is performed by a query execution agent of the multi-agent system.

Clause 19. The non-transitory computer-readable medium of clause 18, wherein the instruction, when executed by the processor, further causes the processor to: via the query evaluation agent, send a portion of the query result evaluation summary to the query input agent or query execution agent; via the query input agent or query execution agent, include a portion of the query result evaluation summary in the query input summarization instruction or query execution instruction.

Aspects of the disclosure have been described with reference to specific examples thereof. Various modifications are capable of being made to the described examples without departing from the spirit and scope of the disclosure reflected in the claims. The specification and drawings are illustrative and not restrictive.

What is claimed is:

1. A method comprising:
sending a query input and a query input summarization instruction to a generative machine learning model (GMLM), wherein the query input is obtained via a first device and the query input summarization instruction is to cause the GMLM to generate and output a query input summary of a combination of the query input and context data associated with the query input;
sending the query input summary and a query execution instruction to the GMLM, wherein the query execution instruction is to cause the GMLM to provide query results using multiple different queries and the query input summary;
using the query results and a query result evaluation instruction to cause the GMLM to perform a comparison of a query result of the query results with the query input summary and summarize the comparison;
receiving a query result evaluation summary, wherein the query result evaluation summary is a summary of the comparison of the query result with the query input summary, and wherein the query result evaluation summary is generated and output by the GMLM;
receiving a signal from a cursor position selecting first content from within second content associated with a presentation of the query result evaluation summary via a second device, wherein the signal comprises a measure of alignment between the query result evaluation summary and the query input summary; and
updating the query input summarization instruction to include the signal in the query input summary.

2. The method of claim 1, further comprising:
determining a preferred channel of a plurality of different channels available to communicate with the first device, the second device, or the first device and the second device; and receiving the signal via the preferred channel in response to the presentation of the query result evaluation summary via the first device or the second device.

3. The method of claim 1, wherein:
determining whether the signal meets or exceeds a signal threshold; and
updating the query input summarization instruction in response to determining that the signal meets or exceeds the signal threshold.

4. The method of claim 1, wherein:
sending the query input and the query input summarization instruction to the GMLM is performed by a query input agent of a multi-agent system; and
using the query results and the query result evaluation instruction to cause the GMLM to perform a comparison of the query result with the query input summary and summarization of the comparison is performed by a query evaluation agent of the multi-agent system.

5. The method of claim 4, wherein:
sending the query input summary and the query execution instruction to the GMLM is performed by a query execution agent of the multi-agent system.

6. The method of claim 5, further comprising:
the query evaluation agent sending a portion of the query result evaluation summary to the query input agent; and
the query input agent including a portion of the query result evaluation summary in the query input summarization instruction.

7. The method of claim 5, further comprising:
the query evaluation agent sending a portion of the query result evaluation summary to the query execution agent; and
the query execution agent including a portion of the query result evaluation summary in the query execution instruction.

8. A system comprising:
a processor; and
a memory coupled to the processor, wherein the memory comprises an instruction that when executed by the processor causes the processor to:
send query input and a query input summarization instruction to a generative machine learning model (GMLM), wherein the query input is obtained via a first device and the query input summarization instruction is to cause the GMLM to generate and output a query input summary of a combination of the query input and context data associated with the query input;
send the query input summary and a query execution instruction to the GMLM, wherein the query execution instruction is to cause the GMLM to provide query results using multiple different queries and the query input summary;
use the query results and a query result evaluation instruction to cause the GMLM to perform a comparison of a query result of the query results with the query input summary and summarize the comparison;
receive a query result evaluation summary, wherein the query result evaluation summary is a summary of the comparison of the query result with the query input summary, and wherein the query result evaluation summary is generated and output by the GMLM;
receive a signal from a cursor position selecting first content from within a presentation of second content associated with the query result evaluation summary via a second device, wherein the signal comprises a measure of alignment between the query result evaluation summary and the query input summary; and update the query input summarization instruction to include the signal in the query input summary.

9. The system of claim 8, wherein the instruction, when executed by the processor, further causes the processor to:

determine a preferred channel of a plurality of different channels available to communicate with the first device, the second device, or the first device and the second device; and receiving the signal via the preferred channel in response to the presentation of the query result evaluation summary via the first device or the second device.

10. The system of claim 8, wherein the instruction, when executed by the processor, further causes the processor to:

determine whether the signal meets or exceeds a signal threshold; and update the query input summarization instruction in response to determining that the signal meets or exceeds the signal threshold.

11. The system of claim 8, wherein:

sending the query input and the query input summarization instruction to the GMLM is performed by a query input agent of a multi-agent system; and using the query results and the query result evaluation instruction to cause the GMLM to perform a comparison of the query result with the query input summary and summarization of the comparison is performed by a query evaluation agent of the multi-agent system.

12. The system of claim 11, wherein:

sending the query input summary and the query execution instruction to the GMLM is performed by a query execution agent of the multi-agent system.

13. The system of claim 12, wherein the instruction, when executed by the processor, further causes the processor to:

via the query evaluation agent, send a portion of the query result evaluation summary to the query input agent; and via the query input agent, include a portion of the query result evaluation summary in the query input summarization instruction.

14. The system of claim 12, wherein the instruction, when executed by the processor, further causes the processor to:

via the query evaluation agent, send a portion of the query result evaluation summary to the query execution agent; and via the query execution agent, include a portion of the query result evaluation summary in the query execution instruction.

15. A non-transitory computer-readable medium comprising an instruction that when executed by a processor causes the processor to:

send query input and a query input summarization instruction to a generative machine learning model (GMLM), wherein the query input is obtained via a first device and the query input summarization instruction is to cause the GMLM to generate and output a query input summary of a combination of the query input and context data associated with the query input;

send the query input summary and a query execution instruction to the GMLM, wherein the query execution instruction is to cause the GMLM to provide query results using multiple different queries and the query input summary;

use the query results and a query result evaluation instruction to cause the GMLM to perform a comparison of a query result of the query results with the query input summary and summarize the comparison;

receive a query result evaluation summary, wherein the query result evaluation summary is a summary of the comparison of the query result with the query input summary, and wherein the query result evaluation summary is generated and output by the GMLM;

receive a signal from a cursor position selecting first content from within a presentation of second content associated with the query result evaluation summary via a second device, wherein the signal comprises a measure of alignment between the query result evaluation summary and the query input summary; and update the query input summarization instruction to include the signal in the query input summary.

16. The non-transitory computer-readable medium of claim 15, wherein the instruction, when executed by the processor causes the processor to:

determine a preferred channel of a plurality of different channels available to communicate with the first device, the second device, or the first device and the second device; and receiving the signal via the preferred channel in response to the presentation of the query result evaluation summary via the first device or the second device.

17. The non-transitory computer-readable medium of claim 15, wherein the instruction, when executed by the processor causes the processor to:

determine whether the signal meets or exceeds a signal threshold; and update the query input summarization instruction in response to determining that the signal meets or exceeds the signal threshold.

18. The non-transitory computer-readable medium of claim 15, wherein:

sending the query input and the query input summarization instruction to the GMLM is performed by a query input agent of a multi-agent system;

using the query results and the query result evaluation instruction to cause the GMLM to perform a comparison of the query result with the query input summary and the summarization of the comparison is performed by a query evaluation agent of the multi-agent system; and sending the query input summary and the query execution instruction to the GMLM is performed by a query execution agent of the multi-agent system.

19. The non-transitory computer-readable medium of claim 18, wherein the instruction, when executed by the processor, further causes the processor to:

via the query evaluation agent, send a portion of the query result evaluation summary to the query input agent;

via the query input agent, include a portion of the query result evaluation summary in the query input summarization instruction.

20. The non-transitory computer-readable medium of claim 18, wherein the instruction, when executed by the processor, further causes the processor to:

via the query evaluation agent, send a portion of the query result evaluation summary to the query execution agent; and via the query execution agent, include a portion of the query result evaluation summary in the query execution instruction.

* * * * *